United States Patent
Lee et al.

(10) Patent No.: US 9,294,243 B2
(45) Date of Patent: Mar. 22, 2016

(54) METHOD AND APPARATUS FOR TRANSMITTING/RECEIVING A REFERENCE SIGNAL IN A WIRELESS COMMUNICATION SYSTEM

(71) Applicant: LG ELECTRONICS INC., Seoul (KR)

(72) Inventors: Dae Won Lee, Anyang-si (KR); Seung Hee Han, Anyang-si (KR); Ki Jun Kim, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/514,111

(22) Filed: Oct. 14, 2014

(65) Prior Publication Data

US 2015/0110047 A1     Apr. 23, 2015

Related U.S. Application Data

(63) Continuation of application No. 14/459,218, filed on Aug. 13, 2014, which is a continuation of application No. 13/394,546, filed as application No. PCT/KR2010/006071 on Sep. 7, 2010, now Pat. No. 8,842,515.

(Continued)

(30) Foreign Application Priority Data

Sep. 7, 2010   (KR) ................. 10-2010-0087445

(51) Int. Cl.
*H04J 11/00* (2006.01)
*H04L 5/00* (2006.01)
(Continued)

(52) U.S. Cl.
CPC ........... *H04L 5/0048* (2013.01); *H04J 13/0048* (2013.01); *H04J 13/18* (2013.01)

(58) Field of Classification Search
CPC .... H04J 13/0048; H04J 13/18; H04L 5/0048; H04L 5/005; H04L 5/0051
USPC ......... 370/203, 206, 207, 208, 209, 436–437, 370/468, 478, 480
See application file for complete search history.

(56) References Cited

U.S. PATENT DOCUMENTS

| | | | |
|---|---|---|---|
| 7,929,415 B2 | 4/2011 | Kwak et al. | |
| 7,952,991 B2 * | 5/2011 | Kim et al. | 370/210 |

(Continued)

FOREIGN PATENT DOCUMENTS

| | | |
|---|---|---|
| JP | 2009-505554 | 2/2009 |
| KR | 100911307 | 8/2009 |

(Continued)

OTHER PUBLICATIONS

United States Patent and Trademark Office U.S. Appl. No. 14/459,218, Final Office Action dated Apr. 21, 2015, 7 pages.

(Continued)

*Primary Examiner* — Kevin Mew
(74) *Attorney, Agent, or Firm* — Lee, Hong, Degerman, Kang & Waimey

(57) ABSTRACT

A base station apparatus for transmitting a reference signal in a wireless communication system is provided in which a processor generates the same sequence for resource elements (REs) allocated to each layer for reference signal transmission and spreads or covers Walsh codes for a user equipment-specific reference signal sequence such that sequences generated for the REs can be orthogonal to each other on a time axis. The Walsh code spreading or covering by the processor is applied on a frequency axis based on a plurality of resource blocks (RBs) or based on a pair of RBs such that mutually different sequences having mutually different sequence values can be mapped between RBs or between pairs of RBs. A transmission module transmits the reference signal, to which the generated reference signal sequence is applied to user equipment via each layer.

16 Claims, 53 Drawing Sheets

Related U.S. Application Data

(60) Provisional application No. 61/257,842, filed on Nov. 4, 2009, provisional application No. 61/250,885, filed on Oct. 13, 2009, provisional application No. 61/250,011, filed on Oct. 9, 2009, provisional application No. 61/248,884, filed on Oct. 6, 2009, provisional application No. 61/249,230, filed on Oct. 6, 2009, provisional application No. 61/244,891, filed on Sep. 23, 2009, provisional application No. 61/243,540, filed on Sep. 18, 2009, provisional application No. 61/242,760, filed on Sep. 15, 2009, provisional application No. 61/240,286, filed on Sep. 7, 2009.

(51) Int. Cl.
*H04J 13/00* (2011.01)
*H04J 13/18* (2011.01)

(56) References Cited

U.S. PATENT DOCUMENTS

| | | | |
|---|---|---|---|
| 8,036,197 B2 * | 10/2011 | Pajukoski et al. | 370/342 |
| 8,064,329 B2 * | 11/2011 | Chen et al. | 370/208 |
| 8,077,693 B2 | 12/2011 | Zhang et al. | |
| 8,094,570 B2 | 1/2012 | Sung et al. | |
| 8,179,857 B2 | 5/2012 | Kwon et al. | |
| 8,295,155 B2 | 10/2012 | Cho et al. | |
| 8,351,538 B2 * | 1/2013 | Nakao et al. | 375/295 |
| 8,379,590 B2 | 2/2013 | Hooli et al. | |
| 8,477,593 B2 * | 7/2013 | Wei et al. | 370/208 |
| 8,699,426 B2 * | 4/2014 | Gaal et al. | 370/329 |
| 8,831,042 B2 | 9/2014 | Kim et al. | |
| 2009/0046646 A1 * | 2/2009 | Cho et al. | 370/329 |
| 2009/0086713 A1 | 4/2009 | Luo | |
| 2009/0135803 A1 | 5/2009 | Luo et al. | |
| 2009/0181687 A1 | 7/2009 | Tiirola et al. | |
| 2010/0075706 A1 | 3/2010 | Montojo et al. | |
| 2010/0135273 A1 * | 6/2010 | Kim | 370/344 |
| 2010/0238877 A1 * | 9/2010 | Nam | H04L 5/0048 370/329 |
| 2010/0272040 A1 * | 10/2010 | Nam et al. | 370/329 |
| 2011/0222393 A1 | 9/2011 | Kwak et al. | |
| 2012/0002740 A1 * | 1/2012 | Han | H04L 5/0048 375/260 |
| 2012/0020323 A1 * | 1/2012 | Noh | H04J 13/00 370/330 |
| 2012/0033630 A1 * | 2/2012 | Chung | H04B 7/0473 370/329 |
| 2012/0113889 A1 | 5/2012 | Noh et al. | |
| 2012/0113951 A1 | 5/2012 | Koo et al. | |
| 2013/0039164 A1 | 2/2013 | Horiuchi et al. | |
| 2013/0070580 A1 | 3/2013 | Wang et al. | |
| 2015/0098435 A1 | 4/2015 | Nam et al. | |

FOREIGN PATENT DOCUMENTS

| | | |
|---|---|---|
| RU | 2354080 | 4/2009 |
| WO | 2009/023860 | 2/2009 |

OTHER PUBLICATIONS

LG Electronics, "DM-RS Design for Higher Order MIMO", R1-093236, 3GPP TSG RAN WG1 Meeting #58, Aug. 2009, 6 pages.
The State Intellectual Property Office of the People's Republic of China Application Serial No. 201080048850.9, Office Action dated Feb. 28, 2014, 5 pages.
Russian Federation Federal Service for Intellectual Property, Patents and Trademarks Application Serial No. 2012113552/07, Notice of Allowance dated Jul. 12, 2013, 10 pages.
NTT DOCOMO, "DL DM-RS Design for Rel-9 LTE," 3GPP TSG RAN WG1 Meeting #57bis, R1-092797, Jun. 2009, 8 pages.
ETRI, "DM RS for SU-MIMO transmission in LTE-A", R1-092301, 3GPP TSG RAN WG1 Meeting #57bis, Jun. 2009.
CATT, "Consideration on Rel-8 CRS and Rel-10 CSI RS in LTE-A", R1-092775, 3GPP TSG RAN WG1 Meeting #57bis, Jun. 2009.
U.S. Appl. No. 14/459,218, Office Action dated Nov. 5, 2014, 29 pages.
U.S. Appl. No. 14/459,218, Notice of Allowance dated Jul. 21, 2015, 12 pages.
Nokia Siemens Networks, et al., "Considerations on Initialization and Mapping of DM-RS Sequence," 3GPP TSG RAN WG1 #58 Meeting, R1-093304, Aug. 2009, 4 pages.

* cited by examiner

FIG. 2
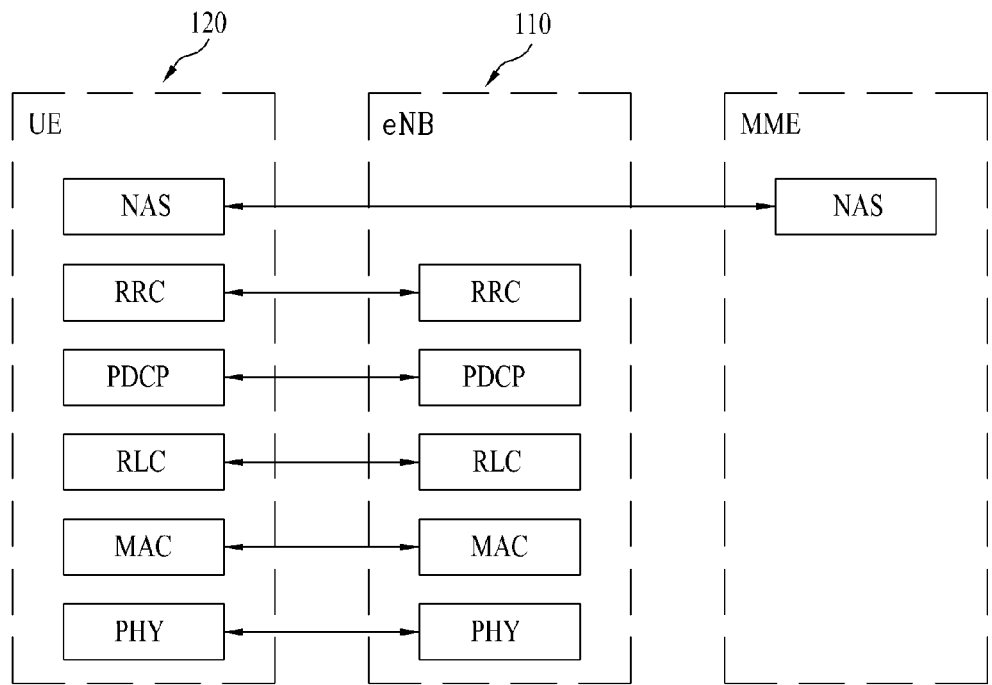
(a) contol - plane protocol stack
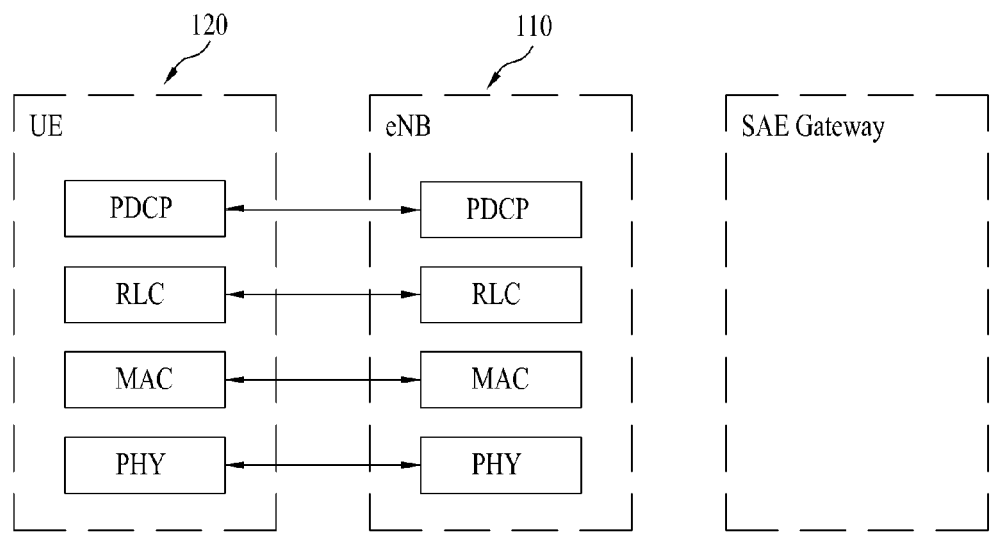
(b) user - plane protocol stack

FIG. 5
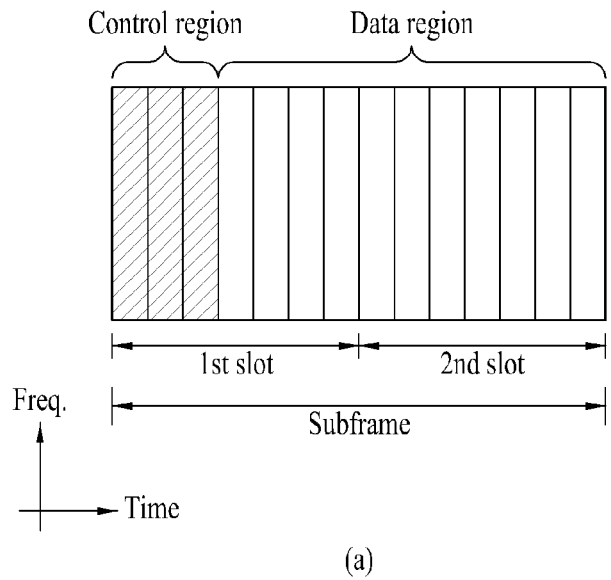
(a)
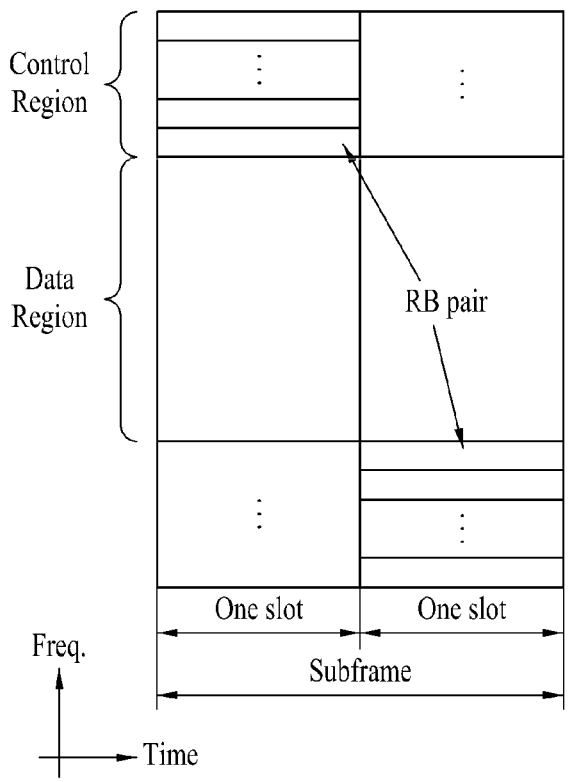
(b)

FIG. 16
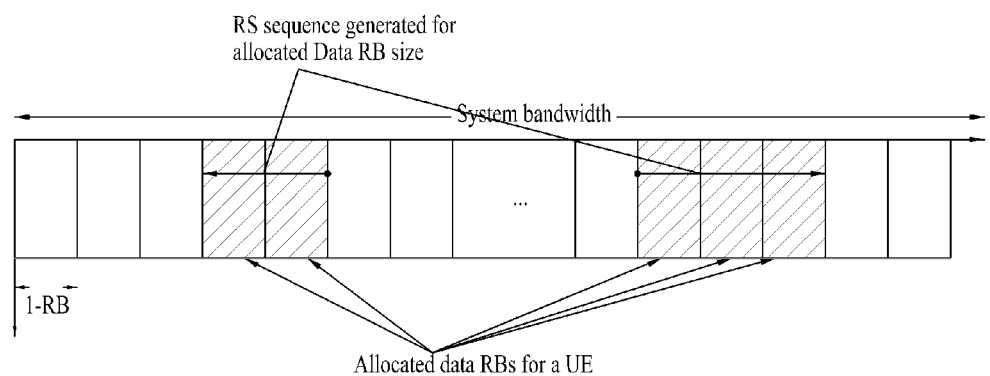
(a)
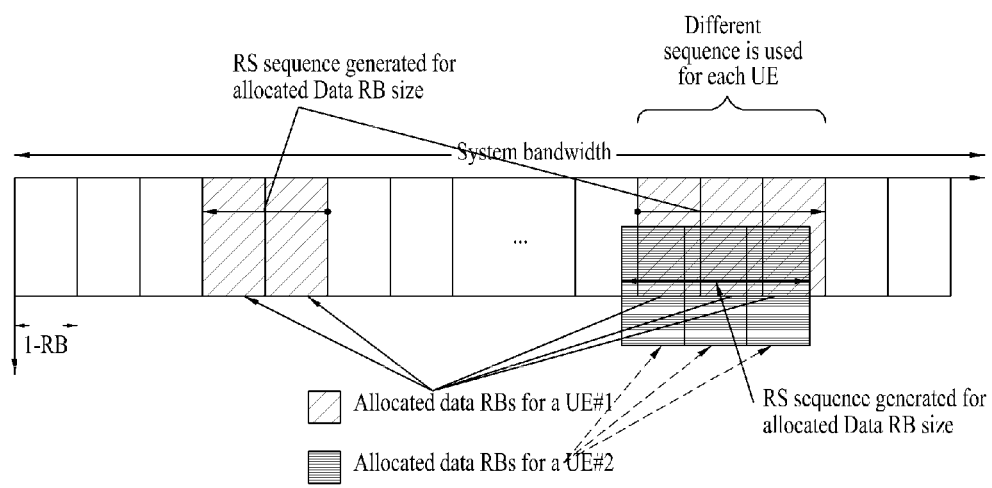
(b)

FIG. 20
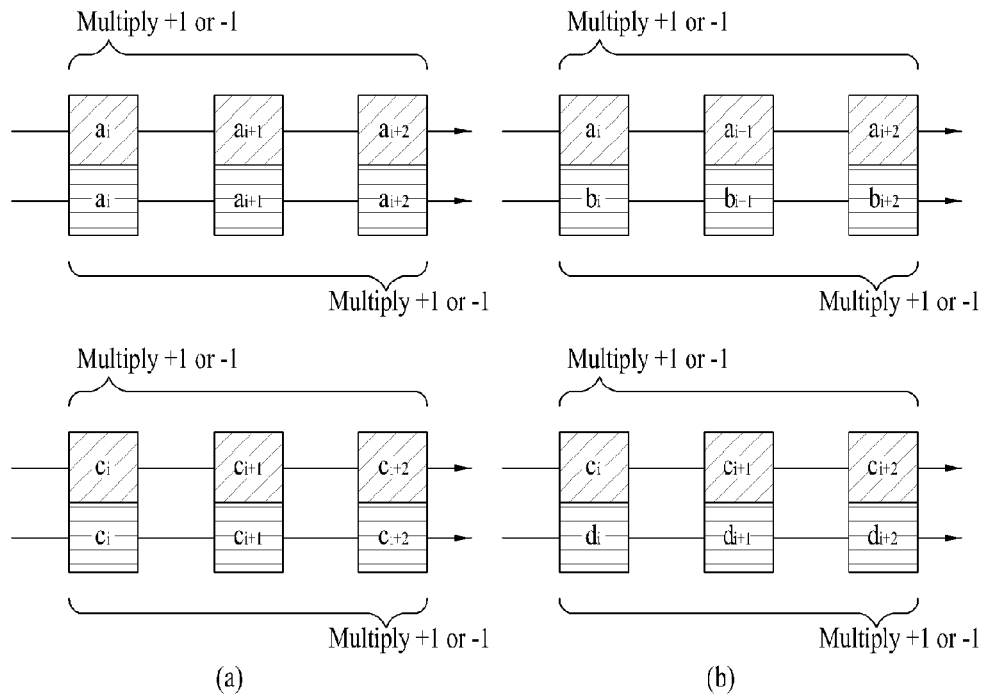
(a)  (b)
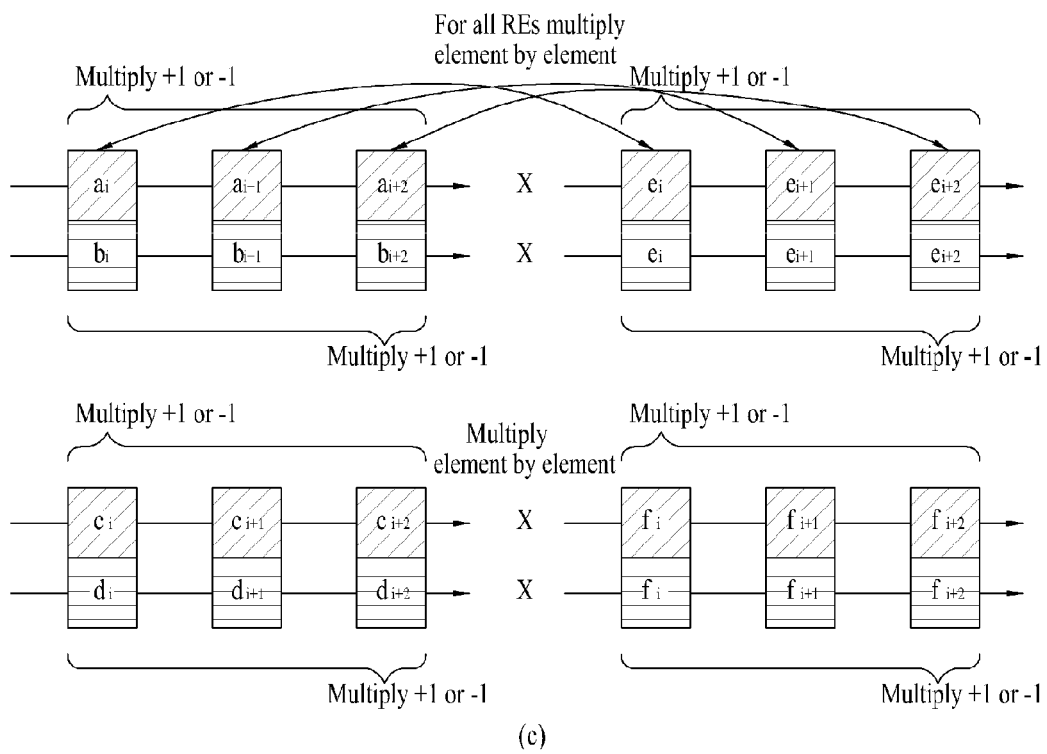
(c)

FIG. 25
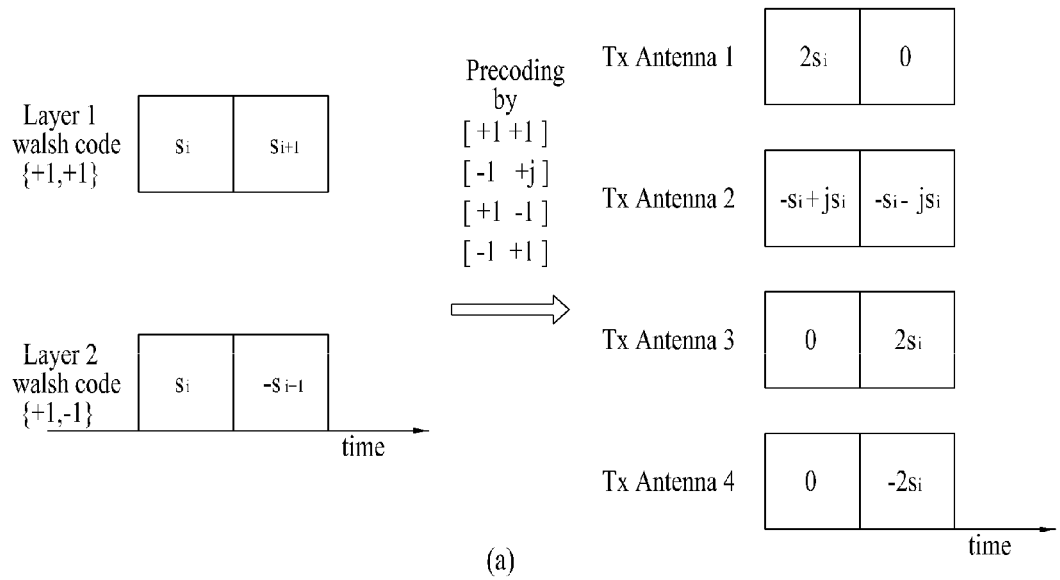
(a)
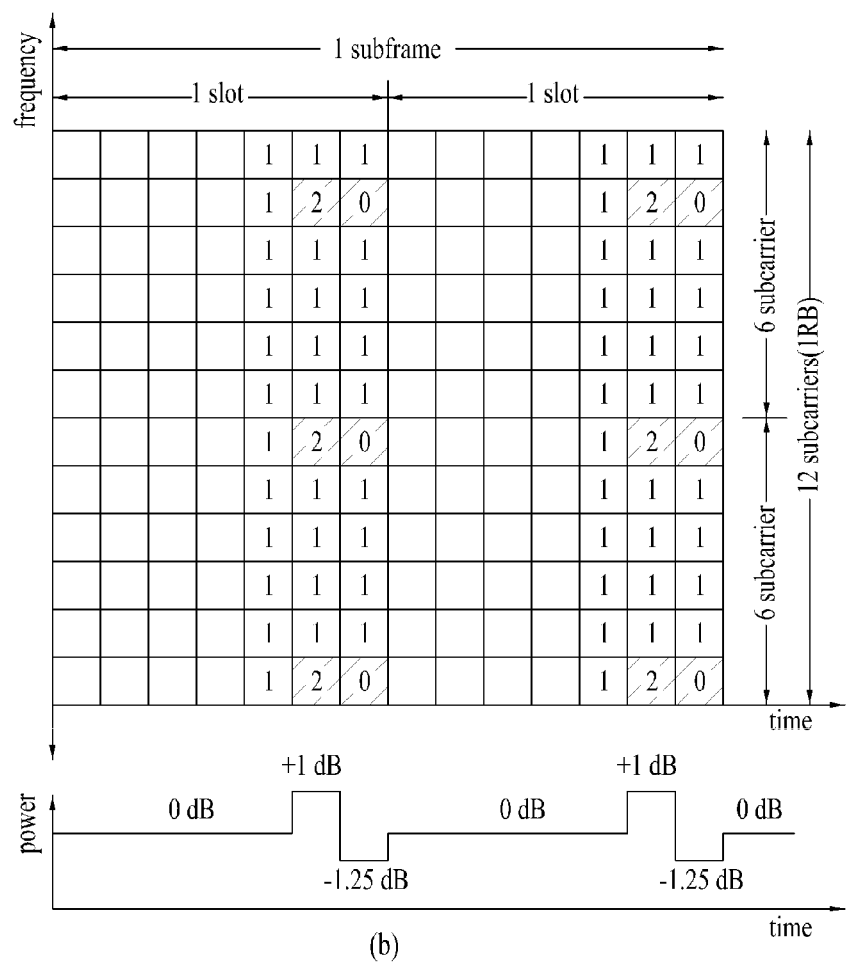
(b)

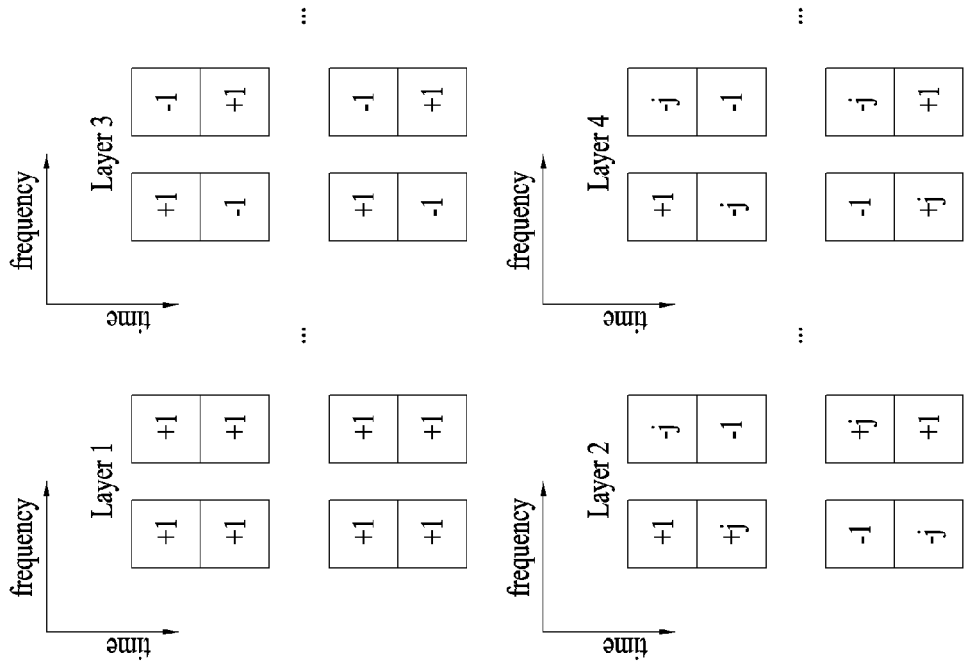
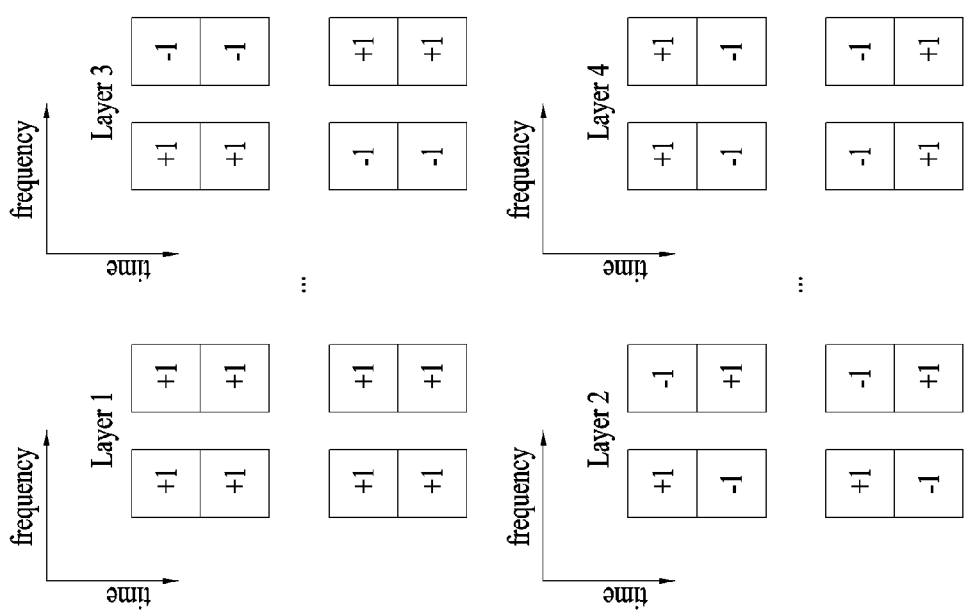

METHOD AND APPARATUS FOR TRANSMITTING/RECEIVING A REFERENCE SIGNAL IN A WIRELESS COMMUNICATION SYSTEM

CROSS-REFERENCE TO RELATED APPLICATIONS

This application is a continuation of U.S. patent application Ser. No. 14/459,218, filed on Aug. 13, 2014, now U.S. Pat. No. 9,197,386, which is a continuation of U.S. patent application Ser. No. 13/394,546, filed on Mar. 6, 2012, now U.S. Pat. No. 8,842,515, which is the National Stage filing under 35 U.S.C. 371 of International Application No. PCT/KR2010/006071, filed on Sep. 7, 2010, which claims the benefit of earlier filing date and right of priority to Korean Patent Application No. 10-2010-0087445, filed on Sep. 7, 2010, and also claims the benefit of U.S. provisional application Ser. Nos. 61/257,842, filed on Nov. 4, 2009, Ser. No. 61/250,885, filed on Oct. 13, 2009, Ser. No. 61/250,011, filed on Oct. 9, 2009, Ser. No. 61/249,230, filed on Oct. 6, 2009, Ser. No. 61/248,884, filed on Oct. 6, 2009, Ser. No. 61/244,891, filed on Sep. 23, 2009, Ser. No. 61/243,540, filed on Sep. 18, 2009, Ser. No. 61/242,760, filed on Sep. 15, 2009, and Ser. No. 61/240,286, filed on Sep. 7, 2009, the contents of all of which are all hereby incorporated by reference herein in their entireties

TECHNICAL FIELD

The present invention relates to a wireless communication system, and more particularly, to a method and apparatus for transmitting/receiving a reference signal using a generated reference signal sequence.

RELATED ART

A description will be given of a 3GPP LTE ($3^{rd}$ Generation Partnership Project Long Term Evolution; referred to as "LTE" hereinafter) as an exemplary mobile communication system to which the present invention can be applied.

FIG. 1 illustrates an E-UMTS (Evolved Universal Mobile Telecommunications System) network as an exemplary mobile communication system. E-UMTS is a system evolved from UMTS (Universal Mobile Telecommunications System) and fundamental standardization for the E-UMTS is currently performed by 3GPP. The E-UMTS can be regarded as an LTE system. Details of technical specifications of UMTS and E-UMTS can respectively refer to Release 7 and Release 8 of "$3^{rd}$ Generation Partnership Project; Technical specification Group Radio Access Network."

Referring to FIG. 1, E-UMTS includes an Access Gateway (AG) that is located at terminals of a User Equipment (UE), an eNode B, and a network (E-UTRAN) and linked with an external network. The eNode B can simultaneously transmit multiple data streams for a broadcast service, a multicast service and/or a unicast service.

One or more cells belong to one eNode B. A cell is set to one of bandwidths of 1.25, 2.5, 5, 10, 15 and 20 MHz and provides a downlink or uplink transmission service to a plurality of UEs. Different cells may be configured such that they provide different bandwidths. An eNode B controls transmission/reception of data to/from a plurality of UEs. The eNode B signals time/frequency domains in which downlink data will be transmitted, a coding scheme, a data size, information involving Hybrid Automatic Repeat and reQuest (HARQ), etc. to a corresponding UE by transmitting downlink scheduling information with respect to the downlink data to the UE.

The eNode B signals time/frequency domains that can be used by the UE, a coding scheme, a data size, information involving HARQ, etc. to the UE by transmitting uplink scheduling information with respect to the uplink data to the UE. An interface for user traffic or control traffic transmission can be used between eNode Bs. A Core Network (CN) can be composed of an AG and a network node for user registration of a UE. The AG manages mobility of a UE based on a Tracking Area (TA) configured with a plurality of cells.

Although wireless communication technologies have been developed to reach LTE on the basis of Wideband Code Division Multiple Access (WCDMA), demands and expectations of users and common carriers continuously increase. Furthermore, wireless access technologies are constantly developing, and thus evolution of technology is required to enhance competitiveness. The evolution of technology involves reduction of cost per bit, increase in service availability, flexible use of frequency band, simple structure and open interface, appropriate power consumption of UE, etc.

Recently, 3GPP has performed standardization of a technology following LTE. This technology is referred to as "LTE-Advanced" or "LTE-A" in the specification. One of main differences between LTE and LTE-A is a system bandwidth. LTE-A aims to support a wide band of up to 100 MHz. To achieve this, carrier aggregation or bandwidth aggregation for accomplishing a broadband using a plurality of frequency blocks is used. The carrier aggregation uses a plurality of frequency blocks as one logical frequency band to obtain a wider frequency band. The bandwidth of each frequency block can be defined on the basis of a system block bandwidth used in LTE. Each frequency block is transmitted using a component carrier.

However, LTE-A has discussed no method of generating a reference sequence for reference signal transmission in each layer when eight layers carry reference signals.

DETAILED DESCRIPTION OF THE INVENTION

Technical Problems

An object of the present invention is to provide a method for transmitting/receiving a reference signal in a wireless communication system.

Another object of the present invention is to provide an apparatus for transmitting/receiving a reference signal in a wireless communication system.

Technical problems to be solved by the present invention are not limited to the above-mentioned technical problem, and other technical problems not mentioned above can be clearly understood by one skilled in the art from the following description.

Technical Solutions

In an aspect of the present invention, a method for transmitting a reference signal at an eNode B in a wireless communication system includes: generating a pseudo-random sequence for each layer using a first m-sequence and a second m-sequence; generating a reference signal sequence using the generated pseudo-random sequence and a Walsh code; and transmitting a reference signal to which the reference signal sequence generated for the each layer is applied to a user equipment (UE) for the each layer, wherein the pseudo-random sequence is generated using a sequence initialization value, the sequence initialization value being generated using a slot number in a radio frame, a physical layer cell ID value, and a value indicating a layer index group differentiated by a frequency.

In another aspect of the present invention, a method for transmitting a reference signal at an eNode B in a wireless communication system includes: generating the same scrambling sequence for Resource Elements (REs) allocated to each layer for reference signal transmission; generating a reference signal sequence by spreading or covering Walsh codes such that scrambling sequences generated for the REs are orthogonal to each other on a time axis; and transmitting a reference signal to which the generated reference signal sequence is applied to a UE via each layer, wherein the Walsh code spreading or covering is applied on a frequency axis on the basis of a plurality of resource blocks (RBs) or on the basis of a pair of resource blocks, such that mutually different sequences having mutually different sequence values are mapped between resource blocks or between pairs of resource blocks.

In the Walsh code spreading and covering, in a first resource block of the plurality of resource block pairs, Walsh code elements may be applied to a first Code Division Multiplexing (CDM) group such that the Walsh code elements are one-to-one mapped to REs of a first subcarrier allocated to the first resource block in the direction of the time axis, one-to-one mapped to REs of a second subcarrier in the opposite direction of the time axis, and one-to-one mapped to REs of a third subcarrier in the direction of the time axis, and in a second resource block of the plurality of resource block pairs, the Walsh code elements may be applied to the first CDM group such that the Walsh code elements are one-to-one mapped to REs of a first subcarrier allocated to the second resource block in the opposite direction of the time axis, one-to-one mapped to REs of a second subcarrier in the direction of the time axis, and one-to-one mapped to REs of a third subcarrier in the opposite direction of the time axis.

In the first and second resource block pairs, the Walsh code elements may be applied to a second CDM group in an order different from the order of the Walsh code elements applied to the first CDM group.

In the generating of the reference signal sequence, the different sequences having different sequence values may be repeated on the basis of two resource block pairs on the frequency axis.

The Walsh code elements of the CDM groups may be applied to layer 1 as (1, 1, 1, 1), applied to layer 2 as (1, −1, 1, −1), applied to layer 3 as (1, 1, −1, −1), and applied to layer 4 as (1, −1, −1, 1).

In another aspect of the present invention, an eNode B apparatus for transmitting a reference signal in a wireless communication system includes: a processor generating a pseudo-random sequence for each layer using a first m-sequence and a second m-sequence, and generating a reference signal sequence using the generated pseudo-random sequence and a Walsh code; and a transmission module transmitting a reference signal to which the reference signal sequence generated for the each layer has been applied to a UE for the each layer, wherein the processor generates the pseudo-random sequence using a sequence initialization value, the sequence initialization value being generated using a slot number in a radio frame, a physical layer cell ID value, and a value indicating a layer index group differentiated by a frequency.

In another aspect of the present invention, an eNode B apparatus for transmitting a reference signal in a wireless communication system includes a processor generating the same scrambling sequence for Resource Elements (REs) allocated to each layer for reference signal transmission, and generating a reference signal sequence by spreading or covering Walsh codes such that scrambling sequences generated for the REs are orthogonal to each other on a time axis; and a transmission module transmitting a reference signal to which the generated reference signal sequence has been applied to a UE via each layer, wherein the Walsh code spreading or covering of the processor is applied on a frequency axis on the basis of a plurality of resource blocks (RBs) or on the basis of a pair of resource blocks, such that mutually different sequences having mutually different sequence values are mapped between resource blocks or between pairs of resource blocks.

Advantageous Effects

The method for generating and transmitting a reference signal sequence according to the present invention can remarkably improve communication performances of an eNode B and a UE in a 3GPP LTE-A system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates structures of a control plane and a user plane of a radio interface protocol between a UE and E-UTRAN based on a 3GPP wireless access network;

FIG. 5 illustrates downlink and uplink subframe structures of a 3GPP LTE system;

FIG. 16 illustrates an exemplary method for generating a DRS sequence;

FIG. 20 illustrates exemplary methods for generating a sequence within a RB;

FIG. 25 illustrates an exemplary method of applying precoding to two DRS layers, mapping the DRS layers to four Tx antennas and transmitting the DRS layers, and a power difference between OFDM symbols when a DRS is transmitted using the method;

FIGS. 38(a) and 38(b) illustrate examples of Walsh code hopping for four layers;

BEST MODE FOR CARRYING OUT THE INVENTION

Figure 1:
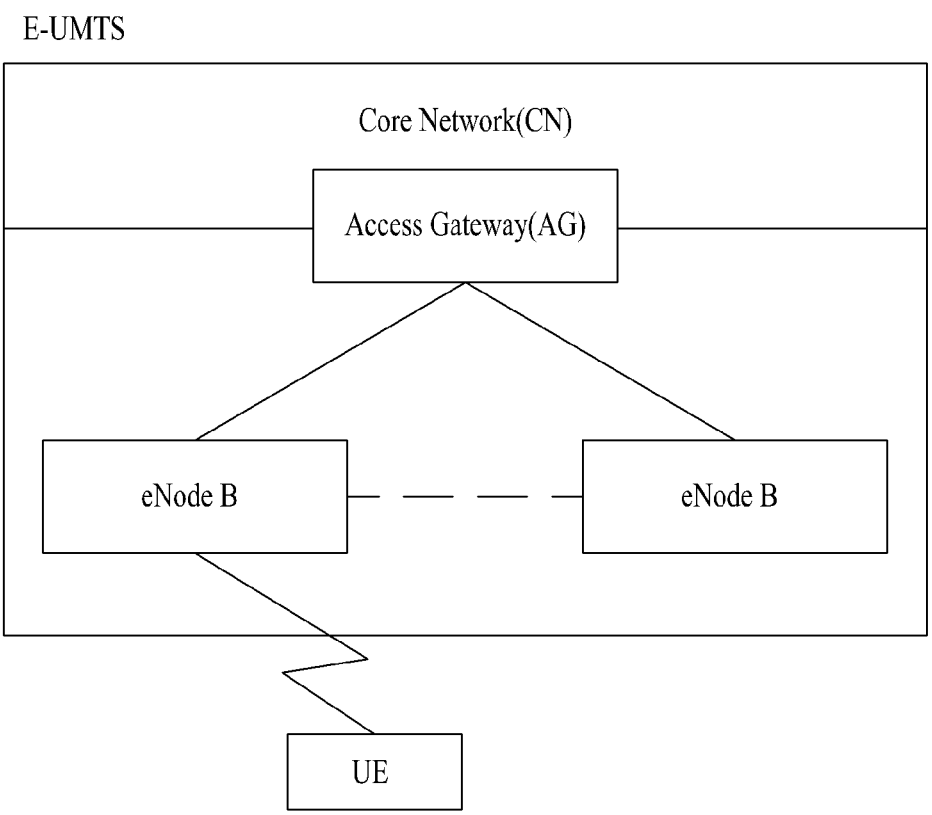
FIG. 1 illustrates an E-UMTS network as an exemplary mobile communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, while the following detailed description includes specific details in order to provide a thorough understanding of the present invention, it will be apparent to those skilled in the art that the present invention may be practiced without such specific details. For example, the following detailed description is given under the assumption that a $3^{rd}$ Generation Partnership Project Long Term Evolution (3GPP LTE) mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE.

In a mobile communication system, a UE may receive information from an eNode B on a downlink and transmit information to the eNode B on an uplink. The information that the MS transmits or receives includes data and various types of control information. There are many physical channels according to the types and usages of information that the MS transmits or receives.

Techniques, apparatuses and systems described herein can be used in various wireless access technologies such as Code Division Multiple Access (CDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA 2000. The TDMA my be implemented with a radio technology such as Global System for Mobile communications (GSM)/General Pack Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA), etc. The UTRA is a part of a universal mobile telecommunication system (UMTS). $3^{rd}$ generation partnership project (3GPP) Long Term Evolution (LTE) is a part of an evolved-UMTS (E-UMTS) using the E-UTRA. The 3GPP LTE employs the OFDMA in downlink and employs the SC-FDMA in uplink. LTE-Advanced (LTE-A) is an evolution of the 3GPP LTE.

For clarity, the present invention focuses on the 3GPP LTE/LTE-A. However, technical features of the present invention are not limited thereto.

FIG. 2 illustrates structures of a control plane and a user plane of a radio interface protocol between a UE and an E-UTRAN based on a 3GPP wireless access network.

Referring to FIG. 2, the control plane is a path through which control messages used for a UE 120 and a network to manage calls are transmitted. The user plane is a path through which data generated in an application layer, that is, audio data, Internet packet data, etc.

A physical layer, a first layer, provides an information transfer service to a higher layer using a physical channel. The physical layer is linked with a Medium Access Control (MAC) layer corresponding to a higher layer through a transport channel. Data is transmitted between the MAC layer and the physical layer through the transport channel. Data is transmitted via a physical channel between the physical layers of a transmitter and a receiver. The physical layer uses time and frequency as radio resources. Specifically, the physical layer is modulated in downlink through Orthogonal Frequency Division Multiple Access (OFDMA) and modulated in uplink using Single Carrier Frequency Division Multiple Access (SC-FDMA).

The MAC layer corresponding to a second layer provides a service to a Radio Link Control (RLC) layer corresponding to a higher layer through a logical channel. The RLC layer supports reliable data transmission. The function of the RLC layer may be implemented as a functional block in the MAC layer. A Packet Data Convergence Protocol (PDCP) layer of the second layer performs a header compression function for reducing control information that is unnecessary for efficient transmission of IP packet such as IPv4 or IPv6 in a radio interface with a narrow bandwidth.

A Radio Resource Control (RRC) layer corresponding to the lowest layer of a third layer is defined only in the control plane. The RRC layer controls the logical channel, transport channel and physical channels in association with configuration, re-configuration and release of radio bearers. The radio bearers mean services provided by the second layer for data transmission between a UE and a network. For this, the RRC layers of the UE and the network exchange RRC messages. The UE is in a RRC-connected mode when the RRC layers of the UE and the network are RRC-connected and is in an idle mode when they are not RRC-connected. A Non-Access Stratum (NAS) layer corresponding to a higher layer of the RRC layer performs session management and mobility management.

One cell constituting an eNode B 110 is set to one of bandwidths of 1.25, 2.5, 5, 10, 15 and 20 MHz and provides downlink or uplink transmission service to UEs. Different cells may be configured to provide different bandwidths.

A downlink transport channels for transmitting data from a network to a UE includes a Broadcast Channel (BCH) carrying system information, a Paging Channel (PCH) carrying a paging message, a downlink Shared Channel (SCH) transmitting user traffic or control messages, etc. A traffic or control message of downlink multicast or broadcast service can be transmitted through the downlink SCH, or through a separate downlink Multicast Channel (MCH). An uplink transport channels for transmitting data from the UE to the network includes a Random Access Channel (RACH) transmitting an initial control message, and an uplink Shared Channel (SCH) carrying user traffic or control messages. A logical channel located above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
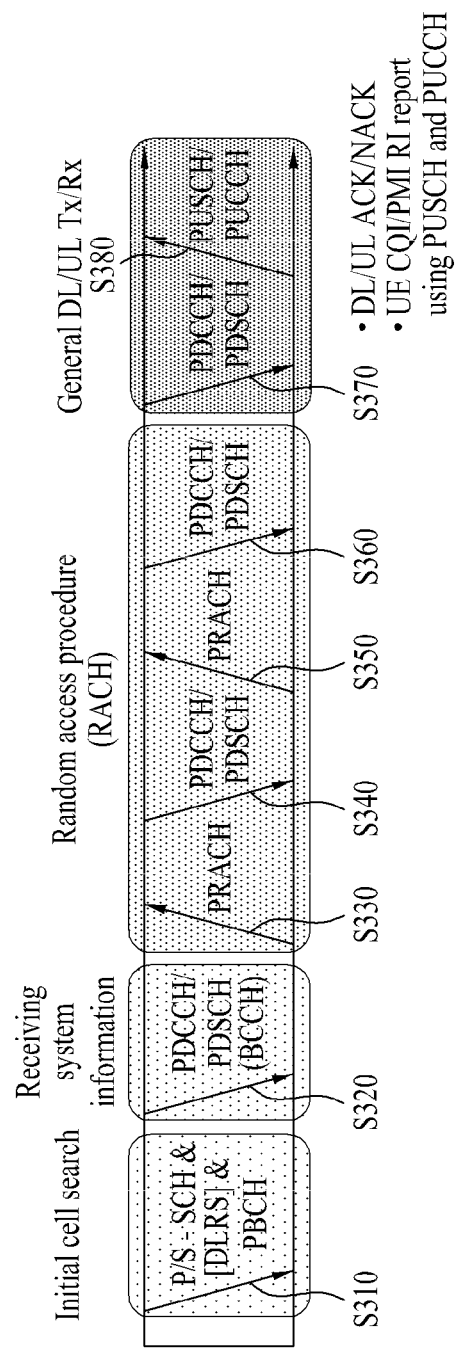
FIG. 3 is a view referred to for describing physical channels used in a 3GPP system and a general signal transmission method using the same.

FIG. 3 illustrates physical channels used in a 3GPP system and a general signal transmission method using the physical channels.

Referring to FIG. 3, when a UE is powered on or enters a new cell, the UE performs an initial cell search involving acquisition of synchronization with an eNode B (S310). For the initial cell search, the UE receives a Primary Synchronization CHannel (P-SCH) and a Secondary Synchronization CHannel (S-SCH) from the eNode B, and acquires synchronization with the eNode B and information such as a cell Identity (ID) from the P-SCH and the S-SCH. Then the UE may receive a Physical Broadcast CHannel (PBCH) from the eNode B and acquire broadcast information within a cell from the PBCH. The UE may check a downlink channel state by receiving a downlink reference signal (DL RS) in the initial cell search step.

Upon completion of the initial cell search, the UE may acquire more specific system information by receiving a Physical Downlink Control CHannel (PDCCH) and receiving a Physical Downlink Shared CHannel (PDSCH) according to information carried on the PDCCH (S320).

Subsequently, the UE may perform a random access procedure (S330 to S360) in order to complete access to the BS. For the random access procedure, the UE may transmit a preamble on a Physical Random Access CHannel (PRACH) (S330 and S350) and receive a response message to the preamble on a PDCCH and a PDSCH corresponding thereto (S340 and S360). If the random access procedure is contention-based, the UE may additionally perform a contention resolution procedure.

After the above random access procedure, the UE may receive a PDCCH/PDSCH (S370) and transmit a Physical Uplink Shared CHannel (PUSCH)/Physical Uplink Control CHannel (PUCCH) (S380) in a general uplink/downlink signal transmission procedure. Control information that the UE transmits to the eNode B includes a downlink/uplink ACKnowledgment/Negative-ACK (ACK/NACK) signal, a Channel Quality Indictor (CQI), a Precoding Matrix Index (PMI), and a Rank Indicator (RI). In the case of 3GPP LTE system, the UE can transmit the control information such as CQI/PMI/RI through a PUSCH and/or a PUCCH.

Figure 4:
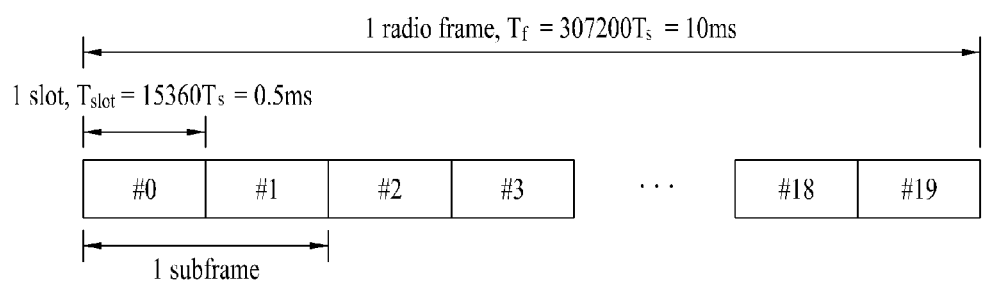
FIG. 4 illustrates an exemplary radio frame structure used in a 3GPP LTE system that is one of mobile communication systems.

FIG. 4 illustrates an exemplary radio frame structure used in a 3GPP LTE system that is one of mobile communication systems.

Referring to FIG. 4, a radio frame has a length of 10 ms ($327200 \cdot T_s$) and includes 10 subframes. Each subframe has a length of 1 ms and includes two slots. Each slot has a length of 0.5 ms ($15360 \cdot T_s$). Here, $T_s$ denotes sampling time and is represented as Ts=1/(15 kHz×2048)=3.2552×10$^{-8}$ (approximately 33 ns). One slot includes a plurality of OFDM symbols or SC-FDMA symbols and a plurality of resource blocks in frequency domain.

In LTE, one resource block includes 12 subcarriers×7 (6) OFDM symbols or SC-FDMA symbols. A Transmission Time Interval (TTI), a unit time for data transmission, can be configured with one or more subframes. The structure of the radio frame is shown in for exemplary purposes only. Thus, the number of subframes included in the radio frame or the number of slots included in the subframe or the number of OFDM symbols or SC-FDMA symbols included in the slot may be modified in various manners.

FIG. 5 illustrates structures of downlink and uplink subframes for a 3GPP LTE system that is one of mobile communication systems.

Referring to FIG. 5(a), a downlink subframe includes two slots in time domain. A maximum of three OFDM symbols located in a front portion of a first slot within a downlink subframe correspond to a control region to be assigned with a control channel. The remaining OFDM symbols correspond to a data region to be assigned with a Physical Downlink Shared Channel (PDSCH).

Examples of downlink control channels used in the 3GPP LTE include a Physical Control Format Indicator Channel (PCFICH), Physical Downlink Control Channel (PDCCH), Physical Hybrid-ARQ Indicator Channel), etc. The PCFICH is transmitted at a first OFDM symbol of a subframe and carries information regarding the number of OFDM symbols (i.e., the size of the control region) used for transmission of control channels within the subframe. Control information transmitted through the PDCCH is referred to as downlink control information (DCI). The DCI includes uplink resource allocation information, downlink resource allocation information, an uplink transmit (Tx) power control command for arbitrary UE group, etc. The PHICH carries an acknowledgement (ACK)/not-acknowledgement (NACK) signal for uplink Hybrid Automatic Repeat Request (HARQ). That is, the PHICH carries an ACK/NACK signal in response to an uplink data transmitted by a UE.

A description will be given of a PDCCH.

The PDCCH may carry a resource allocation and transport format (DL grant) of a PDSCH, resource allocation information (UL grant) of a PUSCH, a set of Tx power control commands on individual UEs within an arbitrary UE group, activation of a Voice over Internet Protocol (VoIP), etc. A plurality of PDCCHs can be transmitted within a control region. A UE can monitor the plurality of PDCCHs. The PDCCH is configured with on an aggregation of one or several consecutive Control Channel Elements (CCEs) and can be transmitted through the control region after being subjected to subblock interleaving. The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information transmitted on the PDCCH is referred to as DCI. Table 1 shows DCI according to DCI formats.

TABLE 1

| DCI Format | Description |
| --- | --- |
| DCI format 0 | used for the scheduling of PUSCH |
| DCI format 1 | used for the scheduling of one PDSCH codeword |

TABLE 1-continued

| DCI Format | Description |
| --- | --- |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 corresponds to uplink resource allocation information, DCI format 1 and DCI format 2 correspond to downlink allocation information, and DCI format 3 and DCI format 3A correspond to an uplink transmit power control command on arbitrary UE groups.

Referring to FIG. 5(b), an uplink subframe can be divided in a frequency domain into a control region and a data region. The control region is allocated with a Physical Uplink Control channel (PUCCH) for carrying uplink control information. The data region is allocated with a Physical Uplink Shared Channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. The RB pair allocated to the PUCCH is frequency-hopped in a slot boundary.

Figure 6:
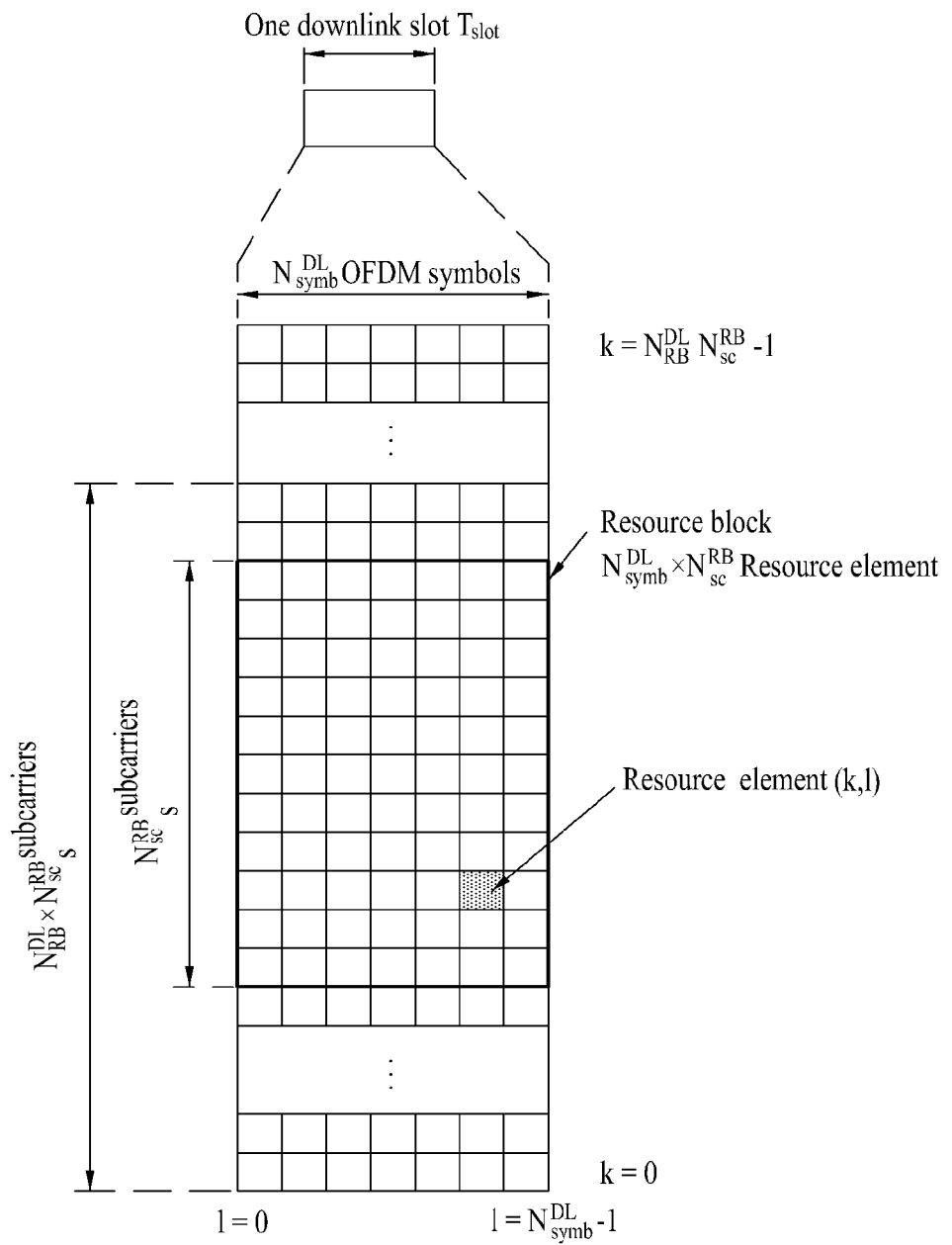
FIG. 6 illustrates a time-frequency resource grid structure for a downlink in a 3GPP LTE system.

FIG. 6 illustrates a time-frequency resource grid structure for a downlink in a 3GPP LTE system that is one of mobile communication systems.

Referring to FIG. 6, a downlink signal transmitted in each slot may be described by a resource grid including $N_{RB}^{DL} * N_{sc}^{RB}$ subcarriers and $N_{symb}^{DL}$ OFDM symbols. Here, $N_{RB}^{DL}$ represents the number of RBs in a DL slot and $N_{sc}^{RB}$ represents the number of subcarriers constituting one RB. $N_{symb}^{DL}$ represents the number of OFDM symbols in the downlink slot. $N_{RB}^{DL}$ depends on the downlink transmission bandwidth of a cell and must satisfy $N_{RB}^{min,DL} \leq N_{RB}^{DL} \leq N_{RB}^{max,DL}$. Here, $N_{RB}^{min,DL}$ denotes a minimum downlink bandwidth supported by a wireless communication system and $N_{RB}^{max,DL}$ denotes a maximum downlink bandwidth supported by the wireless communication system. While $N_{RB}^{min,DL}=6$ and $N_{RB}^{max,DL}=110$, they are not limited thereto. The number of OFDM symbols included in one slot may depend on a Cyclic Prefix (CP) length and a subcarrier interval. In the case of multi-antenna transmission, one resource grid can be defined per antenna port.

Each Resource Element (RE) in the resource grid for each antenna port may be uniquely identified by an index pair (k, l) in a slot. Here, k is a frequency-domain index and has one of values of $0, \ldots, N_{RB}^{DL} N_{sc}^{RB}-1$, and l is a time-domain index and has one of values of $0, \ldots, N_{symb}^{DL}-1$.

The RB shown in FIG. 6 is used to describe mapping relation between a certain physical channel and REs. The RB can be divided into a Physical Resource Block (PRB) and a Virtual Resource Block (VRB).

The PRB is defined as $N_{symb}^{DL}$ consecutive OFDM symbols in the time domain and $N_{sc}^{RB}$ subcarriers in the frequency domain. $N_{symb}^{DL}$ and $N_{sc}^{RB}$ can be predetermined values. For example, $N_{symb}^{DL}$ and $N_{sc}^{RB}$ can be given as shown in Table 2. Accordingly, one PRB includes $N_{symb}^{DL} \times N_{sc}^{RB}$ REs. One PRB may correspond to one slot in the time domain and correspond to 180 kHz, but the PRB is not limited thereto.

TABLE 2

| Configuration | | $N_{sc}^{RB}$ | $N_{symb}^{DL}$ |
|---|---|---|---|
| Normal cyclic prefix | Δf = 15 kHz | 12 | 7 |
| | Δf = 15 kHz | | 6 |
| Extended cyclic prefix | Δf = 7.5 kHz | 24 | 3 |

The PRB has a value ranging from 0 to $N_{RB}^{DL}-1$ in the frequency domain. The relationship between a PRB number $n_{PRB}$ and RE (k,l) within one slot in the frequency domain satisfies $$n_{PRB} = \left\lfloor \frac{k}{N_{sc}^{RB}} \right\rfloor.$$

The VRB and the PRB have the same size. The VRB can be divided into a Localized VRB (LVRB) and a Distributed VRB (DVRB). For the VRB of each type, a single VRB number $n_{VRB}$ is allocated to a pair of VRBs in two slots within one subframe. In other words, $N_{RB}^{DL}$ VRBs belonging to the first slot of two slots that constitute one subframe are allocated with one of indexes of 0 to $N_{RB}^{DL}-1$, and $N_{RB}^{DL}$ VRBs belonging to the second slot of the two slots are also allocated with one of the indexes of $N_{RB}^{DL}-1$.

A description will be given of a MIMO technology. The MIMO technology is an abbreviation of the Multi-Input Multi-Output technology. The MIMO technology uses multiple transmission (Tx) antennas and multiple reception (Rx) antennas to improve the efficiency of Tx/Rx data, whereas a previously conventional technique has generally used a single Tx antenna and a single Rx antenna. In other words, the MIMO technology allows a transmission end or reception end of a wireless communication system to use multiple antennas, so that the capacity or performance can be improved. For the convenience of description, the term "MIMO" can also be considered to be a multi-antenna technology.

In more detail, the MIMO technology is not dependent on a single antenna path to receive a single total message, collects a plurality of data pieces received via several antennas, and completes total data. As a result, the MIMO technology can increase a data transfer rate within a specific range, or can increase a system range at a specific data transfer rate.

The next-generation mobile communication technology requires a higher data transfer rate than that of a conventional mobile communication technology, so that it is expected that the effective MIMO technology is requisite for the next-generation mobile communication technology. Under this assumption, the MIMO communication technology is the next-generation mobile communication technology to be applied to mobile communication terminals or repeaters, and can extend the range of a data communication range, so that it can overcome the limited amount of transfer data of other mobile communication systems due to a variety of limited situations.

In the meantime, the MIMO technology from among a variety of technologies capable of improving the transfer efficiency of data can greatly increase an amount of communication capacity and Tx/Rx performances without allocating additional frequencies or increasing an additional power. Due to these technical advantages, most companies or developers area intensively paying attention to this MIMO technology.

Figure 7:
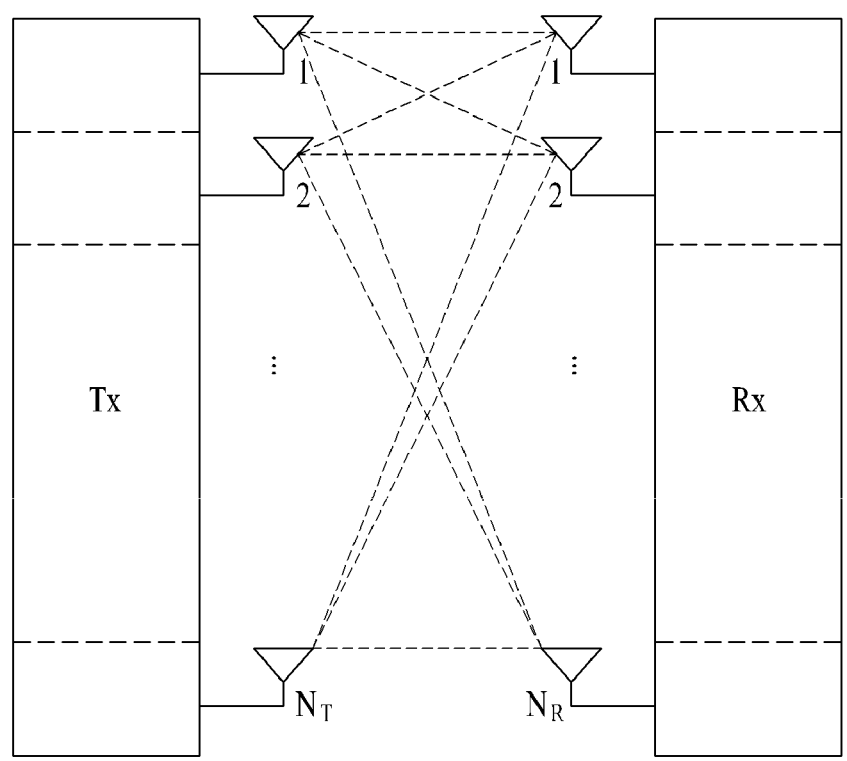
FIG. 7 illustrates Multiple Input Multiple Output (MIMO) communication system modeling.

FIG. 7 illustrates a general MIMO communication system. Referring to FIG. 7, if the number of Tx antennas increases to $N_T$, and at the same time the number of Rx antennas increases to $N_R$, a theoretical channel transmission capacity of the MIMO communication system increases in proportion to the number of antennas, differently from the above-mentioned case in which only a transmitter or receiver uses several antennas, so that a transfer rate and a frequency efficiency can greatly increase. In this case, the transfer rate acquired by the increasing channel transmission capacity is equal to the multiplication of a maximum transfer rate (Ro) acquired when a single antenna is used and a rate increment (Ri), and can theoretically increase. The rate increment (Ri) can be represented by the following Equation 1:

$$R_i = \min(N_T, N_R) \qquad \text{[Equation 1]}$$

A mathematical modeling of a communication method for use in the above-mentioned MIMO system will hereinafter be described in detail.

Firstly, as can be seen from FIG. 7, it is assumed that $N_T$ Tx antennas and $N_R$ Rx antennas exist.

In the case of a Tx signal, a maximum number of transmission information pieces is $N_T$ under the condition that $N_T$ Tx antennas are used, so that the Tx signal can be represented by a specific vector shown in the following Equation 2:

$$s = [s_1, s_2, \ldots, s_{N_T}]^T \qquad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, $\hat{s}$ is a diagonal matrix of a transmission power, and can be represented by the following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

The information vector having an adjusted transmission power is multiplied by a weight matrix W, so that $N_T$ transmission (Tx) signals $x_1, x_2, \ldots, x_{N_T}$ to be actually transmitted are configured. In this case, the weight matrix is adapted to properly distribute transmission information to individual antennas according to transmission channel situations. The above-mentioned transmission signals $x_1, x_2, \ldots, x_{N_T}$ can be represented by the following Equation 5 using the vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $w_{ij}$ is a weight between the i-th Tx antenna and the j-th Tx information, and W is a matrix indicating the weight. The matrix W is called a weight matrix or a precoding matrix.

In the mean time, the above-mentioned Tx signal (x) can be considered in different ways according to two cases, i.e., a first case in which the spatial diversity is used and a second case in which the spatial multiplexing is used.

In the case of using the spatial multiplexing, different signals are multiplexed and the multiplexed signals are transmitted to a destination, so that elements of the information vector s have different values. Otherwise, in the case of using the spatial diversity, the same signal is repeatedly transmitted via several channel paths, so that elements of the information vector s have the same value.

Needless to say, the combination of the spatial multiplexing scheme and the spatial diversity scheme may also be considered. In other words, the same signal is transmitted via three Tx antennas according to the spatial diversity scheme, and the remaining signals are spatially multiplexed and then transmitted to a destination. Next, if $N_R$ Rx antennas are used, Rx signals $y_1, y_2, \ldots, y_{N_R}$ of individual antennas can be represented by a specific vector y shown in the following Equation 6.

$$y = [y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a j-th Tx antenna and an i-th Rx antenna is denoted by $h_{ij}$. Notably, the index of an Rx antenna precedes the index of a Tx antenna in $h_{ij}$. The channels may be collectively represented as a vector or a matrix. An example of vector representation is described.

Figure 8:
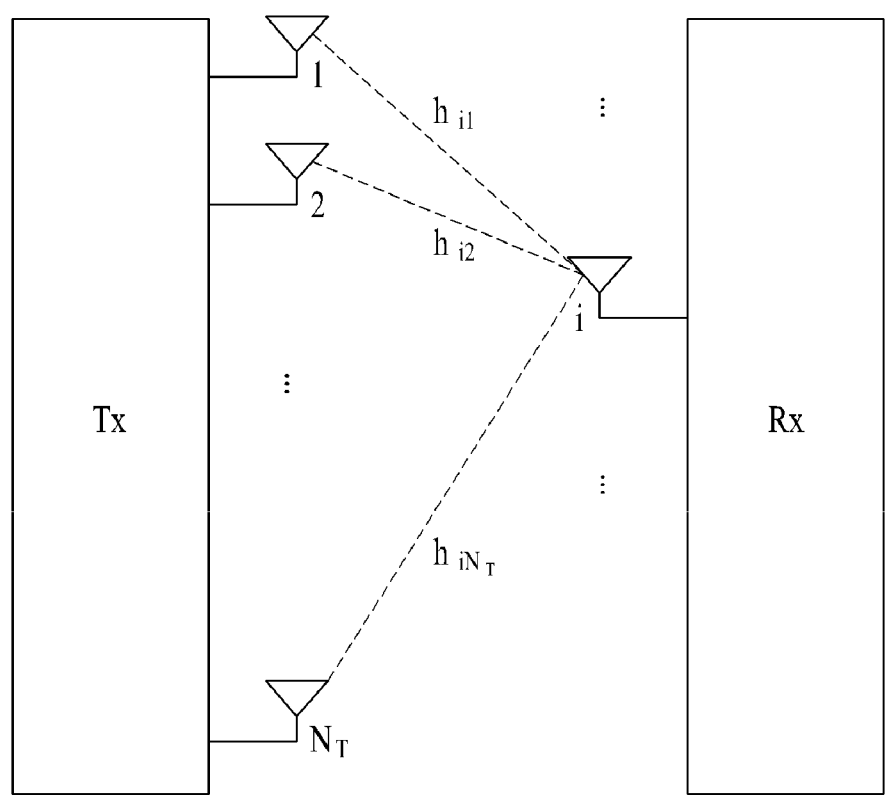
FIG. 8 illustrates channels between $N_T$ Tx antennas and Rx antenna i.

FIG. 8 illustrates a channel from $N_T$ Tx antennas to the i-th Rx antenna.

As shown in FIG. 8, the channels from the $N_T$ Tx antennas to the $i^{th}$ Rx antenna may be represented by the following Equation 7.

$$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be represented by the following Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is of size $N_R \times N_T$.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

On the other hand, the properties of precoding matrix can be observed. Channel matrix H without considering precoding matrix can be represented by the following Equation 12.

$$H = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 12]}$$

$$= [h_1 \ h_2 \ \ldots \ h_{N_T}]$$

In general, k-th received Signal to Interference Noise Ratio (SINR) $\rho_k$ is defined as the Equation 13 if given the Minimum Mean Square Error (MMSE) receiver.

$$\rho_k = SINR_k = h_k^H \left( N_0 I_{N_R} + \sum_{\substack{i=1 \\ i \neq k}}^{N_R} h_i h_i^H \right)^{-1} h_k \quad \text{[Equation 13]}$$

However, the effective channel $\tilde{H}$ reflecting on precoding matrix can be represented by using the W shown in the Equation 14.

$$\tilde{H} = HW = \begin{bmatrix} \vec{h}_1^T \\ \vec{h}_1^T \\ \vdots \\ \vec{h}_{N_R}^T \end{bmatrix} [w_1 \ w_2 \ \ldots \ w_{N_R}] = \quad \text{[Equation 14]}$$

$$\begin{bmatrix} \vec{h}_1^T w_1 & \vec{h}_1^T w_2 & \ldots & \vec{h}_1^T w_{N_R} \\ \vec{h}_2^T w_1 & \vec{h}_2^T w_2 & \ldots & \vec{h}_2^T w_{N_R} \\ \vdots & \vdots & \vdots & \vdots \\ \vec{h}_{N_R}^T w_1 & \vec{h}_{N_R}^T w_2 & \ldots & \vec{h}_{N_R}^T w_{N_R} \end{bmatrix} = [\tilde{h}_1 \ \tilde{h}_2 \ \ldots \ \tilde{h}_{N_T}]$$

Thus, the k-th effective received SINR $\rho_k$ is defined as the following Equation 15 on the assumption that the MMSE receiver is used.

$$\tilde{\rho}_k = SINR_k \quad \text{[Equation 15]}$$

$$= \tilde{h}_k^H \left( N_0 I_{N_R} + \sum_{\substack{i=1 \\ i \neq k}}^{N_R} \tilde{h}_i \tilde{h}_i^H \right)^{-1} \tilde{h}_k$$

$$= [w_k^H \vec{h}_1^* \ w_k^H \vec{h}_2^* \ \ldots \ w_k^H \vec{h}_{N_R}^*] \left( N_0 I_{N_R} + \sum_{\substack{i=1 \\ i \neq k}}^{N_R} \tilde{h}_i \tilde{h}_i^H \right)^{-1} \begin{bmatrix} \vec{h}_1^T w_k \\ \vec{h}_2^T w_k \\ \vdots \\ \vec{h}_{N_R}^T w_k \end{bmatrix}$$

Here, it is possible to observe some effectiveness on received SINR depending on variations of precoding matrix based on theoretical background. Firstly, it is possible to check on an effectiveness of the column permutation in one precoding matrix. In other words, in case of permutation between i-th column vector $w_i$ and j-th column vector $w_j$, permutated precoding matrix $\hat{W}$ can be represented by the following Equation 16.

$$W = [w_1 \ldots w_i \ldots w_j \ldots w_{N_R}]$$

$$\hat{W}[w_1 \ldots w_j \ldots w_i \ldots w_{N_R}] \quad \text{[Equation 16]}$$

Accordingly, the effective channel $\tilde{H}$ with precoding matrix W and the permutated effective channel $\hat{H}$ with precoding matrix $\hat{W}$ can be represented, respectively, by the Equation 17.

$$\tilde{H} = HW \quad \text{[Equation 17]}$$

$$= \begin{bmatrix} \vec{h}_1^T \\ \vec{h}_1^T \\ \vdots \\ \vec{h}_{N_R}^T \end{bmatrix} [w_1 \ \ldots \ w_i \ \ldots \ w_j \ \ldots \ w_{N_R}]$$

$$= \begin{bmatrix} \vec{h}_1^T w_1 & \ldots & \vec{h}_1^T w_i & \ldots & \vec{h}_1^T w_j & \ldots & \vec{h}_1^T w_{N_T} \\ \vec{h}_2^T w_1 & \ldots & \vec{h}_2^T w_i & \ldots & \vec{h}_2^T w_j & \ldots & \vec{h}_2^T w_{N_T} \\ \vdots & \vdots & \vdots & \vdots & \vdots & \vdots & \vdots \\ \vec{h}_{N_R}^T w_1 & \ldots & \vec{h}_{N_R}^T w_i & \ldots & \vec{h}_{N_R}^T w_j & \ldots & \vec{h}_{N_R}^T w_{N_T} \end{bmatrix}$$

$$= [\tilde{h}_1 \ \ldots \ \tilde{h}_i \ \ldots \ \tilde{h}_j \ \ldots \ \tilde{h}_{N_T}]$$

$$\hat{H} = H\hat{W}$$

$$= \begin{bmatrix} \vec{h}_1^T \\ \vec{h}_1^T \\ \vdots \\ \vec{h}_{N_R}^T \end{bmatrix} [w_1 \ \ldots \ w_j \ \ldots \ w_i \ \ldots \ w_{N_R}]$$

$$= \begin{bmatrix} \vec{h}_1^T w_1 & \ldots & \vec{h}_1^T w_j & \ldots & \vec{h}_1^T w_i & \ldots & \vec{h}_1^T w_{N_T} \\ \vec{h}_2^T w_1 & \ldots & \vec{h}_2^T w_j & \ldots & \vec{h}_2^T w_i & \ldots & \vec{h}_2^T w_{N_T} \\ \vdots & \vdots & \vdots & \vdots & \vdots & \vdots & \vdots \\ \vec{h}_{N_R}^T w_1 & \ldots & \vec{h}_{N_R}^T w_j & \ldots & \vec{h}_{N_R}^T w_i & \ldots & \vec{h}_{N_R}^T w_{N_T} \end{bmatrix}$$

$$= [\tilde{h}_1 \ \ldots \ \tilde{h}_j \ \ldots \ \tilde{h}_i \ \ldots \ \tilde{h}_{N_T}]$$

From Equation 17, even if two column vectors are permutated, received SINR value itself is not changed except order so that channel capacity/sum rate can be constant. So similar to Equations 14 and 15, the permutated effective channel and the k-th received SINR can be acquired.

$$\hat{H} = H\hat{W} \quad \text{[Equation 18]}$$

$$= \begin{bmatrix} \vec{h}_1^T \\ \vec{h}_1^T \\ \vdots \\ \vec{h}_{N_R}^T \end{bmatrix} [\hat{w}_1 \ \hat{w}_2 \ \ldots \ \hat{w}_{N_R}]$$

$$= \begin{bmatrix} \vec{h}_1^T \hat{w}_1 & \vec{h}_1^T \hat{w}_2 & \ldots & \vec{h}_1^T \hat{w}_{N_R} \\ \vec{h}_2^T \hat{w}_1 & \vec{h}_2^T \hat{w}_2 & \ldots & \vec{h}_2^T \hat{w}_{N_R} \\ \vdots & \vdots & \vdots & \vdots \\ \vec{h}_{N_R}^T \hat{w}_1 & \vec{h}_{N_R}^T \hat{w}_2 & \ldots & \vec{h}_{N_R}^T \hat{w}_{N_R} \end{bmatrix}$$

$$= [\hat{h}_1 \ \hat{h}_2 \ \ldots \ \hat{h}_{N_T}]$$

$$\hat{\rho}_k = SINR_k = \hat{h}_k^H \left( N_0 I_{N_R} + \sum_{\substack{i=1 \\ i \neq k}}^{N_R} \hat{h}_i \hat{h}_i^H \right)^{-1} \hat{h}_k \quad \text{[Equation 19]}$$

From Equation 19, it is noted that the interference and noise parts are equal to each other as shown in Equation 20.

$$\left(N_0 I_{N_R} + \sum_{\substack{i=1 \\ i \neq k}}^{N_R} \hat{h}_i \hat{h}_i^H\right)^{-1} = \begin{bmatrix} a_{11}^k & a_{12}^k & \cdots & a_{1N_R}^k \\ a_{21}^k & a_{22}^k & \cdots & a_{2N_R}^k \\ \vdots & \vdots & \vdots & \vdots \\ a_{N_R 1}^k & a_{N_R 2}^k & \cdots & a_{N_R N_R}^k \end{bmatrix}$$ [Equation 20]

Newly received SINR $\hat{\rho}_k$ can be represented by the following Equation 21.

$$\begin{aligned}\hat{\rho}_k &= SINR_k \\ &= \hat{h}_k^H \left(N_0 I_{N_R} + \sum_{\substack{i=1 \\ i \neq k}}^{N_R} \hat{h}_i \hat{h}_i^H\right)^{-1} \hat{h}_k \\ &= \hat{h}_k^H \begin{bmatrix} a_{11}^k & a_{12}^k & \cdots & a_{1N_R}^k \\ a_{21}^k & a_{22}^k & \cdots & a_{2N_R}^k \\ \vdots & \vdots & \vdots & \vdots \\ a_{N_R 1}^k & a_{N_R 2}^k & \cdots & a_{N_R N_R}^k \end{bmatrix} \hat{h}_k \\ &= \sum_{i=1}^{N_R} \sum_{j=1}^{N_R} \hat{w}_k \vec{h}_i^* \times a_{ij} \times \vec{h}_j^T \hat{w}_k \end{aligned}$$ [Equation 21]

Secondly, it is possible to check on effectiveness of multiplexing $e^{-j\theta}$ ($0 \leq \theta \leq 2\pi$) to a specific column vector in one precoding matrix. Simply, $\pm 1, \pm j$ can be possible values as some examples.

$\tilde{W}_k$ where $e^{-j\theta}$ is multiplexed to the k-th column can be represented by the following Equation 22.

$$\tilde{W}_k = e^{-j\theta} \hat{W}_k$$ [Equation 22]

Here, received SINR $\tilde{\rho}_k$ can be represented by the following Equation 23.

$$\begin{aligned}\tilde{\rho}_k &= \sum_{i=1}^{N_R} \sum_{j=1}^{N_R} \tilde{w}_k \vec{h}_i^* \times a_{ij} \times \vec{h}_j^T \tilde{w}_k \\ &= \sum_{i=1}^{N_R} \sum_{j=1}^{N_R} e^{+j\theta} \hat{w}_k \vec{h}_i^* \times a_{ij} \times \vec{h}_j^T e^{-j\theta} \hat{w}_k \\ &= \sum_{i=1}^{N_R} \sum_{j=1}^{N_R} \hat{w}_k \vec{h}_i^* \times a_{ij} \times \vec{h}_j^T \hat{w}_k \\ &= \hat{\rho}_k \end{aligned}$$ [Equation 23]

As a result of Equation 23, it is possible to observe that just multiplexing $e^{-j\theta}$ to the specific column vector in the precoding matrix is for nothing in the receive SINR and channel capacity/sum rate.

Figure 9:
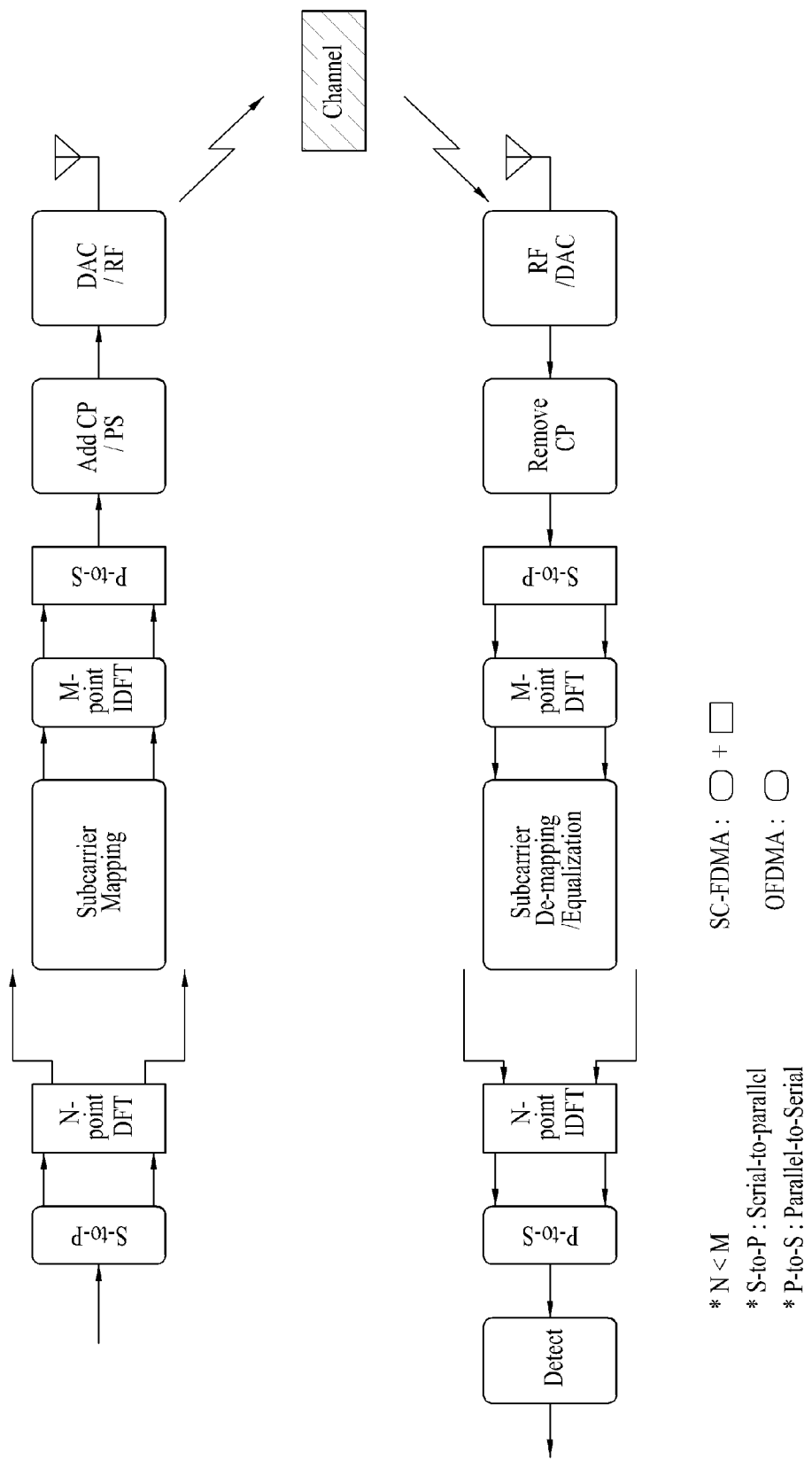
FIG. 9 illustrates a generic system structure for SC-FDMA and OFDMA.

FIG. 9 illustrates a generic system structure for OFDMA and SC-FDMA.

In a general MIMO antenna system based on OFDM or SC-FDMA, a data signal goes through complex mapping relations within a transmission symbol. First the data to be transmitted are separated into codewords. For most applications, a codeword will be equivalent to a transport block given by the Medium Access Control (MAC) layer. Each codeword is encoded separately using a channel coder such as Turbo Code or Tail biting convolutional code. After encoding, the codeword is rate matched to appropriate sizes, and then mapped to layers. For SC-FDMA transmission, Discrete Fourier Transform (DFT) precoding is done to each layer, and for OFDM transmission no DFT transform is applied as shown in FIG. 9.

Then DFT transformed signal in each layer is multiplied by the precoding vector/matrix and mapped to Tx antenna ports. Note that the Tx antenna ports can be one again mapped to actually physical antennas by means of antenna virtualization.

The general Cubic Metric (CM) of a single carrier signal (such as SC-FDMA transmission signals) is much lower than multi-carrier signals. This general concept is the same for Peak power to Average Power Ratios (PAPR) also. Both CM and PAPR are related to the dynamic range which the Power Amplifier (PA) of the transmitter must support. Under the same PA any transmission signal which has lower CM or PAPR then some other form of signal can be transmitted at a higher transmit power. Reversely, if the PA's maximum power is fixed and the transmitter wants to send a high CM or PAPR signal then it must reduce the transmit power slightly more than a low CM signal. The reason why single carrier signal has lower CM than multi-carrier signals that in multi-carrier signals multiple numbers of signals are overlapped and sometimes resulting in co-phase addition of signals. This possibility can make large signal amplitude. This is why OFDM system has large PAPR or CM values.

If the resulting signal y only consists of information symbol $x_1$, then this signal can be considered as single carrier signal like $y=x_1$. But if the resulting signal y consists of multiple information symbols $x_1, x_2, x_3, \ldots, x_N$, then the signal can be considered as multi-carrier signal such as $y=x_1+x_2+x_3+\ldots+x_N$. The PAPR or CM is proportional to the number of information symbols coherently added together in the resulting signal waveform, but the values tends to saturate after a certain number of information symbols. So if the resulting signal waveform is created by few additions of single carrier signals, then the CM or PAPR would be much less than multi-carrier signals but slightly higher than a pure single carrier signal.

Figure 10:
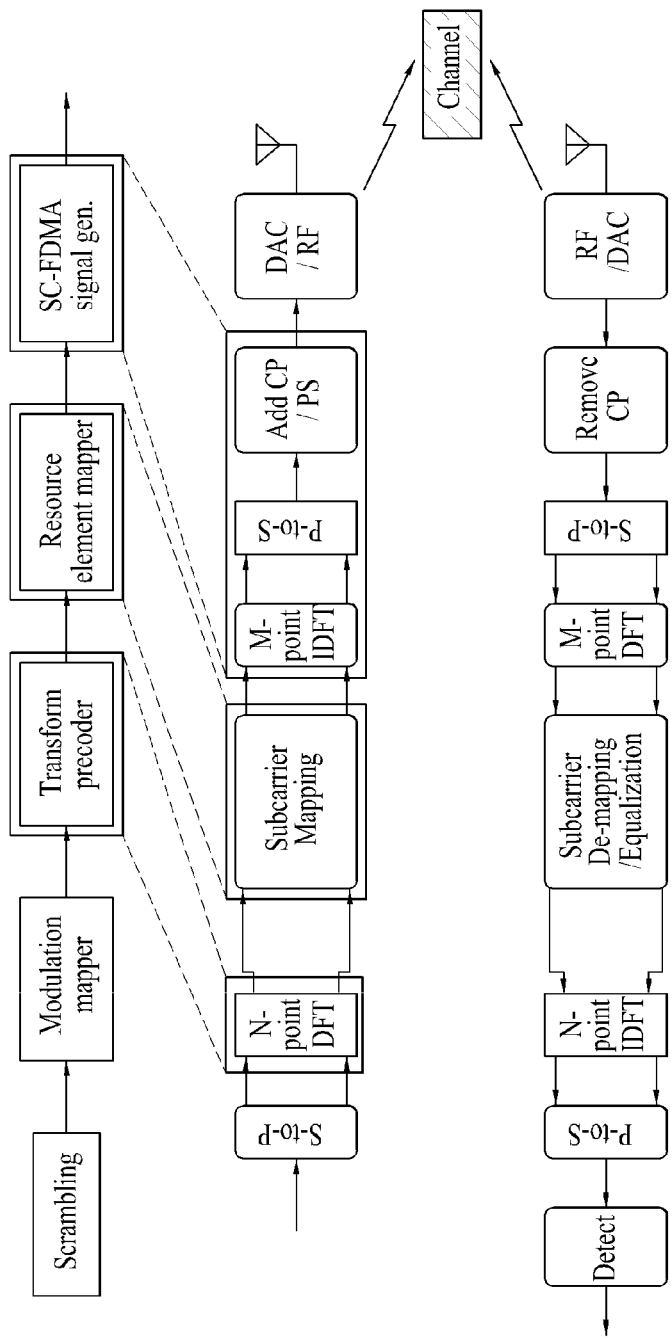
FIG. 10 illustrates an exemplary uplink SC-FDMA system structure for a 3GPP LTE system.
Figure 11:
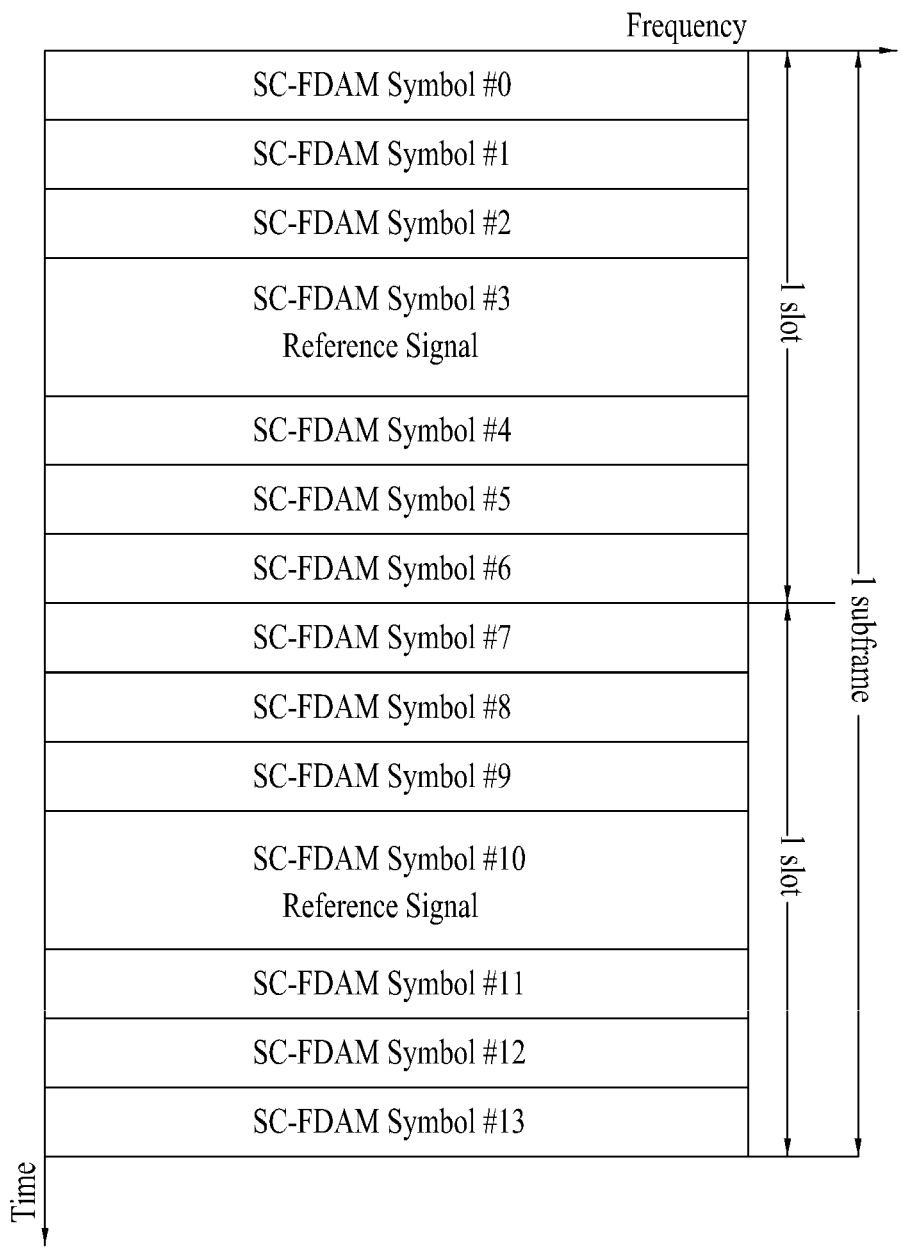
FIG. 11 illustrates an exemplary uplink SC-FDMA transmission frame structure for a 3GPP LTE system.

FIG. 10 illustrates an exemplary uplink SC-FDMA system structure for a 3GPP LTE system and FIG. 11 illustrates an exemplary uplink SC-FDMA transmission frame structure for the 3GPP LTE system.

In Rel-8 LTE system, the system structure and transmission frame for the uplink SC-FDMA are adopted as shown in FIG. 10 and FIG. 11. The basic transmission unit is one subframe. Two slots make up one subframe, and depending on Cyclic Prefix configuration (e.g. normal CP or extended CP) the number of SC-FDMA symbols in a slot is 7 or 6. In each slot there is at least one reference signal SC-FDMA symbol, which is not used for data transmission. Within a single SC-FDMA symbol there are multiple subcarriers. A Resource Element (RE) is a complex information symbol mapped to a single subcarrier. In the case DFT transform precoding is used, RE is the single information symbol mapped to a DFT transform index since DFT transform size and the number of subcarriers used in transmission is the same for SC-FDMA.

In LTE-A system, spatial multiplexing of up to four layers is considered for the uplink transmission. In the uplink single user spatial multiplexing, up to two transport blocks can be transmitted from a scheduled terminal in a subframe per uplink component carrier. Depending on the number of transmission layers, the modulation symbols associated with teach of the transport blocks are mapped onto one or two layers according to the same principle as in Rel-8 LTE downlink spatial multiplexing. Moreover, DFT-precoded OFDM is adopted as the multiple access scheme for uplink data transmission both in absence and presence of spatial multiplexing. In case of multiple component carriers, there is one DFT per component carrier. In LTE-A, in particular, both frequency-contiguous and frequency-non-contiguous resource allocation is supported on each component carrier.

Figure 12:
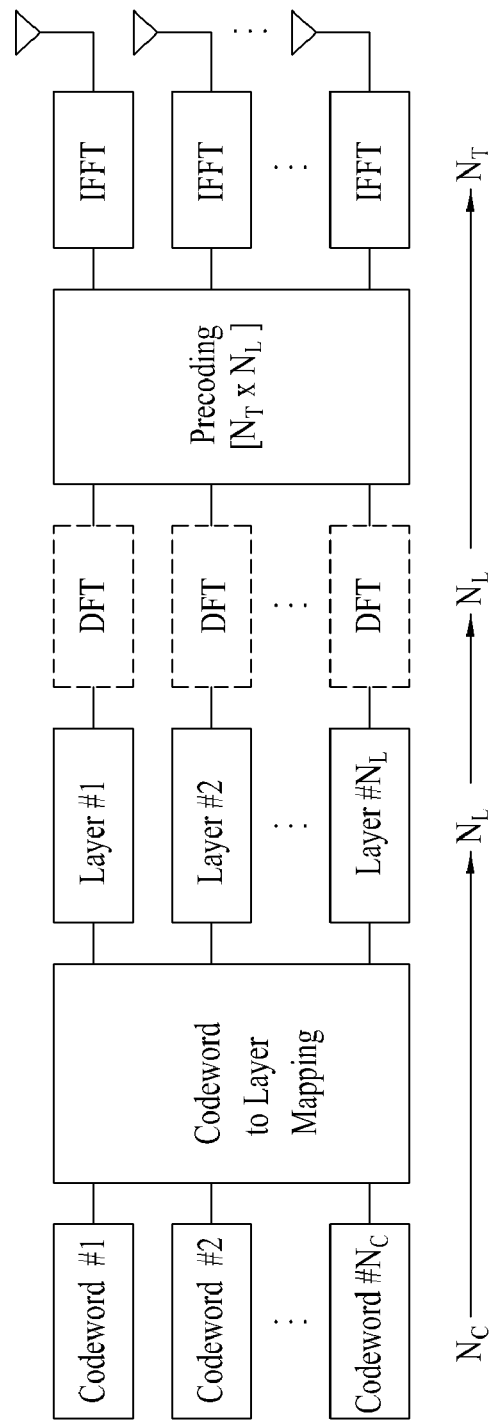
FIG. 12 illustrates an example of data signal mapping relation for a MIMO system based on SC-FDMA.

FIG. 12 illustrates an example of data signal mapping relation for a MIMO system based on SC-FDMA.

If the number of codewords is $N_C$ and the number of layers is $N_L$, $N_C$ number of information symbols or multiples of $N_C$ number of information symbols will be mapped to $N_L$ number of symbols or multiples of $N_L$. DFT transform precoding for SC-FDMA does not change the size of the layer. When precoding is performed to layers, the number of information symbols will change from $N_L$ to $N_T$, by the $N_T$ by $N_L$ matrix multiplication. Generally the transmission 'rank' of the spatially multiplexed data is equal to the number of layers conveying data in a given transmission instant ($N_L$ in the example of FIG. 12).

In order for future telecommunication systems to support extremely high data rates, such as 1 Gbps, higher rank data transmissions such as Rank 8 data transmission needs to be supported. For spatial layer multiplexed information to be correctly transmitted and received a well designed reference signal sequence for demodulation and channel estimation is needed. Considering control signal placement, and other reference signals needed for back IE measurements, the reference signal sequence for spatial layer multiplexed data information design is complex and difficult. The present invention proposes a method of inserting a dedicated reference signal sequence in RBs containing data information.

Figure 13:
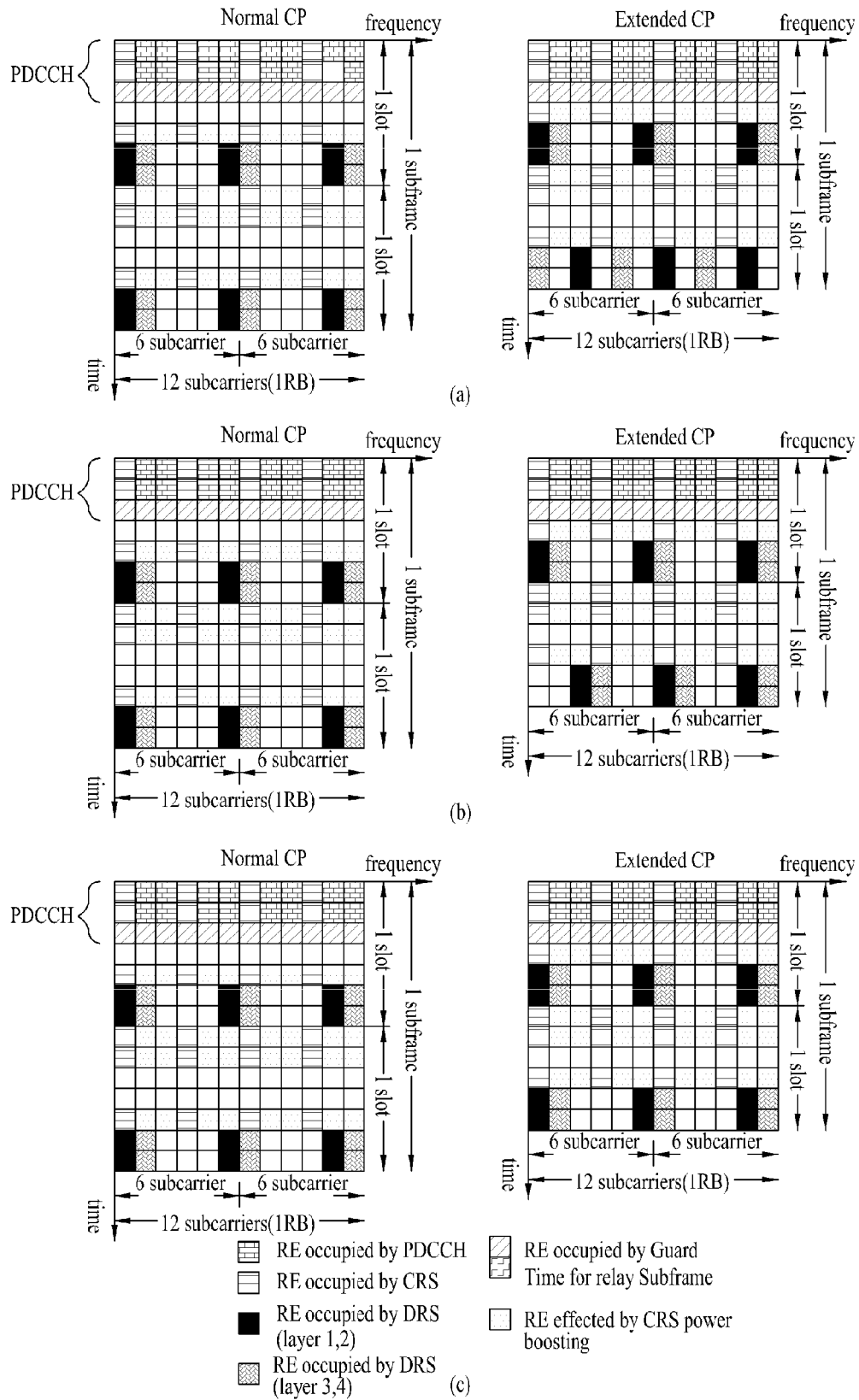
FIG. 13 illustrates exemplary reference signal patterns for a 3GPP LTE system.

In certain communication systems such as LTE, reference signals (RSs) for data demodulation and channel estimation for multiple spatial layers can be inserted in REs in a subframe as shown in FIG. 13.

A description will be given of an RS transmitted and received between a transmitter and a receiver in a mobile communication system.

In a wireless communication system, when a packet (or signal) is transmitted from a transmitter to a receiver, the packet may be distorted during the transmission in view of the nature of the radio channel. To receive the signal successfully, the receiver should compensate for the distortion of the received signal using channel information. To enable the receiver to acquire the channel information, a transmitter transmits a signal known to both the transmitter and the receiver and the receiver acquires knowledge of channel information based on the distortion of the signal received on the radio channel. This signal is called a reference signal or a pilot signal.

For packet transmission from the transmitter to the receiver, a single Tx antenna and a single Rx antenna have been generally used. However, most recent mobile communication systems improve transmission and reception data efficiency by adopting multiple Tx antennas and multiple Rx antennas. In case of data transmission and reception through multiple antennas for the purpose of capacity increase and communication performance improvement at the transmitter or the receiver of the mobile communication system, a reference signal exits for each Tx antenna. The receiver can successfully receive a signal transmitted from each Tx antenna using a reference signal for each Tx antenna.

In mobile communication systems, reference signals are largely categorized into two according to their usages. The reference signals include a reference signal for channel information acquisition and a reference signal for data demodulation. Since the former is used for a UE to acquire channel information to a downlink, it needs to be transmitted in a wide band, and received and measured by even a UE that receives no downlink data in a specific subframe. In addition, this reference signal for channel measurement can be used for handover measurement. The latter is transmitted by an eNode B with corresponding resources when the eNode B transmits a downlink signal. The UE can perform channel estimation and data demodulation by receiving this reference signal. The reference signal for data demodulation needs to be transmitted in a region in which data is transmitted.

Release-8 LTE system, one of mobile communication systems, defines two types of downlink reference signals for unicast service, that is, Common RS (CRS) for acquisition of information about channel status and measurement of handover and Dedicated RS (DRS) (corresponding to a UE-specific reference signal) used for data demodulation. In the Release-8 LTE system, the UE-specific RS is used only for data demodulation and the CRS is used for both channel information acquisition and data demodulation. The CRS is a cell-specific reference signal, and the eNode B transmits the CRC for each subframe over the wideband. A CRS is transmitted for a maximum of four antenna ports according to the number of Tx antennas of the eNode B. For example, a CRS for antenna ports #0 and #1 is transmitted when the number of Tx antennas of the eNode B is 2 whereas a CRS for antenna ports #0 and #3 is transmitted when the number of Tx antennas of the eNode B is 4.

FIGS. 13(a), 13(b) and 13(c) illustrate exemplary RS patterns for a 3GPP LTE system.

FIGS. 13(a), 13(b) and 13(c) show RS placement within one RB. Within the RB, there can be multiple RSs transmitted for different purposes. A Common Reference Signal (CRS) shown in FIG. 13 is a cell common reference signal, which is transmitted across the entire system bandwidth. The CRS can be used for demodulation of data transmissions, channel estimation, channel tracking, cell detection, and ext purposes. A Dedicated Reference Signal (DRS) is the reference signal which can be used for data demodulation and it is only transmitted in RBs in which a UE is receiving data transmissions in. The DRS is transmitted as an UE specific signal, so the UE may not be aware of DRS transmissions of other UEs in general. In order to support up to N spatial layer data transmissions, there should be up to N DRSs.

In the examples below, it is assumed that the system supports up to 8 spatial layer data transmissions. For the system to support good Multi-User MIMO (MU-MIMO) transmissions the DRS transmitted for each UE should be eight orthogonal or have very good correlation properties. Additionally, the system supporting up to 8 layers will be able to transmit a DRS for each layer, where different combinations of UEs may exclusively use one or more layers for its data transmission. DRS may be called Data Demodulation RS (DM RS) in LTE-A system.

DRS for each layer can be multiplexed in several methods. These methods can be a combination of Code Division Multiplexing (CDM), Frequency Division Multiplexing (FDM), and Time Division Multiplexing (TDM). FIGS. 13(a), 13(b) and 13(c) show examples of CDM and FDM based DRS multiplexing. Considering 12 REs for layer 1 and layer 2 (DRS layers 3 and 4 or even layers 5, 6, 7 and 8 will follow similar methods of mapping a DRS sequence), 12 REs within a single RB is as shown in FIG. 14.

Figure 14:
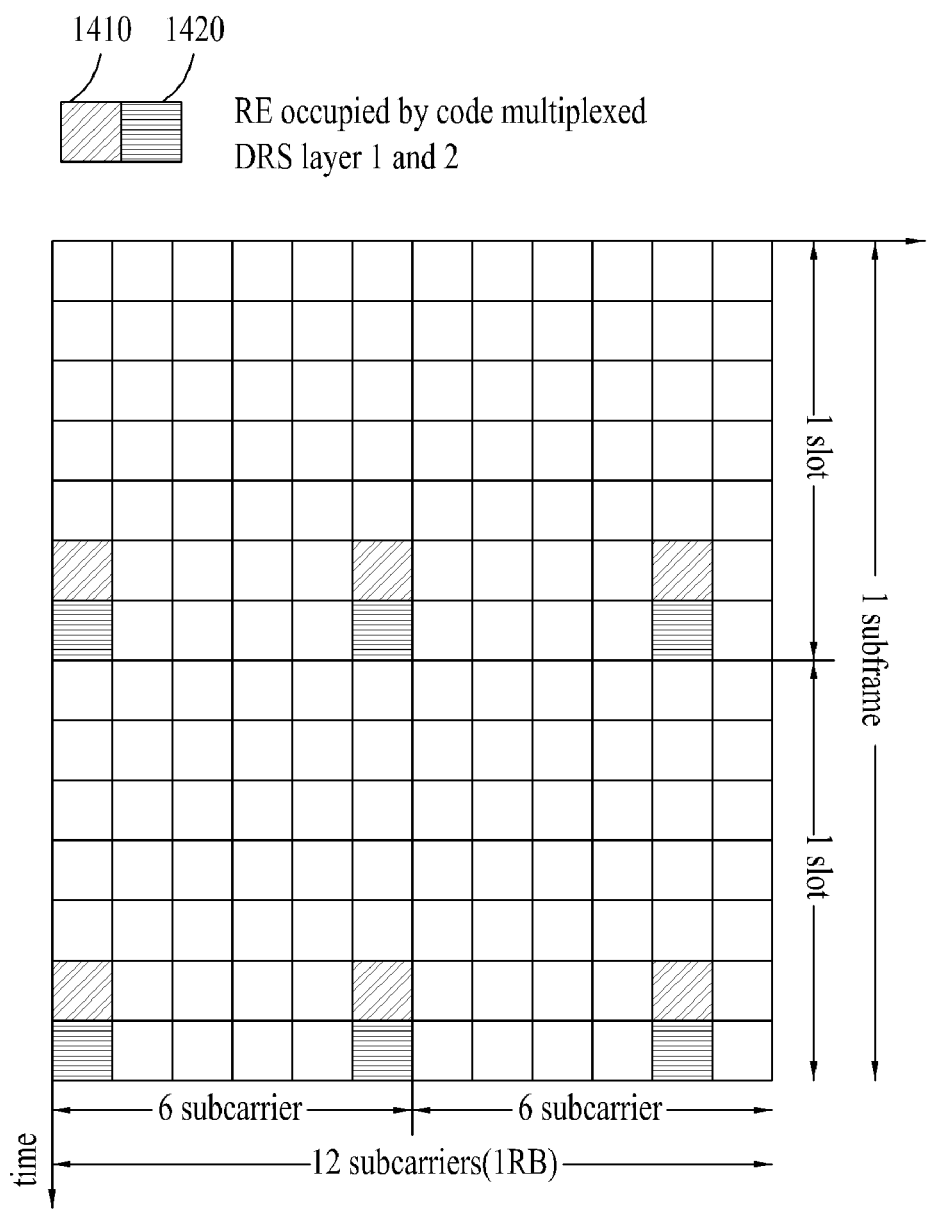
FIG. 14 illustrates an exemplary RE pattern that is code multiplexed for DRS layers 1 and 2 within a RB.

FIG. 14 illustrates an exemplary RE pattern occupied by code multiplexed DRS layers 1 and 2 in a single RB.

Referring to FIG. 14, a code such as Walsh-Hadamard code can be applied on REs 1410 and 1420 (i.e., multiply +1 on RE 1410 and multiply +1 on RE 1420 or multiply +1 on RE 1410 and multiply −1 on RE 1420 so that two consecutive REs in time domain re multiplied by Walsh code). A description will be made of a method on how an actual DRS sequence is going to be applied to each DRS RE. In general, RBs allocated for a certain UE can be a subset of the entire RB available for use in the system.

Figure 15:
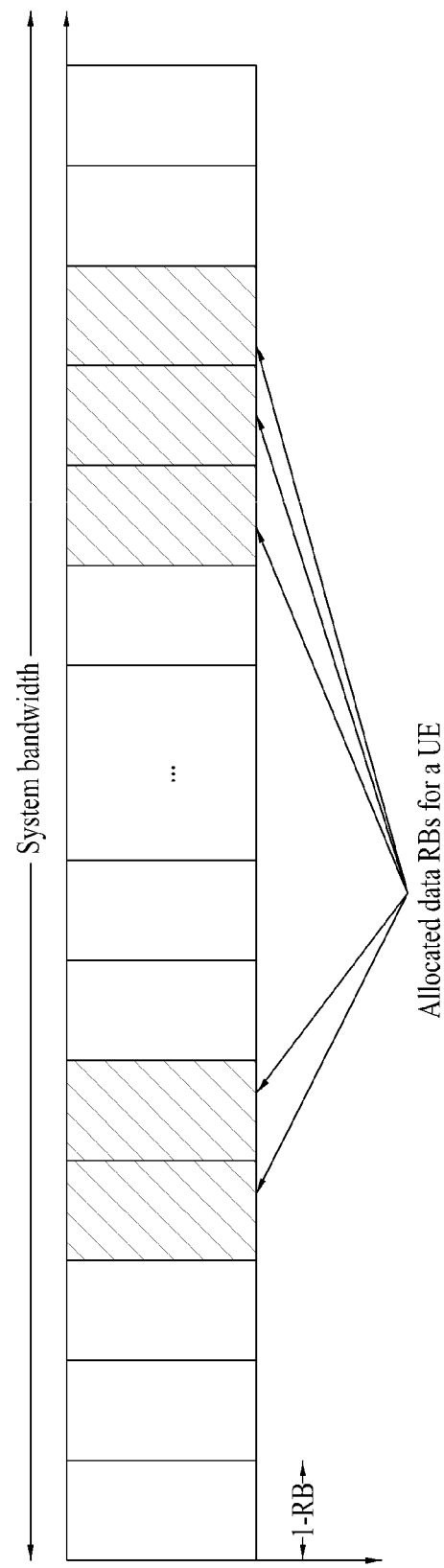
FIG. 15 illustrates an exemplary method for generating a DRS sequence.

FIG. 15 illustrates an exemplary method for generating a DRS sequence.

Referring to FIG. 15, in the entire system bandwidth, some RBs can be allocated to a specific UE for scheduling, for example. As shown in FIG. 15, an eNode B can generate DRS sequences to be equal to the RB size corresponding to the entire system bandwidth. The eNode B can perform scheduling for the specific UE using a DRS sequence corresponding to RBs allocated to the UE from among all the generated DRS sequences.

FIG. 16 illustrates another exemplary method for generating a DRS sequence.

Referring to FIG. 16, distinguished from the DRS sequence generation method shown in FIG. 15, the eNode B can generate a DRS sequence to be equal to the size of data RBs allocated to a specific UE. In this case, the eNode B can schedule a plurality of UEs allocated with different RBs through spatial domain multiplexing such as MU-MIMO. When spatial-domain-multiplexed UEs are allocated with different RBs, the DRS sequence used for each UE is generated so that the sequence used in the spatially multiplexed RB will be different.

As shown in FIG. 16(a), portions represented by slash lines are RBs allocated to transmit a DRS to a specific UE. The eNode B can generate a DRS sequence by applying RS sequence to be equal to the size of data RBs allocated to a specific UE.

FIG. 16(b) shows a case in which the eNode B generates different DRS sequences for each of the UEs UE1 and UE2. In this case, the DRS for each IE will not be orthogonal and result in poor channel estimation and finally performance loss. In order to utilize orthogonal DRS for each transmission layer for multiple UEs, the DRS for code-multiplexed layers need to have the same sequence. In case the DRS for frequency multiplexed layers there is no necessity to have the same sequence.

Figure 17:
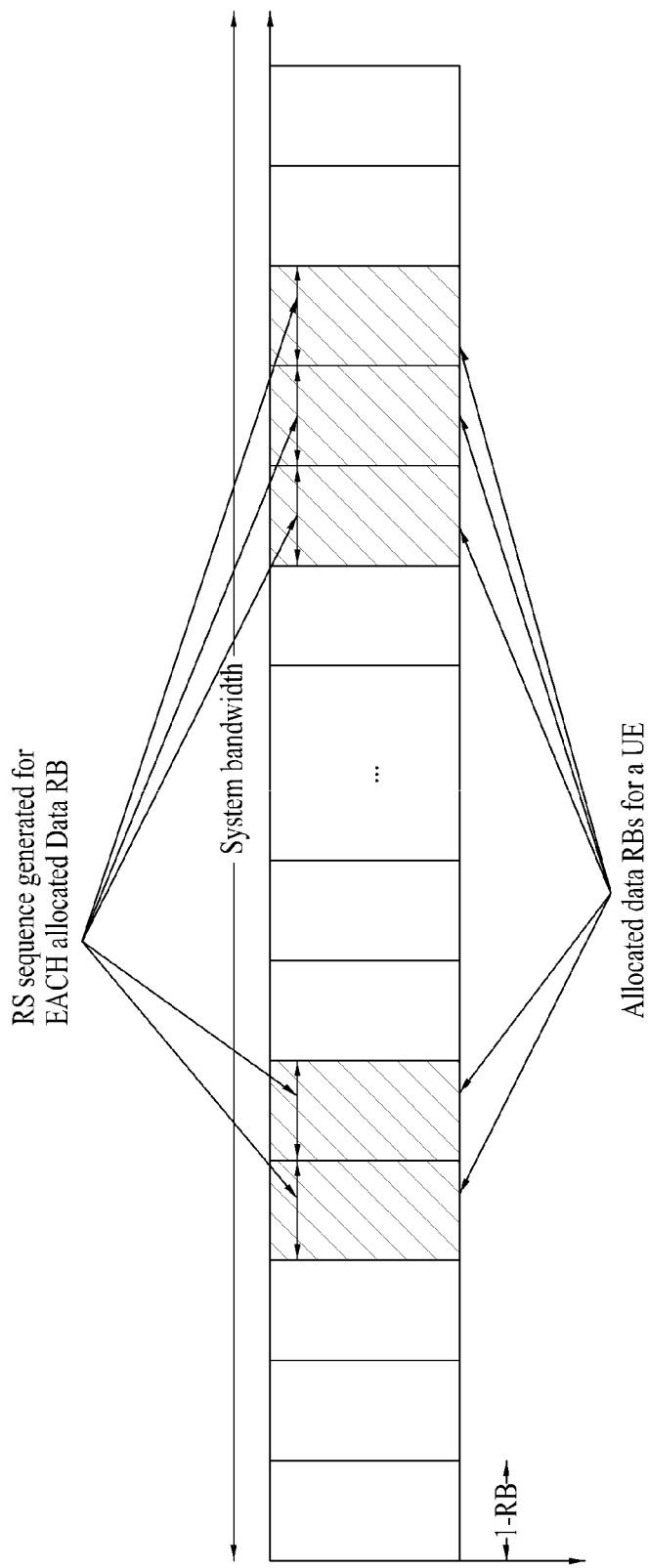
FIG. 17 illustrates an exemplary method for generating a DRS sequence.

FIG. 17 illustrates an exemplary method for generating a DRS sequence.

There is a method of generating a DRS sequence for each of allocated RBs. The sequence used for a DRS can be generated for each allocated RB. In order to randomize a sequence pattern used in each RB, a different DRS sequence is generated for each RB. One of the ways of generating different sequences for different RBs is to put an RB index as part of an initialization value of a sequence generation function.

Figure 18:
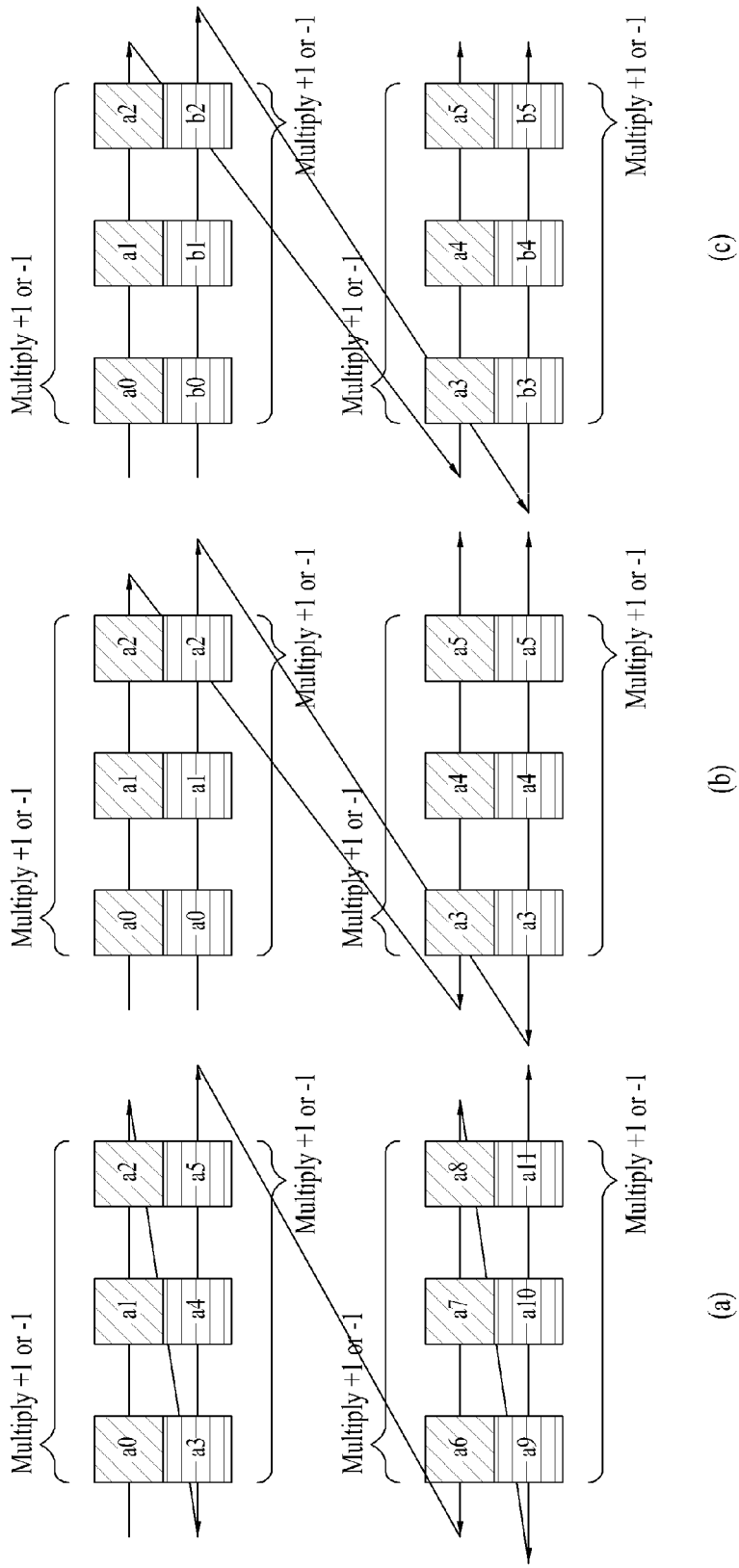
FIG. 18 illustrates exemplary methods for generating a sequence within a RB.

A description will be given of three methods of adding (or inserting) a sequence for an RE set used for CDM within one RB with reference to FIG. 18.

FIGS. 18(a), 18(b) and 18(c) illustrate exemplary methods for generating a sequence within one RB.

Sequence generation methods shown in FIGS. 18(a), 18(b) and 18(c) generate the sequence for the RE set used for CDM within one RB.

A first sequence generation method as shown in FIG. 18(a) generates a single DRS sequence for code-multiplexed DRS RE layers. In this first sequence generation method, a long sequence is generated and mapped to DRS RE positions which are common to all CDM DRS layers. For each DRS layer, a different Walsh code is applied (Walsh covering) to give orthogonality between different DRS layers. The advantage of having a long sequence and having the possibility of different sequence element across Walsh code multiplied RE is that the DRS REs are effectively randomized and results in more randomized interference to other cells.

A second sequence generation method shown in FIG. 18(b) generates one or more DRS sequences for code-multiplexed DRS RE layers. In the second sequence generation method, a long sequence is generated and mapped to DRS RE positions where the same sequence is repeated on the resources in which Walsh code is going to be applied (Walsh spreading). The sequence for each layer can be different. For each DRC layer, a different Walsh code is applied to give orthogonality between different DRS layers. In this method, since the same sequence is repeated along the REs in which Walsh code is applied, different layers can have different DRS sequences and still have orthogonality between different DRS layers. This enables possible orthogonal DRS transmission even between different cells, where DRS sequence is different. In the second sequence mapping method, a layer index can be an input to a DRS sequence generation initialization value.

A third sequence generation method as shown in FIG. 18(c) is a hybrid method between the first and second sequence generation methods of FIGS. 18(a) and 18(b). Possibly different DRS sequences are mapped to DRS REs for each element of the Walsh code multiplied RE sets. In the example shown in FIG. 18(c), two different DRS sequences are mapped to DRS RE positions so that Walsh code is applied across different DRS sequences. In this method, it may be possible to configure the DRS sequences so that the second DS sequence is actually the same as the first DRS sequence. In the event that different DRS sequences are configured to be the same, the third sequence generation method can be seen as the second sequence generation method. In the event that the DRS sequences are different from each other, the third sequence generation method can be similar to the first sequence generation method. This method may be configured to randomize DRS interference between other cells and maintain orthogonality of DRS transmission between cells.

In the third sequence generation method, a layer index and possibly same or different DRS sequences between Walsh code multiplied RE set indicators can be an input to the DRS sequence generation initialization value.

Figure 19:
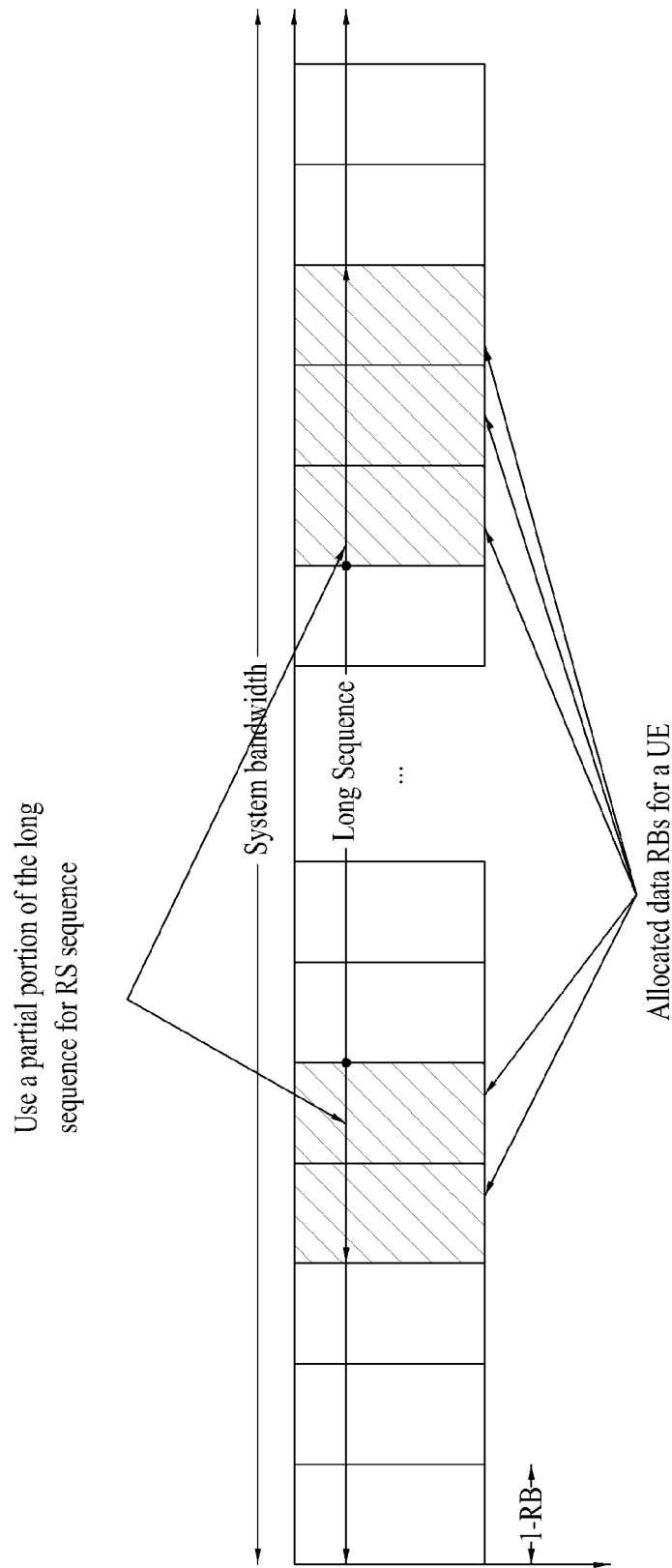
FIG. 19 illustrates an exemplary method for generating a DRS sequence.

FIG. 19 illustrates an exemplary method for generating a DRS sequence.

In the second method, the sequence used for DRS is generated for the entire system bandwidth and each allocated RB uses a sub-portion of the long DRS sequence. Three methods of inserting the sequence for an RE set used for CDM are described.

FIGS. 20(a), 20(b) and 20(c) illustrate exemplary methods for generating a sequence within one RB.

FIGS. 20(a), 20(b) and 20(c) show methods of inserting a sequence for an RE set used for CDM scheme within one RB.

A first sequence generation method is depicted in FIG. 20(a). A long DRS sequence is generated and a portion of the long DRS sequence is used for a DRS for a specific RB. The long DRS sequence can be mapped from the lowest frequency positioned subcarrier to the highest frequency positioned subcarrier. Depending on which RB is being used for data transmission, the DRS sequence for a certain RB will use a portion of the long DRS sequence which is already mapped to the entire system bandwidth. In the first sequence generation method, the same DRS sequence is used for different OFDM symbols in which a single set of Walsh code is multiplied (Walsh spreading). This allows different DRS sequences between layers and still gives orthogonality between DRS layers, and additionally gives DRS orthogonality between different cells.

In a second sequence generation method shown in FIG. 20(b), a long DRS sequence is generated and a portion of the long DRS sequence is used for a DRS for a specific RB. The long DRS sequence can be mapped from the lowest frequency positioned subcarrier to the highest frequency positioned subcarrier. Depending on which RB is being used for data transmission, the DRS sequence for a certain RB will use a portion of the long DRS sequence which is already mapped to the entire system bandwidth. In the second sequence generation method, possibly different DRS sequences are used for different OFDM symbols in which a single set of Walsh code is multiplied. In this case, the base DRS sequence for each of the layers which is code-division-multiplexed are the same, and different DRS layers use different Walsh codes on top of given base DRS sequence.

DRSs for different layers which are frequency division multiplexed can have base DRS sequences. The second sequence generation method can be applied by having a different DRS sequence for each OFDM symbol. A layer index, an OFDM symbol index, and possibly slot number (or subframe number) can be inputs to the long DRS sequence generation initialization value.

Additionally, for the second sequence generation method, the system can configure DRS sequences for different OFDM symbols to be the same so that the same DRS sequence is used for REs which are multiplied with a Walsh code set, as in the first sequence generation method shown in FIG. 20(a). In the example of FIG. 20(b), DRS sequences $b_i$ and $d_i$ can be same as DRS sequences $a_i$ and $c_i$ respectively. This enables the first sequence generation method shown in FIG. FIG. 20(a) to be configured just like the second sequence generation method shown in FIG. 20(b). In this case, the same or different DRS sequence for different OFDM symbol configuration indication can be an input to the DRS sequence generation initialization value.

A third sequence generation method shown in FIG. 20(c) is essentially an element by element multiplication of the first and second sequence generation methods. A DRS sequence generated by a method as shown in the left part of FIG. 20(c) corresponds to one RB and a DRS sequence generated by a method as shown in the right part of FIG. 20(c) also corresponds to one RB. Elements generated in RBs can be multiplied to newly generate a DRS sequence. In this case, generation of a DRS sequence for two RBs can be repeated. If the 3GPP LTE system has a system bandwidth corresponding to 12 RBs, the generation of a DRS sequence for two RBs can be repeated six times.

In this method, a Walsh spread RS sequence can be additionally scrambled by different RS sequences which have different sequence values in all REs. With this method, the interference randomization effect loss due to the Walsh spread RS sequence (same sequence over DRS OFDM symbols) is reduced due to the secondary RS sequence scrambling. The third sequence generation method can also be implemented by having two input fields to the sequence generation value which controls different sequence properties and a single RS sequence. The third sequence generation method is especially useful if groups of cells are cooperating so that the cells within a group share different Walsh codes and at the same time cells in a different group need to be randomized.

A description will be given of a sequence initialization value required to generate a DRS sequence.

In order to support efficient MU-MIMO, the DRS sequence cannot be initialized with UE ID, rather only be initialized with a combination of cell ID, subframe number (or slot number), OFDM symbol (within the subframe or slot) index, layer index, normal or extended CP indication, and etc (i.e. same or different DRS sequence for different OFDM symbol configuration indication). Additional sequence initialization parameters can be a layer index (numerated within the CDM DRS layers), and a frequency offset index (numerated between FDM DRS layers, in order to differentiate DRSs which are mapped to entirely different RE time-frequency position sets).

Additionally, the DRS sequence can be mapped to DRS layer REs in a way that the Walsh code either spreads the DRS sequence over time or the Walsh code is covered (multiplied) to DRS sequence. Since Walsh code spread sequence give better orthogonality property whereas Walsh covered sequence gives better cross-correlation property. It may be possible for the system to configure in method Walsh code is utilized in the DRS mapping process.

Here, it is assumed that all DRS sequences are generated with Pseudo random binary sequence generator. The pseudo-random sequences are defined by a length-31 Gold sequence. The output sequence c(n) of length $M_{PN}$, where n=0, 1, ..., $M_{PN}-1$, is defined by the following Equation 24.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 24]}$$

where $N_C=1600$ and the first m-sequence shall be initialized with $x_1(0)=1$, $x_1(n)=0$, $n=1, 2, \ldots, 30$.

The initialization of the second m-sequence is denoted by $c_{init}=\Sigma_{i=0}^{30} x_2(i) \cdot 2^i$ with the value depending on the application of the sequence. Here, $x_1(i)$ denotes the first m-sequence of the Gold sequence generator and $x_2(i)$ denotes the second m-sequence of the Gold sequence generator. Unless specified, the initialization value of the Gold sequence will depict the initialization value of the second m-sequence.

For all DRS sequence generation methods, the present invention proposes to have a layer index value which indicates which set of CDM RE set out of all CDM/FDM DRS RE sets is used as part of the sequence generation initialization value. Here, not all layer index indictor values must be different for all DRS layers. Some DRS layers can have the same layer index indictor. The layer index indicator can be represented as a frequency offset indicator.

In the first and second sequence generation methods illustrated in FIGS. 18(a) and 18(b), an available DRS sequence generation function and its initialization value can be represented by the following Equations 25 and 26.

$$r_{N_{rb}}(m) = w(m) \cdot \frac{1}{\sqrt{2}}(1 - 2 \cdot c(2m)) + \quad \text{[Equation 25]}$$

$$jw(m) \cdot \frac{1}{\sqrt{2}}(1 - 2 \cdot c(2m+1))$$

$$m = 0, 1, 2, \ldots, 11$$

Here, $N_{rb}$ denotes the resource block index of the corresponding PDSCH transmission, and w(m) denotes the Walsh code multiplied to the DRS sequence. An example of sequence initialization value, where ⌊ ⌋ denotes the floor function, ⌊$n_s/2$⌋ being a value smaller than or equal to $n_s/2$, is given by the following Equation 26.

$$c_{init}=2^{10} \cdot (10 \cdot N_{rb}+\lfloor n_s/2 \rfloor+1) \cdot (2N_{ID}^{cell}+1)+2^1 \cdot N_{ID}^{cell}+N_{FO} \quad \text{[Equation 26]}$$

In the third sequence mapping method illustrated in FIG. 18(c), an available DRS sequence generation function and its initialization value can be represented by the following Equations 27 and 28. Here, $N_{FO}$ is the function of DRS layer index and is used as a value that indicates a layer group differentiated by a frequency.

$$r_{l',N_{rb}}(m) = \quad \text{[Equation 27]}$$
$$w(m) \cdot \frac{1}{\sqrt{2}}(1 - 2 \cdot c(2m)) + jw(m) \cdot \frac{1}{\sqrt{2}}(1 - 2 \cdot c(2m+1))$$

Here, $N_{rb}$ denotes the resource block index of the corresponding PDSCH transmission, w(m) denotes the Walsh code multiplied to the DRS sequence, $N_{layer}$ is the layer index for the base DRS sequence, and l' is DRS sequence index which is function of the OFDM symbol index. It would be possible to use the same two DRS sequence indexes within a RB. Different DRS layers may have the same base sequence in order to apply Walsh code and give orthogonality between them. An exemplary sequence initialization value is given by the following Equation 28.

$$c_{init}=2^{10} \cdot (N_{rb}+N_{layer}\lfloor n_s/2 \rfloor+l'+1) \cdot (2N_{ID}^{cell}+1)+2^1 \cdot N_{ID}^{cell}+N_{FO} \quad \text{[Equation 28]}$$

Here, $n_s$ is the slot number within a radio frame, $N_{ID}^{cell}$ denotes physical layer cell ID, and $N_{FO}$ is the function of DRS layer index and denotes a value for discriminating different layer index groups from each other by frequencies.

In the first sequence generation method illustrated in FIG. 20(a), an available DRS sequence generation function and its initialization value can be represented by the following Equations 29 and 30. Equation 29 represents an example of generating a DRS sequence and Equation 30 represents an initial value for generating the DRS sequence.

$$r_{l,n_s}(m) = w_{l,n_s} \cdot \frac{1}{\sqrt{2}}(1 - 2 \cdot c(2m)) + \quad \text{[Equation 29]}$$
$$jw_{l,n_s} \cdot \frac{1}{\sqrt{2}}(1 - 2 \cdot c(2m+1)),$$
$$m = 0, 1, \ldots, 3N_{RB}^{max,DL} - 1$$

Here, l is the OFDM symbol number within a slot, $n_s$ is the slot number within one radio frame, and $w_{l,n_s}$ is the Walsh code multiplied by a scrambling code sequence applied to the OFDM symbol with index l having slot number $n_s$.

$$c_{init}=2^{26} \cdot N_{layer}+2^{10} \cdot (N_{dmrs} \cdot (\lfloor n_s/2 \rfloor+1)+l'+1) \cdot (2 \cdot N_{ID}^{cell}+1)+2^1 \cdot N_{ID}^{cell}+N_{FO} \quad \text{[Equation 30]}$$

Here, l' is DRS sequence index which is function of the OFDM symbol index, and $N_{layer}$ is the layer index for the base DRS sequence. Different DRS layers may have the same base sequence in order to apply Walsh code and give orthogonality between them. The DRS sequence index can be an index which numerates the OFDM symbols which contain DRS REs within the subframe. In case a certain DRS sequence in different OFDM symbols to have the same DRS sequence, l' value may be chosen to be the same, which results in same sequence to be generated. If two different DRS sequences are being used for a DRS layer within a RB then $N_{dmrs}$ can be a value such as 2. Certain layers have different base sequence layer information additionally inserted into the initialization value as represented by the following Equations 31 and 32.

$$r_{l,n_s}(m) = w_{l,n_s} \cdot \frac{1}{\sqrt{2}}(1 - 2 \cdot c(2m)) + \quad \text{[Equation 31]}$$
$$jw_{l,n_s} \cdot \frac{1}{\sqrt{2}}(1 - 2 \cdot c(2m+1)),$$
$$m = 0, 1, \ldots, 2N_{RB}^{max,DL} - 1$$

Here, $n_s$ is the slot number within a radio frame, $N_{ID}^{cell}$ is physical layer cell ID, and $w_{l,n_s}$ is the Walsh code multiplied to the sequence applied to the OFDM symbol with index l having slot number $n_s$. l is the OFDM symbol number within the slot.

Since the DRS is a dedicated reference signal, it may be no need to differentiate the sequence between normal CP and extended CP thus no CP information is input into the initialization value. An exemplary sequence initialization value can be given by the following Equation 32.

$$c_{init}=2^{10} \cdot (7 \cdot (n_s+1)+l+1) \cdot (2 \cdot N_{ID}^{cell}+1)+2^1 \cdot N_{ID}^{cell}+N_{FO} \quad \text{[Equation 32]}$$

Here, $n_s$ is the slot number within a radio frame, $N_{ID}^{cell}$ is physical layer cell ID, and $N_{FO}$ is the value for indicating a layer index group, which is a function of DRS layer index. Layer index groups can be differentiated by frequencies. That is, $N_{FO}$ is the frequency offset indictor (either 0 or 1) which is a function of DRS layer index. For systems with DRS layers, only up to two $N_{FO}$ values can be fixed to 0. Examples of $N_{FO}$ value are shown in the following Tables 3, 4 and 5.

TABLE 3

| Layer index (numerated from 1) | $N_{FO}$ value |
| --- | --- |
| 1, 2, 5, or 7 | 0 |
| 3, 4, 6, or 8 | 1 |

TABLE 4

| Layer index (numerated from 1) | $N_{FO}$ value |
| --- | --- |
| 1, 2, 5, or 6 | 0 |
| 3, 4, 7, or 8 | 1 |

TABLE 5

| Layer index (numerated from 1) | $N_{FO}$ value |
| --- | --- |
| 1, 2, 3, or 4 | 0 |
| 5, 6, 7, or 8 | 1 |

In the second sequence generation method illustrated in FIG. 20(b), an available DRS sequence generation function and its initialization value can be represented by the following Equations 33 and 34.

$$r_{l',n_s}(m) = w_{l',n_s} \cdot \frac{1}{\sqrt{2}}(1 - 2 \cdot c(2m)) + \quad \text{[Equation 33]}$$

$$jw_{l',n_s} \cdot \frac{1}{\sqrt{2}}(1 - 2 \cdot c(2m+1)),$$

$$m = 0, 1, \ldots, 3N_{RB}^{max,DL} - 1$$

Here, l' is the DRS sequence index which is a function of the OFDM symbol index, and $w_{l',n_s}$ denotes the Walsh code multiplied to DRS sequence index l' with slot number $n_s$.

$$c_{init} = 2^{10} \cdot (4 \cdot (\lfloor n_s/2 \rfloor + 1) + l' + 1) \cdot (2 \cdot N_{ID}^{cell} + 1) + 2^1 \cdot N_{ID}^{cell} + N_{FO} \quad \text{[Equation 34]}$$

Here, l' is the DRS sequence index which is a function of the OFDM symbol index. The DRS sequence index can be an index which numerates the OFDM symbols which contain DRS REs within the subframe. In case a certain DRS sequence in different OFDM symbols to have the same DRS sequence, l' value may be chosen to be the same, which results in same sequence to be generated. Certain layers have different base sequence layer information additionally inserted into the initialization value. This can be represented by the following Equation 35.

$$c_{init} = 2^{26} \cdot N_{layer} + 2^{10} \cdot (4 \cdot (\lfloor n_s/2 \rfloor + 1) + l' + 1) \cdot (2 \cdot N_{ID}^{cell} + 1) + 2^1 \cdot N_{ID}^{cell} + N_{FO} \quad \text{[Equation 35]}$$

The second sequence mapping method shown in FIG. 20(c) can be implemented in three ways.

A first implementation method is to have two Gold code sequences which are initialized by different initialization values. An example of generating a DRS sequence is represented by the following Equation 36.

$$r_{l',n_s}^1(m) = w_{l',n_s} \cdot \frac{1}{\sqrt{2}}(1 - 2 \cdot c(2m)) + \quad \text{[Equation 36]}$$

$$jw_{l',n_s} \cdot \frac{1}{\sqrt{2}}(1 - 2 \cdot c(2m+1)),$$

$$m = 0, 1, \ldots, 3N_{RB}^{max,DL} - 1$$

$$r_{l',n_s}^2(m) = w_{l',n_s} \cdot \frac{1}{\sqrt{2}}(1 - 2 \cdot c(2m)) +$$

$$jw_{l',n_s} \cdot \frac{1}{\sqrt{2}}(1 - 2 \cdot c(2m+1)),$$

$$m = 0, 1, \ldots, 3N_{RB}^{max,DL} - 1$$

$$r_{l',n_s}(m) = r_{l',n_s}^1(m) \cdot r_{l',n_s}^2(m)$$

Here, $r_{l',n_s}^1(m)$ and $r_{l',n_s}^2(m)$ are DRS sequences which re generated sing Gold sequences initialized with different initialization values, respectively.

The following is possible Gold Code initialization property for the first sequence $r_{l',n_s}^1(m)$.

1. Difference sequence each code division multiplexed layer
2. Different sequence each frequency division multiplexed layer
3. Same sequence between Walsh code multiplied REs
4. Different sequence between cells The initialization value for the first sequence $r_{l',n_s}^1(m)$ can be represented by one of the following Equations 37, 38 and 39.

$$c_{init}^1 = 2^{26} \cdot N_{layer} + 2^{10} \cdot (14 \cdot (\lfloor n_s/2 \rfloor + 1) + l' + 1) \cdot (2 \cdot N_{ID}^{cell} + 1) + 2^1 \cdot N_{ID}^{cell} + N_{FO} \quad \text{[Equation 37]}$$

$$c_{init}^1 = 2^{26} \cdot N_{layer} + 2^{10} \cdot (4 \cdot (\lfloor n_s/2 \rfloor + 1) + l' + 1) \cdot (2 \cdot N_{ID}^{cell} + 1) + 2^1 \cdot N_{ID}^{cell} + N_{FO} \quad \text{[Equation 38]}$$

$$c_{init}^1 = 2^{26} \cdot N_{layer} + 2^{10} \cdot (n_s + 1) \cdot (2 \cdot N_{ID}^{cell} + 1) + 2^1 \cdot N_{ID}^{cell} + N_{FO} \quad \text{[Equation 39]}$$

The following is possible Gold Code initialization property and for the second sequence $r_{l',n_s}^2(m)$.

1. Same sequence all code division multiplexed layers
2. Same or different sequence each frequency division multiplexed layer
3. Different sequence between Walsh code multiplied REs
4. Different sequence between cells The initialization value for the second sequence $r_{l',n_s}^2(m)$ can be represented by one of the following Equations 40, 41, 42 and 43.

$$c_{init}^2 = 2^{10} \cdot (14 \cdot (\lfloor n_s/2 \rfloor + 1) + l + 1) \cdot (2 \cdot N_1 + 1) + 2^1 \cdot N_1 \quad \text{[Equation 40]}$$

$$c_{init}^2 = 2^{10} \cdot (4 \cdot (\lfloor n_s/2 \rfloor + 1) + l'' + 1) \cdot (2 \cdot N_1 + 1) + 2^1 \cdot N_1 \quad \text{[Equation 41]}$$

$$c_{init}^2 = 2^{28} \cdot N_{FO} + 2^{10} \cdot (14 \cdot (\lfloor n_s/2 \rfloor + 1) + l + 1) \cdot (2 \cdot N_1 + 1) + 2^1 \cdot N_1 \quad \text{[Equation 42]}$$

$$c_{init}^2 = 2^{28} \cdot N_{FO} + 2^{10} \cdot (4 \cdot (\lfloor n_s/2 \rfloor + 1) + l'' + 1) \cdot (2 \cdot N_1 + 1) + 2^1 \cdot N_1 \quad \text{[Equation 43]}$$

In the example, the initialization value for the second sequence expressed in equations 40 to 43 can be re-ordered and mapped. For example, as defined as following: $c_{init}^2 = \Sigma_{i=0}^{30} x_2(i) \cdot 2^{30-i}$. This is to allow different sequence generation between first and second sequences in order to create different sequences in case similar initialization values are created.

In the sequence generation method of FIG. 20(c), one of the RS sequences is initialized by a combination of cell ID, OFDM symbol index (or DRS OFDM symbol counter/index), layer index, and frequency offset index. The other RS sequence is initialized by a combination of $N_I$, OFDM symbol index (or DRS OFDM symbol counter/index). The first RS sequence will have the same RS sequence across the Walsh code multiplied REs, whereas the second RS sequence will not have the same RS sequence across the Walsh code multiplexed REs.

The value $N_I$ can be a Coordinated Multi-Point (COMP) cell identification number or a value that multiple cells share. The value $N_I$ needs to be signaled to the UE in order for the UE to correctly receive the RS sequence. This means that essential property of the first initialization value does not change over all the DRS included OFDM symbols, whereas the second initialization value changes over all the DRS included OFDM symbols.

Figure 21:
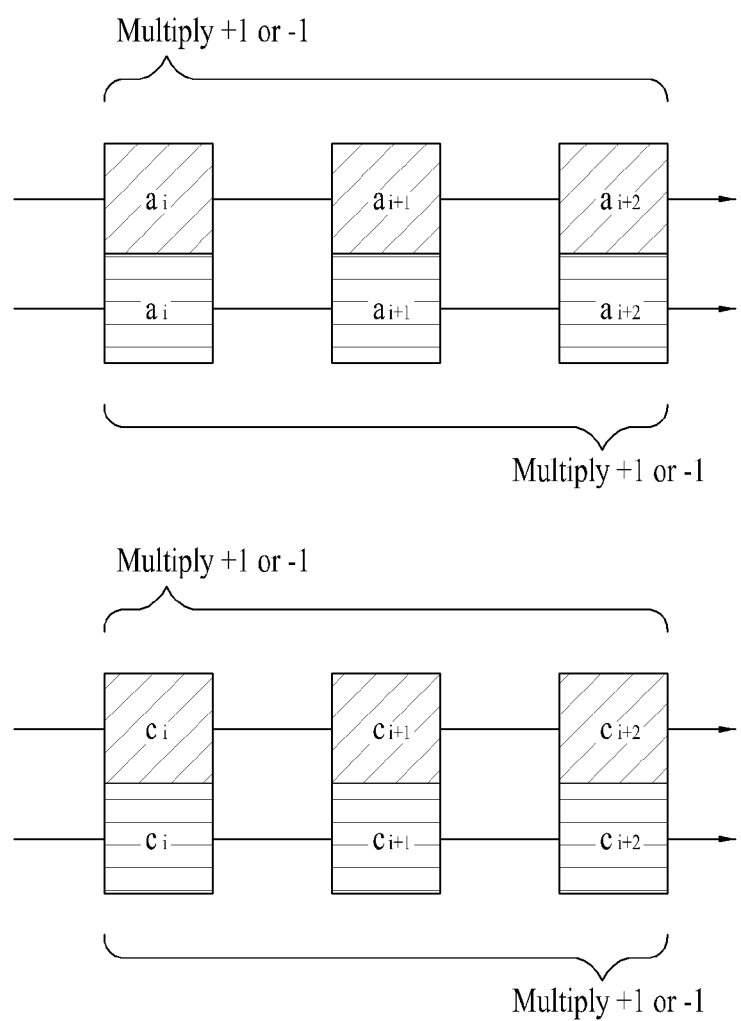
FIG. 21 illustrates an exemplary method for generating a DRS sequence within a RB.

FIG. 21 illustrates an exemplary method for generating a DRS sequence in one RB.

FIG. 21 shows a case in which different sequences are generated for layers and Walsh spreading is used. In FIG. 21, different sequences are used across all CDM DRS layers and different Walsh codes are used to keep orthogonality across DRS layers. Each sequence used for each CDM DRS layer is spread by Walsh code. This means that for a single RE set which is spread by Walsh code, the same sequence value is used other than the Walsh code element multiplication value.

Figure 22:
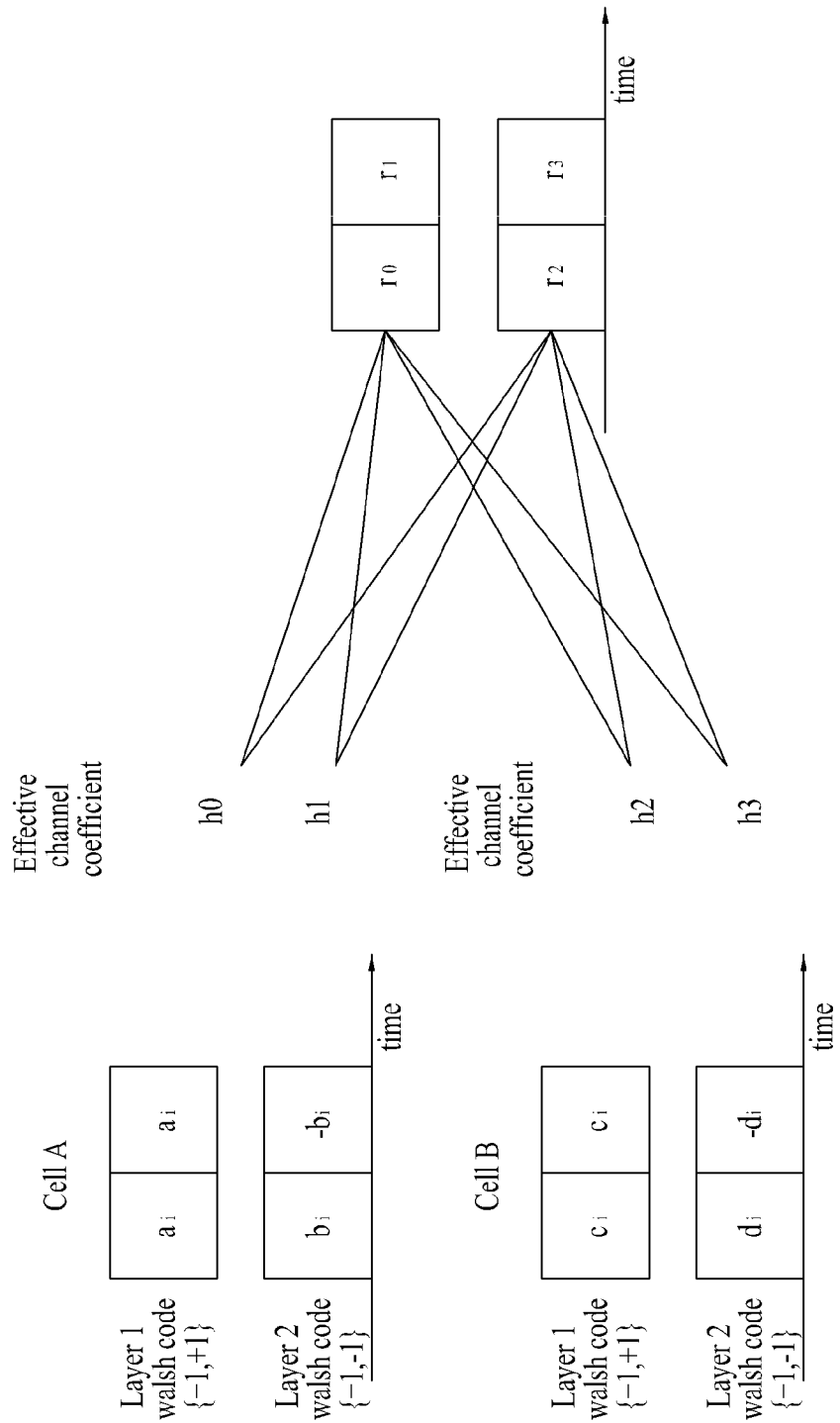
FIG. 22 illustrates an exemplary method for transmitting a DRS using a DRS sequence in the case of two cells.

FIG. 22 illustrates an exemplary method for transmitting a DRS using a DRS sequence for which two cells are generated.

The equation of a signal received by a receiver shown at the right of FIG. 22 and a channel estimated for a signal received at Rx antenna port can be represented by the following Equations 44 and 45.

$$r_0 = h_0 \cdot a_i + h_1 \cdot b_i + h_2 \cdot c_i + h_3 \cdot d_i + n_0$$

$$r_1 = h_0 \cdot a_i - h_1 \cdot b_i + h_2 \cdot c_i - h_3 \cdot d_i + n_1 \quad \text{[Equation 44]}$$

Here, $h_0$, $h_1$, $h_2$, and $h_3$ denote effective channel coefficients, $a_i$, and $b_i$ denote scrambling code sequences, and $n_0$ and $n_1$ denote noise.

$$\begin{aligned}
\tilde{h}_0 &= (r_0 + r_1) \cdot a_i^* / 2 \quad \text{[Equation 45]} \\
&= \begin{pmatrix} h_0 \cdot a_i + h_1 \cdot b_i + h_2 \cdot c_i + h_3 \cdot d_i + n_0 + \\ h_0 \cdot a_i - h_1 \cdot b_i + h_2 \cdot c_i - h_3 \cdot d_i + n_1 \end{pmatrix} \cdot a_i^* / 2 \\
&= (2h_0 \cdot a_i + 2h_2 \cdot c_i + n') \cdot a_i^* / 2 \\
&= h_0 + h_2 \cdot c_i \cdot a_i^* + n'' \\
&= h_0 + z_1 + n''
\end{aligned}$$

From Equations 44 and 45, it can be seen that the estimated effective channel efficient has only one interference coefficient $Z_1$. Thus, the effective channel coefficient estimated at the receiver is affected by the interference coefficient.

Figure 23:
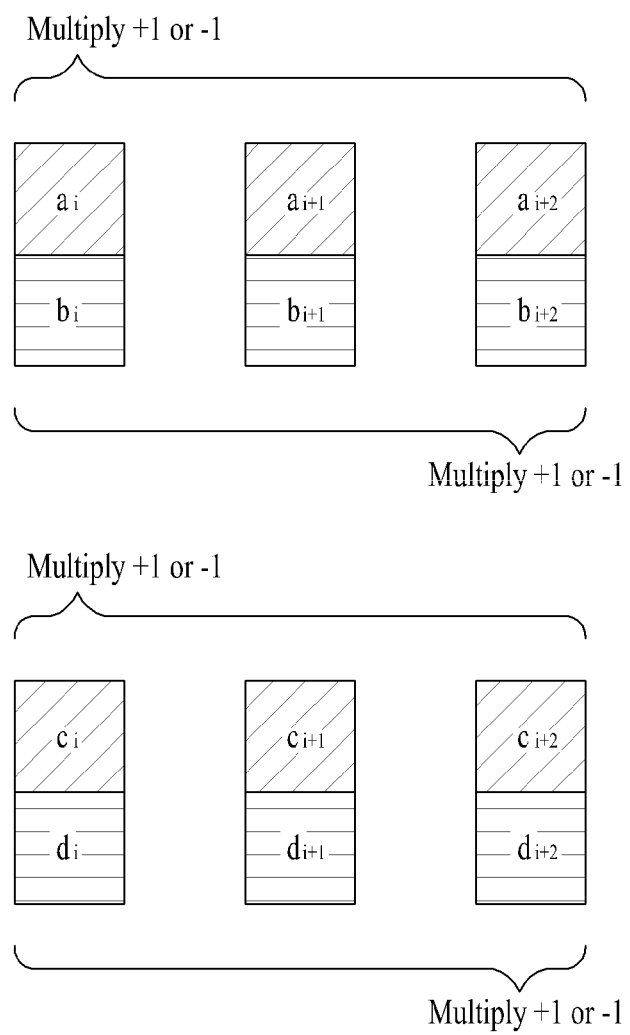
FIG. 23 illustrates an exemplary method for generating a sequence within a RB.

FIG. 23 illustrates an exemplary method for generating a sequence in one RB.

FIG. 23 shows a case in which the eNode B generates the same sequence for layers and uses Walsh spreading. In FIG. 23, different sequences are used across all CDM DRS layers and different Walsh codes are used to keep orthogonality across DRS layers. An example of sequence utilized in the method shown in FIG. 23 allows maximum inter-cell interference randomization between cells.

Figure 24:
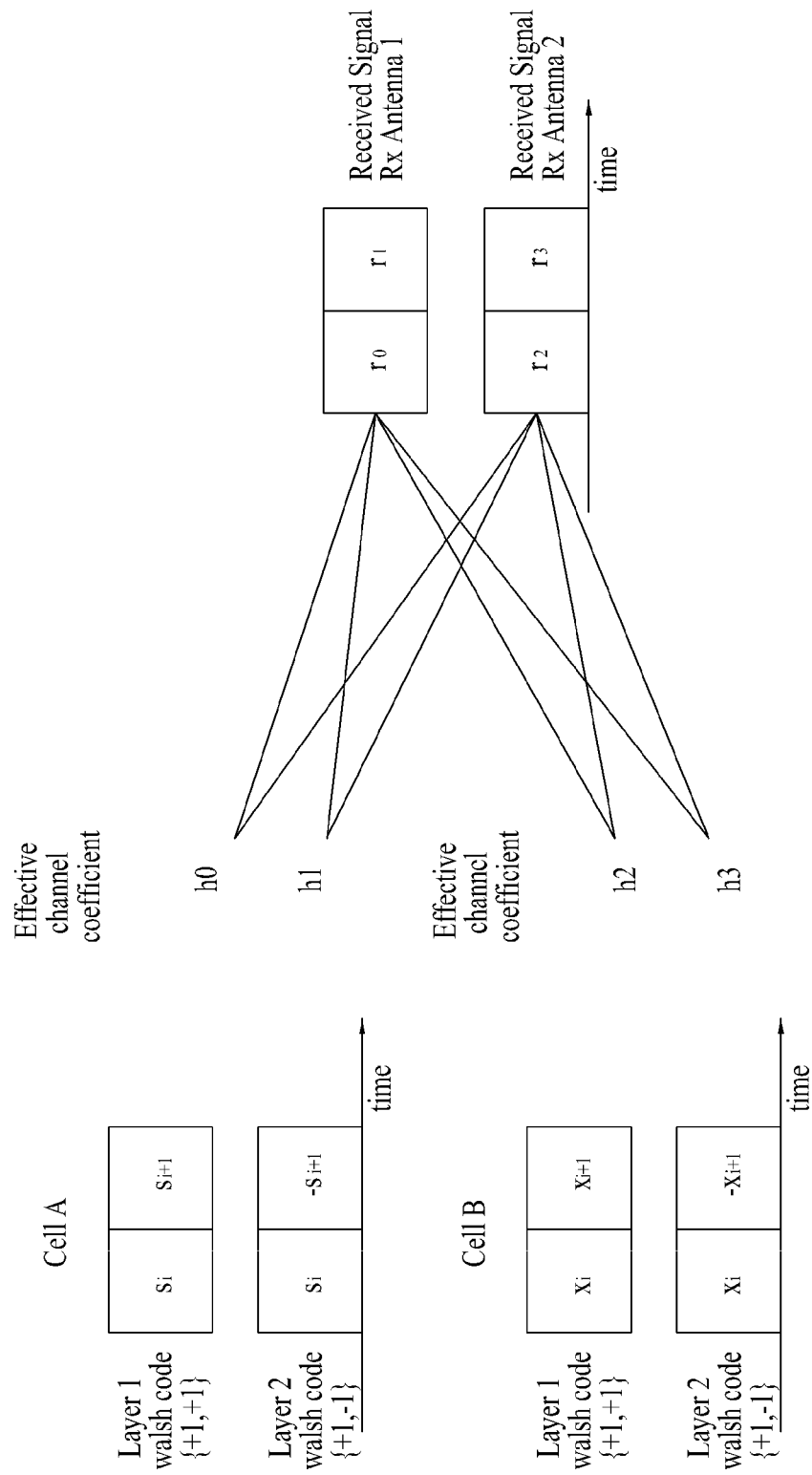
FIG. 24 illustrates an exemplary method for transmitting a DRS using a DRS sequence in the case of two cells.

FIG. 24 illustrates an exemplary method for transmitting a DRS using a DRS sequence for which two cells are generated.

The received signal equation and the estimated channel for receive Rx antenna port point of view The equation of a signal received by a receiver shown at the right of FIG. 24 and a channel estimated for a signal received at Rx antenna port can be represented by the following Equations 46 and 47.

$$r_0 = (h_0 + h_1) \cdot s_i + (h_2 + h_3) \cdot x_i + n_0$$

$$r_1 = (h_0 - h_1) \cdot s_{i+1} + (h_2 - h_3) \cdot x_{i+1} + n_1 \quad \text{[Equation 46]}$$

Here, $h_0$, $h_1$, $h_2$, and $h_3$ denote effective channel coefficients, $a_i$, and $b_i$ denote scrambling code sequences, and $n_0$ and $n_1$ denote noise.

$$\begin{aligned}
\tilde{h}_0 &= (r_0 \cdot s_i^* + r_1 \cdot s_{i+1}^*)/2 \quad \text{[Equation 47]} \\
&= ((h_0 + h_1) + (h_2 + h_3) \cdot x_i \cdot s_i^* + n_0 \cdot s_i^* + \\
&\quad (h_0 - h_1) + (h_2 - h_3) \cdot x_{i+1} \cdot s_{i+1}^* + n_1 \cdot s_{i+1}^*)/2 \\
&= h_0 + (h_2 \cdot x_i \cdot s_i^* + h_3 \cdot x_i \cdot s_i^* + h_2 \cdot x_{i+1} \cdot s_{i+1}^* - \\
&\quad h_3 \cdot x_{i+1} \cdot s_{i+1}^* + n')/2 \\
&= h_0 + z_1 + z_2 + z_3 + z_4 + n''
\end{aligned}$$

It can be seen from Equation 45 that the estimated effective channel coefficient has four different coefficients $Z_1$, $Z_2$, $Z_3$ and $Z_4$, in which the randomized coefficients may cancel each other out thus resulting in more accurate channel estimation for $h_0$. From the equations, it can be known that the sequence mapping method illustrated in FIG. 23 has four times the randomization effect as the sequence mapping method illustrated in FIG. 21.

In order to maximize the interference randomization from DRS sequence from other cells, the DRS sequence should ideally have random values in all REs, but at the same time in order to keep orthogonality between DRS layers the same DRS sequence should be used in all DRS layers. The problem with having same DRS sequence in all layers is that under certain precoding environments the Walsh code results in severe power difference between OFDM symbols.

FIGS. 25(a) and 25(B) illustrate an exemplary method of applying precoding to two DRS layers and mapping the DRS layers to four Tx antennas, and power differences between adjacent OFDM symbols when a DRS is transmitted using the method.

Referring to FIG. 25(a), a transmitter can apply precoding to two DRS layers and transmit the DRS layers through four Tx antennas. When precoding shown in FIG. 25 is applied, the signals transmitted through the respective Tx antennas for each symbol are shown at the right part of FIG. 25(a). In case that the transmitter transmits the signals in this manner, the power differences between adjacent OFDM symbols can be large as approximately 2.25 dB, as shown in FIG. 25(b).

Figure 26:
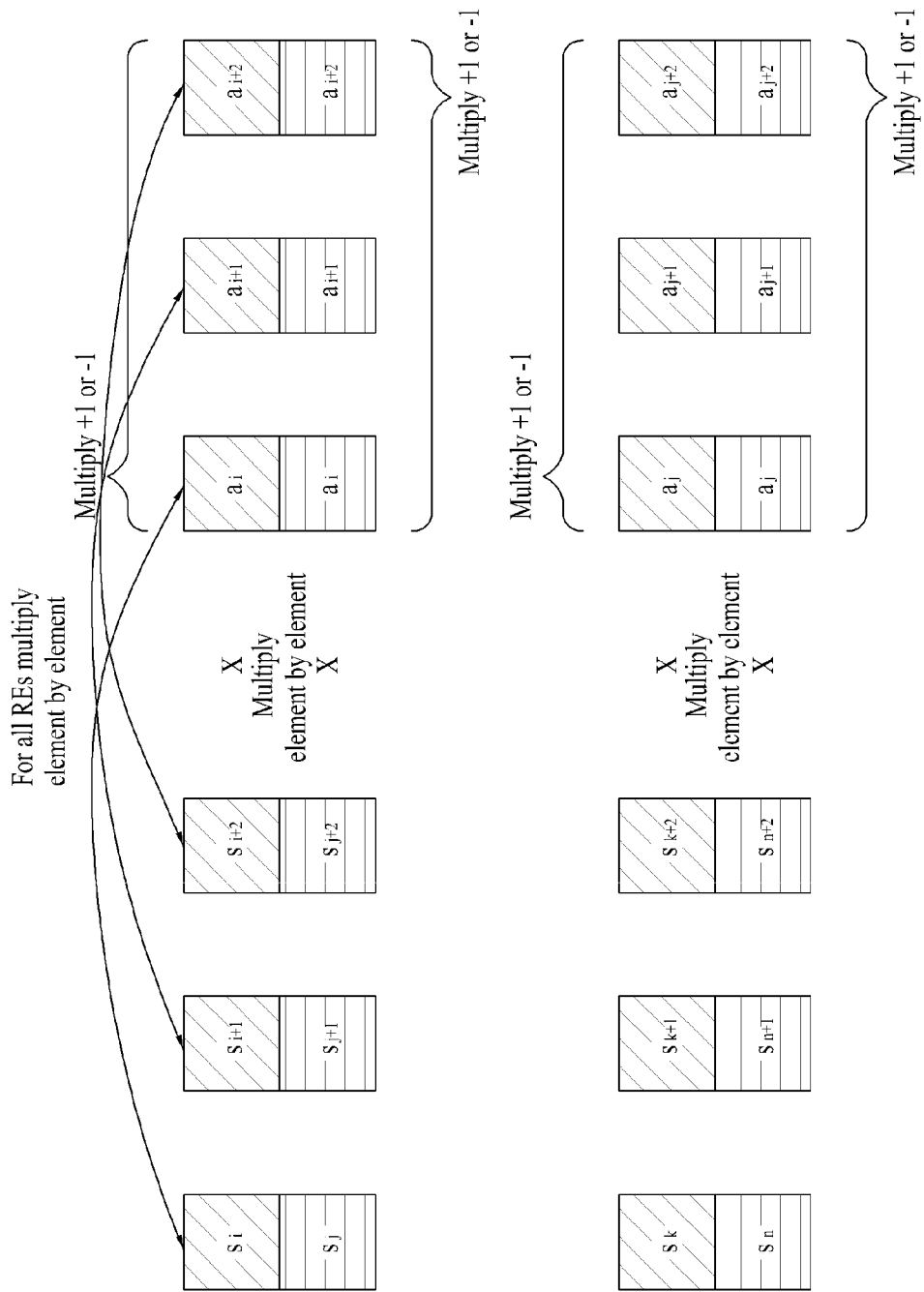
FIG. 26 illustrates exemplary methods for generating a DRS sequence.

FIG. 26 illustrates an exemplary method for generating a DRS sequence.

In the method of FIG. 26, a different sequence for each layer is Walsh spread, and then Walsh-spread sequence is scrambled.

The first sequence denoted as 'a' in FIG. 26 is used to differentiate sequences between CDM layers. The second sequence denoted as 's' is used to differentiate sequences between higher layer indicated identities. A higher layer indicated identity can be identity such as cell ID, CoMP cell group ID, or other identity which is given in order to differentiate DRS sequences from respective identities. It is desired that the first sequence denoted as 'a' do not change value between Walsh code set multiplied REs (e.g. two OFDM symbol consecutive REs). The Walsh code can be multiplied on top of the first sequence. Effectively this can be implemented by spreading (multiplying the Walsh code to the sequence creating a longer sequence) the first sequence in time domain in which the REs are positioned for DRS with Walsh-Hadamard code. The second sequence denoted as 's' randomly change values in all REs. The second sequence is invariant to layers and consequently the same common sequence is used in all layers.

Figure 27:
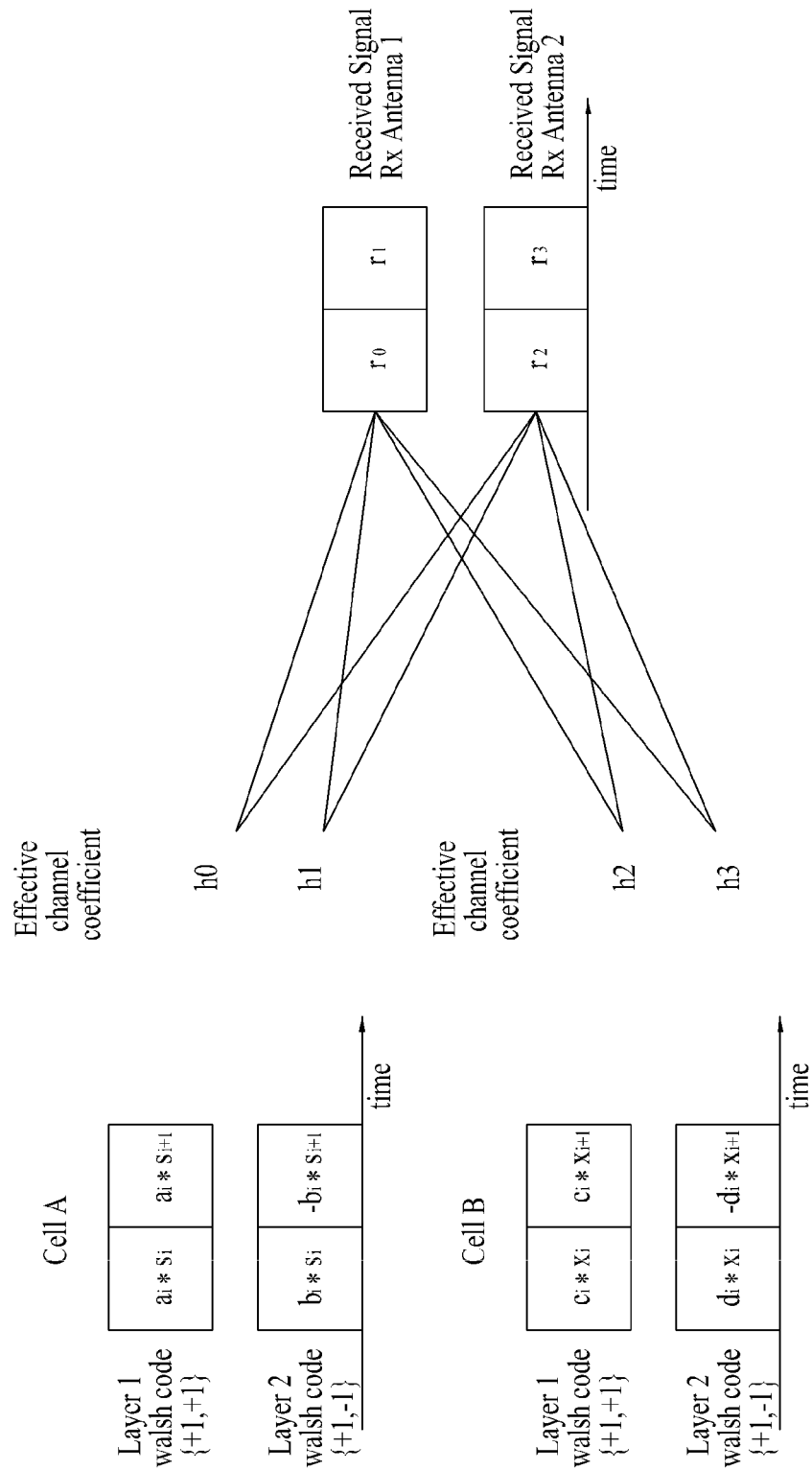
FIG. 27 illustrates an exemplary method for transmitting a DRS using a DRS sequence generated according to the method shown in FIG. 26.

FIG. 27 illustrates an exemplary method for transmitting a DRS using a DRS sequence generated according to the method shown in FIG. 26.

The equation of a signal received by a receiver shown at the right of FIG. 27 and a channel estimated for a signal received at Rx antenna port can be represented by the following Equations 48 and 49.

$$r_0 = (h_0 \cdot a_i + h_1 \cdot b_i) \cdot s_i + (h_2 \cdot c_i + h_3 \cdot d_i) \cdot x_i + n_0 \quad \text{[Equation 48]}$$
$$r_1 = (h_0 \cdot a_i - h_1 \cdot b_i) \cdot s_{i+1} + (h_2 \cdot c_i - h_3 \cdot d_i) \cdot x_{i+1} + n_1$$

-continued $$\tilde{h}_0 = (r_0 \cdot s_i^* + r_1 \cdot s_{i+1}^*) \cdot a_i^* / 2$$ [Equation 49]
$$= ((h_0 \cdot a_i + h_1 \cdot b_i) + (h_2 \cdot c_i + h_3 \cdot d_i) \cdot x_i \cdot s_i^* + n_0 \cdot$$
$$s_i^* + (h_0 \cdot a_i - h_1 \cdot b_i) + (h_2 \cdot c_i - h_3 \cdot d_i) \cdot x_{i+1} \cdot$$
$$s_{i+1}^* + n_1 \cdot s_{i+1}^*) \cdot a_i^* / 2$$
$$= h_0 + (h_2 \cdot c_i \cdot x_i \cdot s_i^* + h_3 \cdot d_i \cdot x_i \cdot s_i^* + h_2 \cdot c_i \cdot$$
$$x_{i+1} \cdot s_{i+1}^* - h_3 \cdot d_i \cdot x_{i+1} \cdot s_{i+1}^* + n')a_i^* / 2$$
$$= h_0 + z_1 + z_2 + z_3 + z_4 + n''$$

It can be seen from Equations 48 and 49 that the estimated effective channel coefficients have four different coefficients $Z_1$, $Z_2$, $Z_3$ and $Z_4$, in which the randomized coefficients may cancel each other out thus resulting in more accurate channel estimation for $h_0$. From the equations, it can be known that the sequence mapping method illustrated in FIG. 27 has the same level of interference randomization effect as the sequence mapping method illustrated in FIG. 23 and four times the randomization effect as the sequence mapping method described with reference to FIG. 21.

Figure 28A:
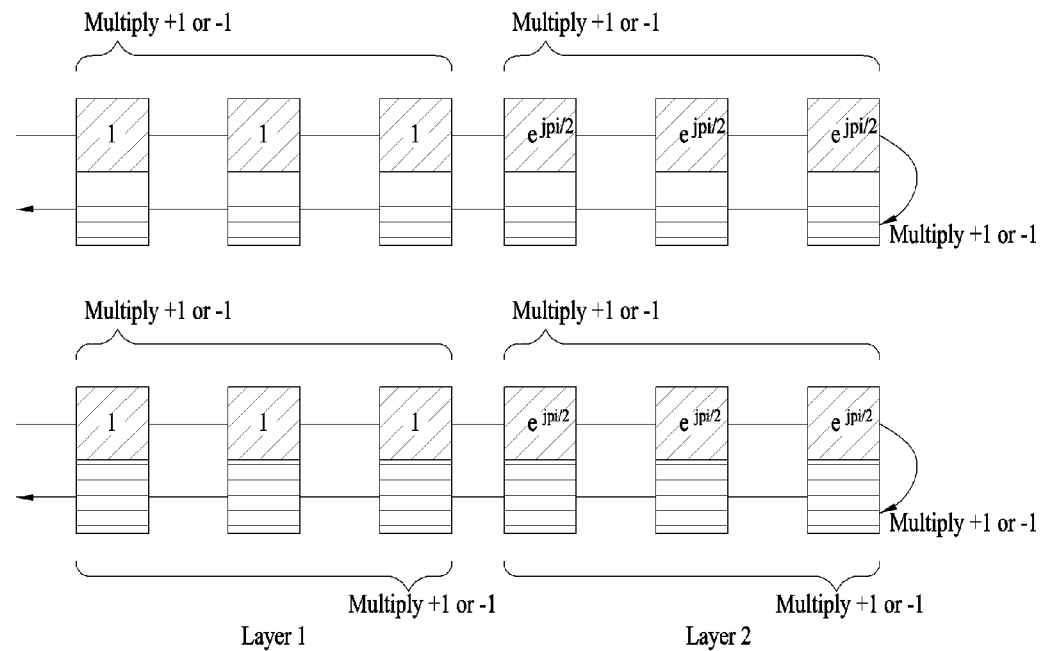
FIGS. 28(a) and 28(b) illustrate exemplary methods for generating a DRS sequence.
Figure 28B:
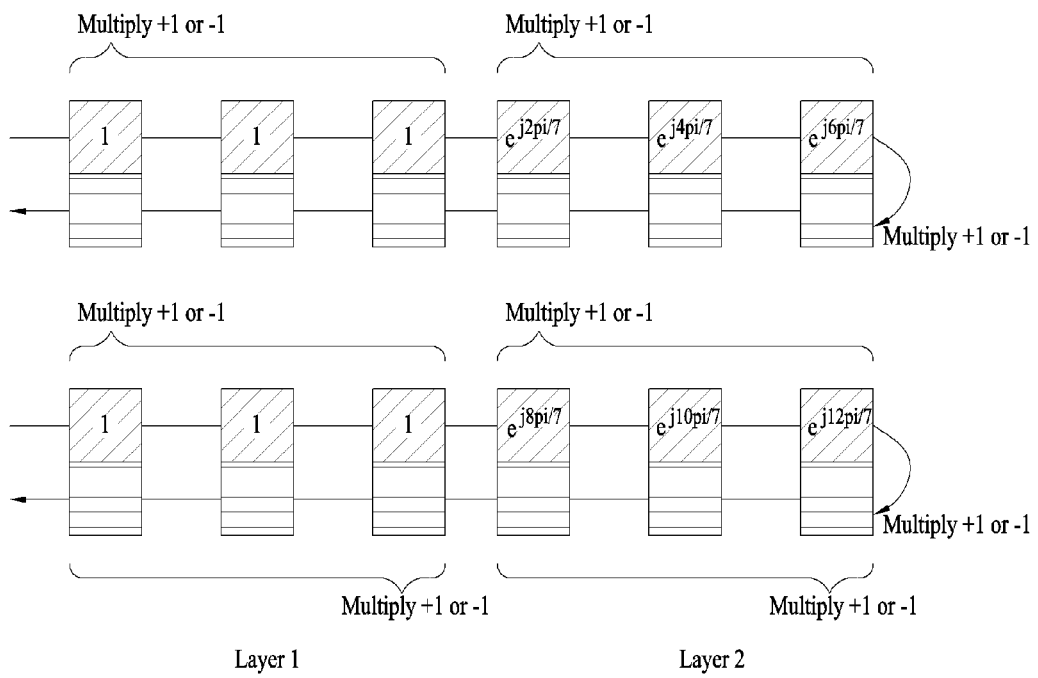

FIGS. 28(*a*) and 28(*b*) illustrate exemplary methods for generating a DRS sequence.

The first layer sequence can be generated by Gold Code sequence as defined below. Alternatively, the first sequence can be a fixed sequence in which the sequences for second, third, and fourth layers are defined as unit circle complex values with some fixed phase offset compared to the first layer sequence. For example, as shown in FIG. 28(*a*), if the sequence of the first layer is defined as {{+1,+1,+1}, {+1,+1,+1}} where the elements in the example represent values of the sequence are within the RB (before Walsh spreading), the sequence for the second layer can be defined as $$\{\{e^{j\frac{\pi}{4}}, e^{j\frac{\pi}{4}}, e^{j\frac{\pi}{4}}\}, \{e^{j\frac{\pi}{4}}, e^{j\frac{\pi}{4}}, e^{j\frac{\pi}{4}}\}\}.$$

In general, assuming the first sequence for the first layer is all '1's ({{+1, +1, +1}, {+1, +1, +1}}), the first sequence for other layers can be defined as {{$e^{j\theta_{k,f1,n}}$, $e^{j\theta_{k,f2,n}}$, $e^{j\theta_{k,f3,n}}$}, {$e^{j\theta_{k,f4,n}}$, $e^{j\theta_{k,f5,n}}$, $e^{j\theta_{k,f6,n}}$}}, where k is the layer index (numerated from 1), n is the RB index, and f1 to f6 denote time/frequency RE index within the RB. An example of the unit circle value used for layers other than the first layer is Zadoff-Chu sequence such as $$e^{j\theta_{k,f}} = e^{j\frac{2\pi}{N}kf(f+1)} \text{ or } e^{j\theta_{k,f}} = e^{j\frac{2\pi}{N}kf^2}.$$

Figure 29A:
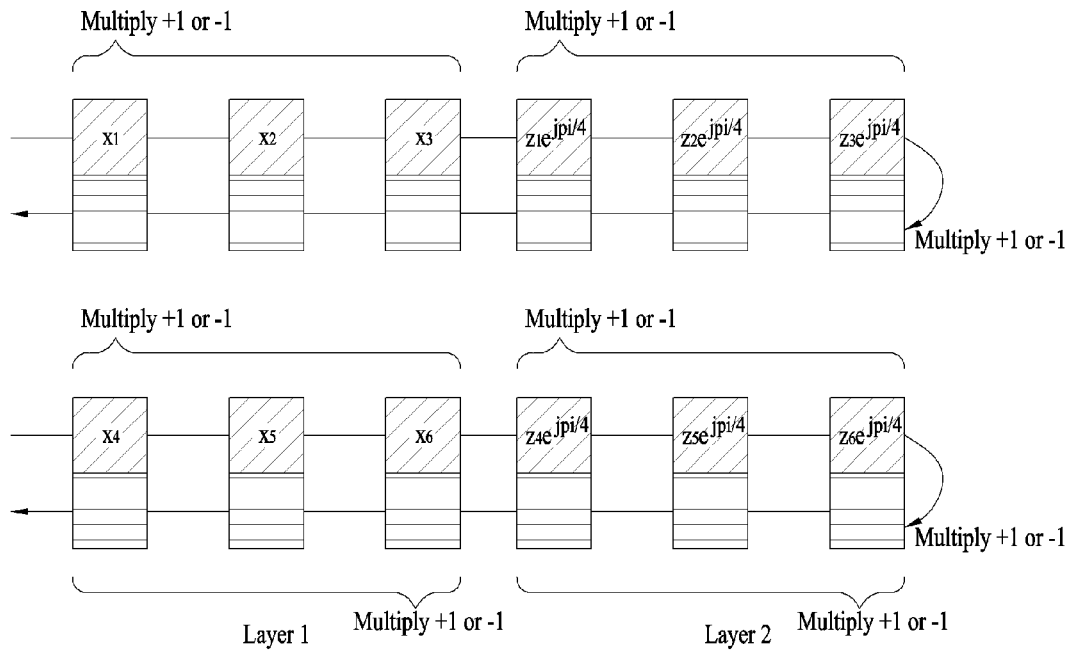
FIGS. 29(a) and 29(b) illustrate exemplary methods for generating a DRS sequence.
Figure 29B:
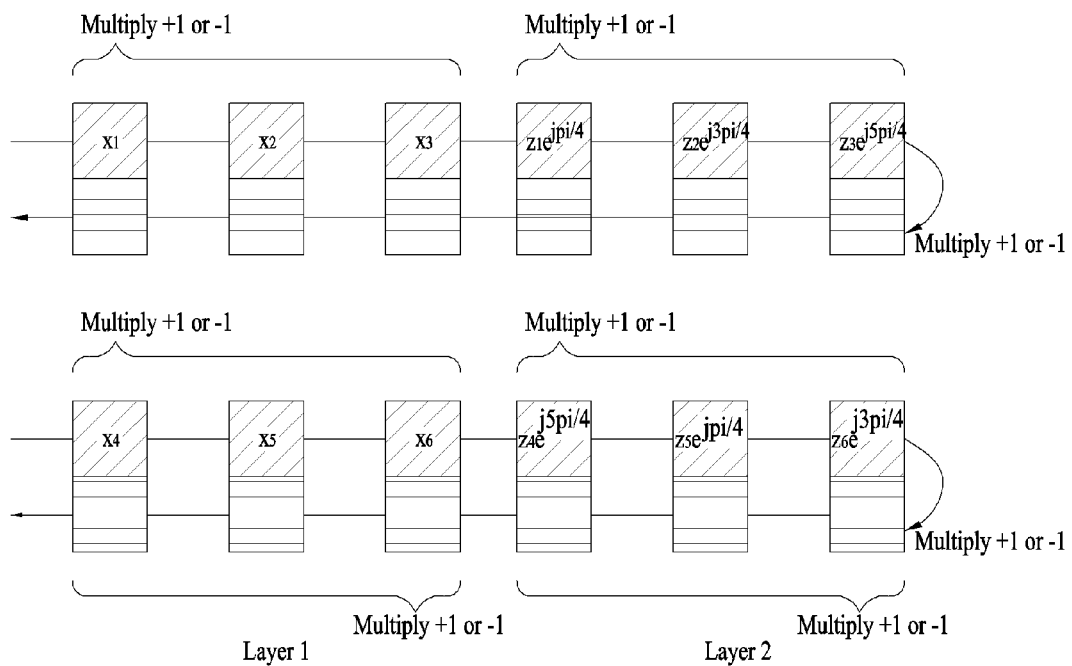

Additionally, the first sequence for each layer can be generated with a combination of fixed phase offset unit circuit complex value sequence and random complex value sequence generated from sequences such as Gold code. Such an example is shown in FIGS. 29(*a*) and 29(*b*). FIGS. 29(*a*) and 29(*b*) illustrate an exemplary method for generating a DRS sequence.

The sequence generation methods illustrated in FIGS. 21, 23 and 26 can be redefined in a different manner. The sequence mapping method of FIG. 26 utilizes different sequences for different layers whereas the sequence across time does not change (other than the Walsh code multiplication factor). Alternatively, the sequence mapping method of FIG. 24 utilizes the same sequence for different layers whereas the sequence across time changes. The sequence mapping method of FIG. 21 has potential issues with interference randomization from other cells, whereas the sequence mapping method of FIG. 23 has potential issues with PA design at the eNode B. The sequence mapping method of FIG. 26 encompasses the sequence mapping methods of FIGS. 21 and 23 by using different sequences for difference layers and different sequences across time. In order to keep the orthogonality, two types of sequences are generated for the sequence mapping method of FIG. 26. One of the sequences is to make different sequences between layers and other sequences make different sequence across time. Additionally, values of both sequence types may change across frequency.

The sequence mapping method of FIG. 26 can be implemented in various manners. The first implementation method is to generate different sequences for respective layers, spread the sequences using Walsh code, and then multiply the second sequence which is common for all layers. The second implementation method is to generate a common sequence for layers, cover the sequence using Walsh code, and then multiply the second sequence which is different for each other. Other alternative implementation methods entail re-organizing the sequence mapping of the first and second sequences and multiplication of Walsh codes.

Alternatively, different sequences can be generated for respective layers and alamouti coding can be applied to the sequences.

Figure 30:
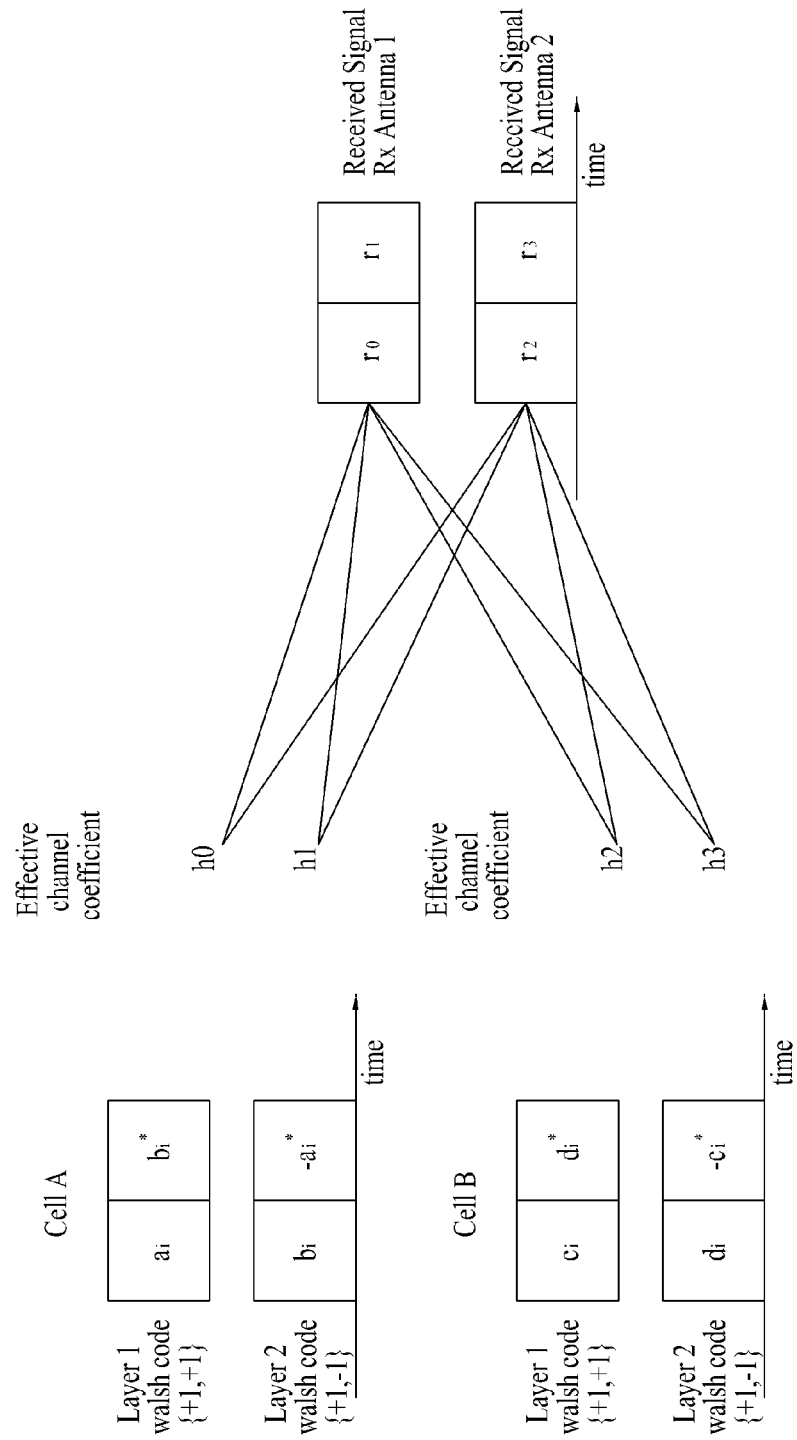
FIG. 30 illustrates an example of transmitting a DRS signal using a DRS sequence in the case of two cells.

FIG. 30 illustrates an example of transmitting a DRS signal using a DRS sequence generated in two cells.

In this method, different sequences are generated for respective layers and alamouti coding is applied to each sequence pair in order to achieve orthogonality between layers. This method allows good interference randomization from different cells and at the same time effectively achieves different sequences for respectively layers.

Figure 31:
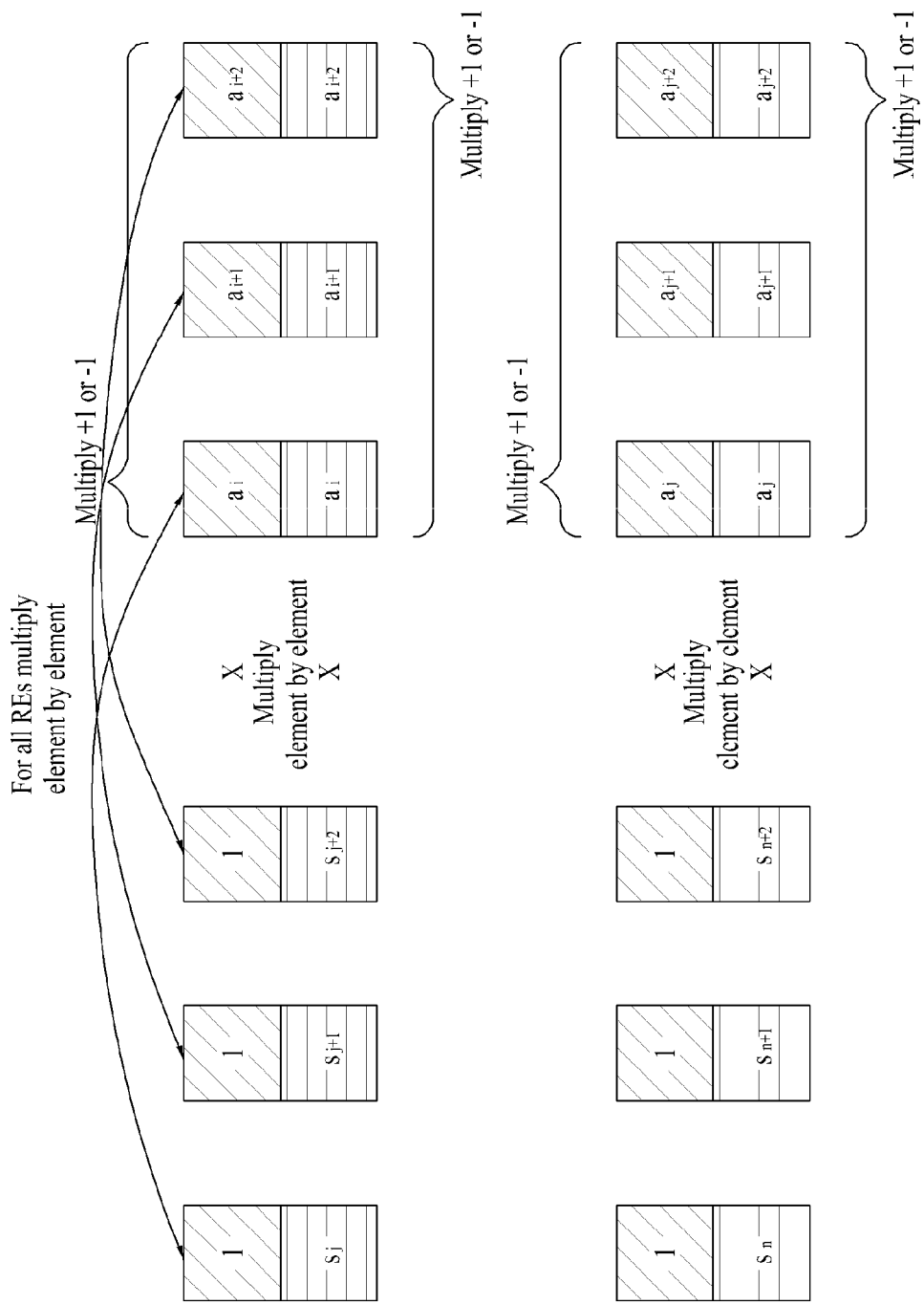
FIG. 31 illustrates an alternative of the DRS sequence generation method shown in FIG. 26.

FIG. 31 illustrates an alternative example of the DRS sequence mapping method shown in FIG. 26.

The sequence mapping method of FIG. 26 can multiply part of the sequences together to form the final DRS sequence. In other words, the method generates the entire DRS sequence (referred to as DM RS sequence in LTE-A systems) by spreading a layer specific sequence and multiplying certain portions of the Walsh spread layer specific sequence by a layer common scrambling sequence. Specifically, the second sequence can be multiplied by parts of the first sequence, which is effectively extended by the Walsh code. This can be implemented by having '1's in part of the second sequence which only scrambles part of the Walsh spread sequence (first sequence) as shown as an example in FIG. 31.

FIGS. 32(*a*) and 32(*b*) illustrate exemplary methods for generating a DRS sequence for each OFDM symbol.

Referring to FIG. 32(*a*), in this DRS mapping method, a sequence for the first sequence and/or the second sequence used in a DRS for each layer is generated according to a maximum bandwidth in each OFDM symbol containing the DRS.

The sequence for RB allocated to each UE uses a subset portion of the long sequence generated for the entire bandwidth. The final sequence $r_{l',n_s}(m)$ can be defined as represented by the following Equation 50. The final sequence will be a function of subframe (or slot) number within the radio frame, and the OFDM symbol number within the subframe.

$$r^1_{l',n_s}(m) = w_{l',n_s} \cdot \frac{1}{\sqrt{2}}(1 - 2 \cdot c(2m)) +$$  [Equation 50]

$$jw_{l',n_s} \cdot \frac{1}{\sqrt{2}}(1 - 2 \cdot c(2m+1)),$$

$$m = 0, 1, \ldots, 3N^{DL}_{RB} - 1$$

$$r^2_{l',n_s}(m) = w_{l',n_s} \cdot \frac{1}{\sqrt{2}}(1 - 2 \cdot c(2m)) +$$

$$jw_{l',n_s} \cdot \frac{1}{\sqrt{2}}(1 - 2 \cdot c(2m+1)),$$

$$m = 0, 1, \ldots, 3N^{DL}_{RB} - 1$$

$$r_{l',n_s}(m) = w_{l',n_s}(m) \cdot r^1_{l',n_s}(m) \cdot r^2_{l',n_s}(m)$$

Here, $r_{l',n_s}^1(m)$ and $r_{l',n_s}^2(m)$ are DRS sequences generated using Gold sequences which are initialized with different initialization values.

Figure 32A:
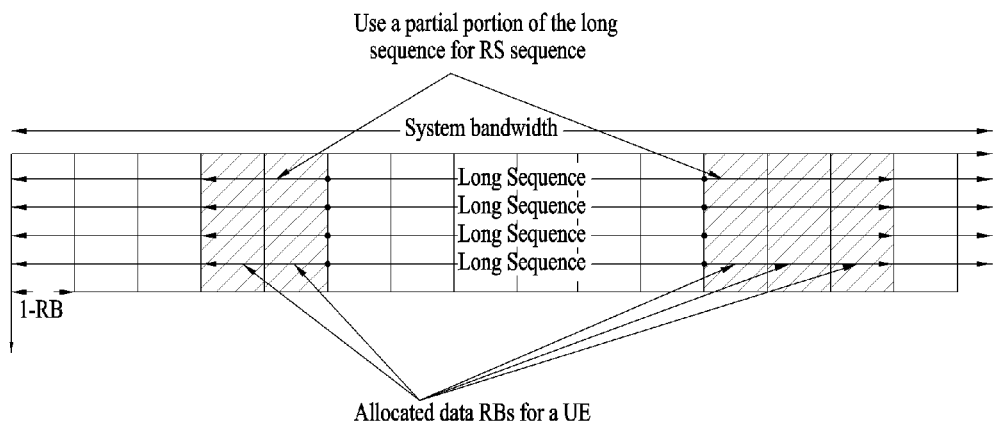
FIGS. 32(a) and 32(b) illustrate exemplary methods for generating a DRS sequence for each OFDM symbol.
Figure 32B:
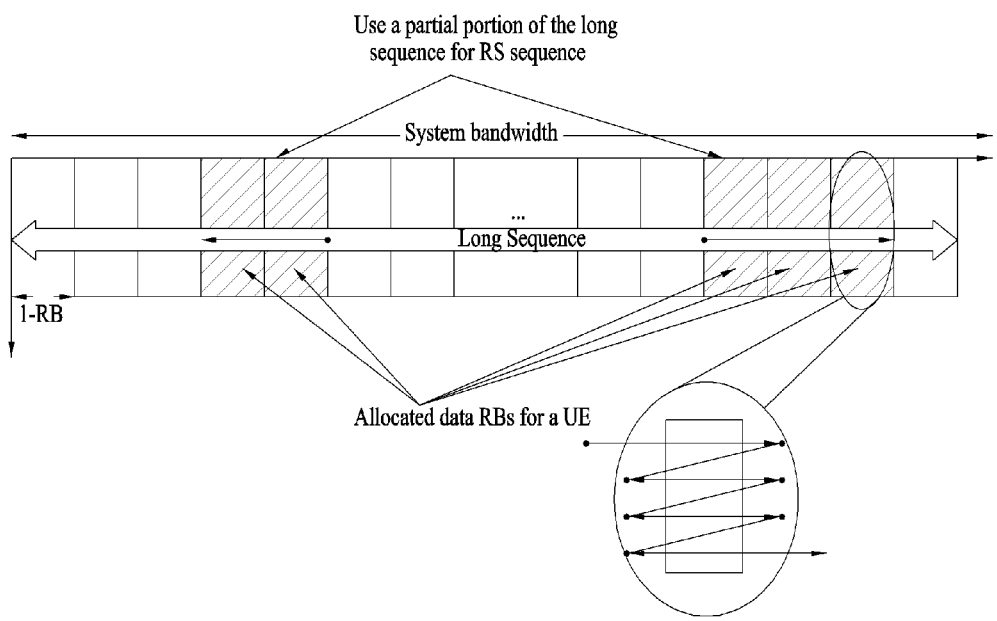

Referring to FIG. 32(b), a DRS sequence can be generated for each subframe. In this sequence mapping method, the sequence for the first sequence and/or the second sequence used in the DRS for each layer is generated according to the maximum bandwidth in each subframe. Additionally, the long sequence generated will be mapped to all REs within a RB before mapping the sequence to the next RB. The sequence for RB uses a subset portion of the long sequence generated for the entire bandwidth. The final sequence $r_{l',n_s}(m)$ can be defined as represented by the following Equation 51. The final sequence will be a function of subframe (or slot) number within the radio frame, and the OFDM symbol number within the subframe.

$$r^1_{n_s}(m') = w_{l',n_s} \cdot \frac{1}{\sqrt{2}}(1 - 2 \cdot c(2m')) +$$  [Equation 51]

$$jw_{l',n_s} \cdot \frac{1}{\sqrt{2}}(1 - 2 \cdot c(2m'+1)),$$

$$m' = 0, 1, \ldots, 6N^{DL}_{RB} - 1$$

$$r^2_{n_s}(m) = w_{l',n_s} \cdot \frac{1}{\sqrt{2}}(1 - 2 \cdot c(2m)) +$$

$$jw_{l',n_s} \cdot \frac{1}{\sqrt{2}}(1 - 2 \cdot c(2m+1)),$$

$$m = 0, 1, \ldots, 12N^{DL}_{RB} - 1$$

$$r_{n_s}(m) = w_{l',n_s}(m) \cdot r^1_{n_s}(m') \cdot r^2_{n_s}(m)$$

In the sequence mapping method shown in FIG. 32(b), the sequence lengths for the first sequence and the second sequence are different from each other due to the fact that the first sequence is spread by Walsh-Hadamard code. The spread first sequence will in the end have the same sequence length as the second sequence.

Figure 33:
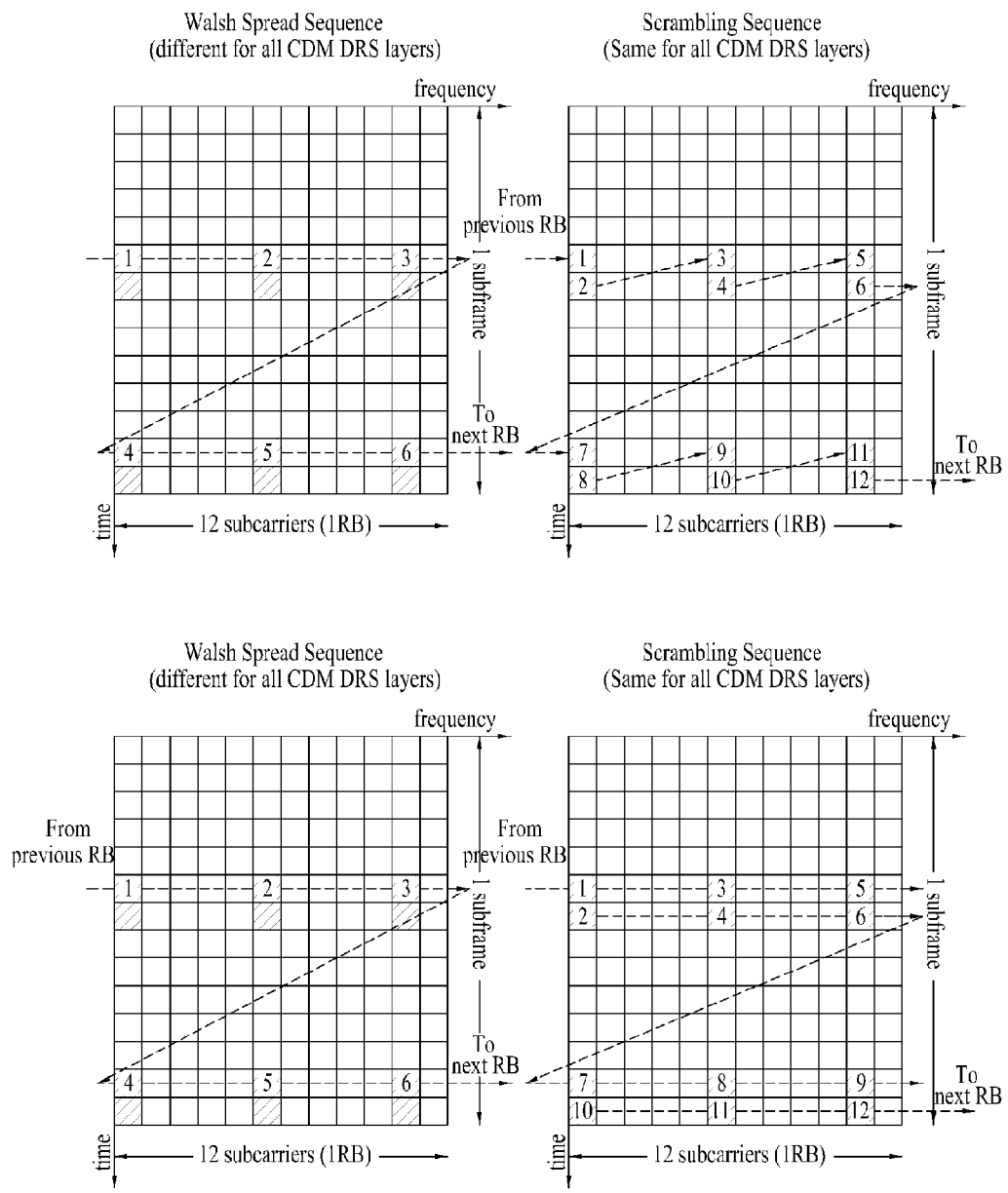
FIG. 33 illustrates a sequence mapping method related with the methods shown in FIGS. 32(a) and 32(b)

FIG. 33 illustrates a sequence mapping method related with the methods shown in FIGS. 32(a) and 32(B) in more detail.

In general, a sequence is frequency-first mapped within a RB and then mapped to OFDM symbols containing DRS REs. Scrambling sequence mapping is performed in such a manner that all CDM DRS layers mapped to frequency and then mapped to OFDM symbol RE sets including DRs REs. By utilizing this method, the UE can start to estimate a channel as the UE generates a DRS sequence when the UE only has partially received a downlink subframe.

A description will be given of Walsh code randomization.

In order to resolve high power transmission for certain Tx antenna ports assuming certain precoding matrices, it is possible to consider using cyclic shifted Walsh codes across the frequency domain. This means that from a single DRS layer point of view, Walsh code multiplied REs across frequency will change. Specifically, Walsh codes multiplied to RE sets will be cyclic shifted Walsh codes. Assuming that a Walsh code length of 2 is used and two orthogonal codes for a given Walsh code is defined as $W_{0,1}$ and $W_{1,1}$. Additionally, cyclic shifted orthogonal codes can be denoted as $W_{0,2}$ and $W_{1,2}$.

$W_{0,1} = \{+1, +1\}$
$W_{1,1} = \{+1, -1\}$
$W_{0,2} = \{+1, +1\}$
$W_{1,2} = \{-1, +1\}$

Assuming Walsh code length 4 is used and four orthogonal codes for a given Walsh code is defined as $W_{0,1}$ and $W_{1,1}$. Additionally, cyclic shifted orthogonal codes are defined as $W_{0,k}$, $W_{1,k}$, $W_{2,k}$, and $W_{3,k}$, where k is a cyclic shifted value.

$W_{0,1} = \{+1, +1, +1, +1\}$
$W_{1,1} = \{+1, -1, +1, -1\}$
$W_{2,1} = \{+1, +1, -1, -1\}$
$W_{3,1} = \{+1, -1, -1, +1\}$
$W_{0,2} = \{+1, +1, +1, +1\}$
$W_{1,2} = \{-1, +1, -1, +1\}$
$W_{2,2} = \{+1, -1, -1, +1\}$
$W_{3,2} = \{-1, -1, +1, +1\}$
$W_{0,3} = \{+1, +1, +1, +1\}$
$W_{1,3} = \{+1, -1, +1, -1\}$
$W_{2,3} = \{-1, -1, +1, +1\}$
$W_{3,3} = \{-1, +1, +1, -1\}$
$W_{0,4} = \{+1, +1, +1, +1\}$
$W_{1,4} = \{-1, +1, -1, +1\}$
$W_{2,4} = \{-1, +1, +1, -1\}$
$W_{3,4} = \{+1, +1, -1, -1\}$

Each DRS layer uses Walsh code $W_{n,m}$ to multiply DRS sequences, where n denotes the DRS layer index, and m is a function of subcarrier index. One example is m=k mod 2 or m=k mode 4, where k is the subcarrier index counting only the subcarriers carrying DRSs. This means that the exact pattern of orthogonal code cover code used for a certain DRS layer within a RB may change between RBs.

Figure 34A:
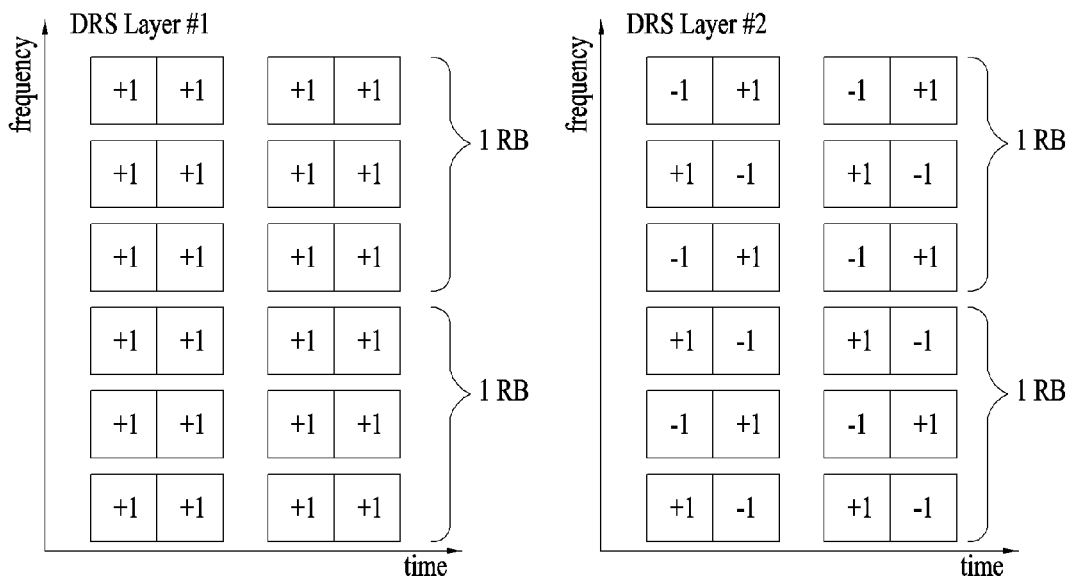
FIG. 34(a) illustrates an exemplary orthogonal code cover code pattern used for a specific DRS layer.
Figure 34B:
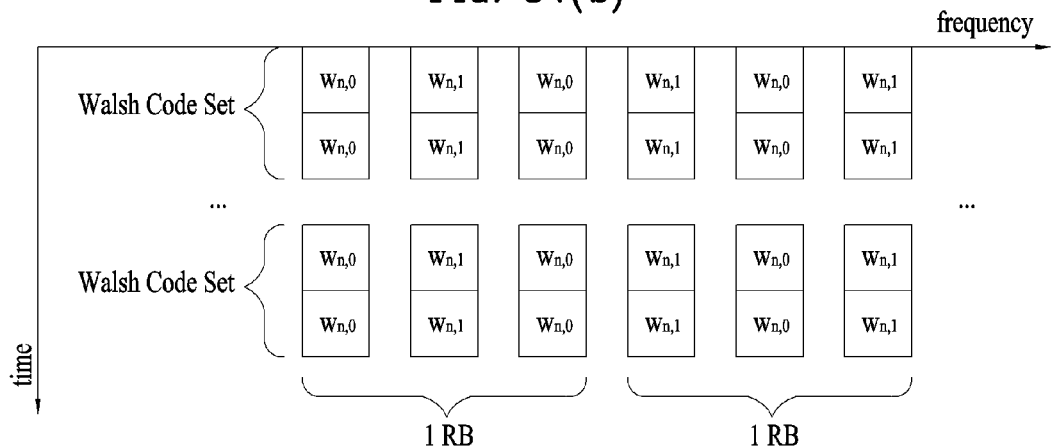
FIGS. 34(b) and 34(c) illustrate examples of using a Walsh code in RBs.
Figure 34C:
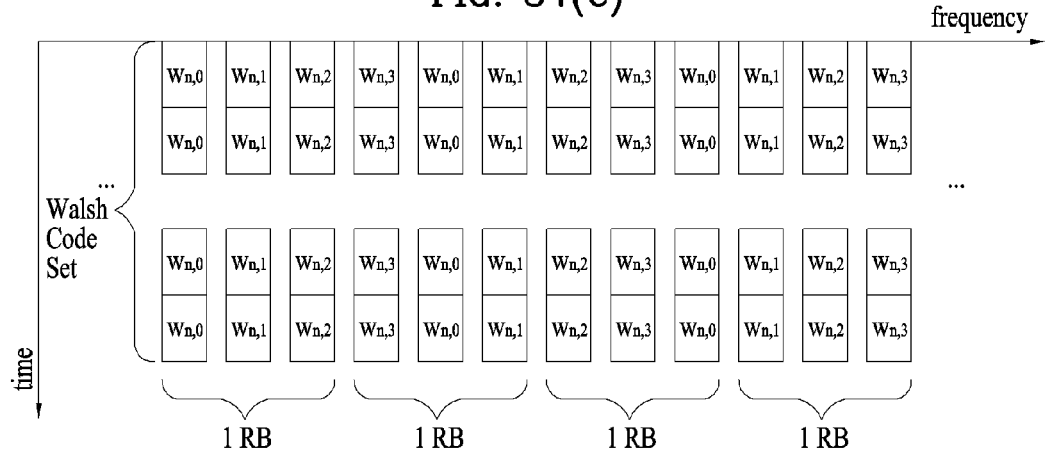

FIG. 34(a) illustrates an exemplary orthogonal code cover code pattern used for a specific DRS layer, and FIGS. 34(b) and 34(c) illustrate examples of Walsh code usage within RBs.

By multiplying a different cyclic shifted Walsh code for each subcarrier (so that the cyclic Walsh code pattern will repeat itself after 2 or 4 RBs) helps reduce the power difference between OFDM symbols from a single Tx antenna perspective.

This is because the power pooled symbols (2*$S_i$ symbols after precoding), as shown in FIG. 25(b), which causes a power difference between OFDM symbols, are basically interleaved between multiple OFDM symbols. This mitigates the power concentration in a single OFDM symbol by randomizing power pooled symbols across time.

Figure 35:
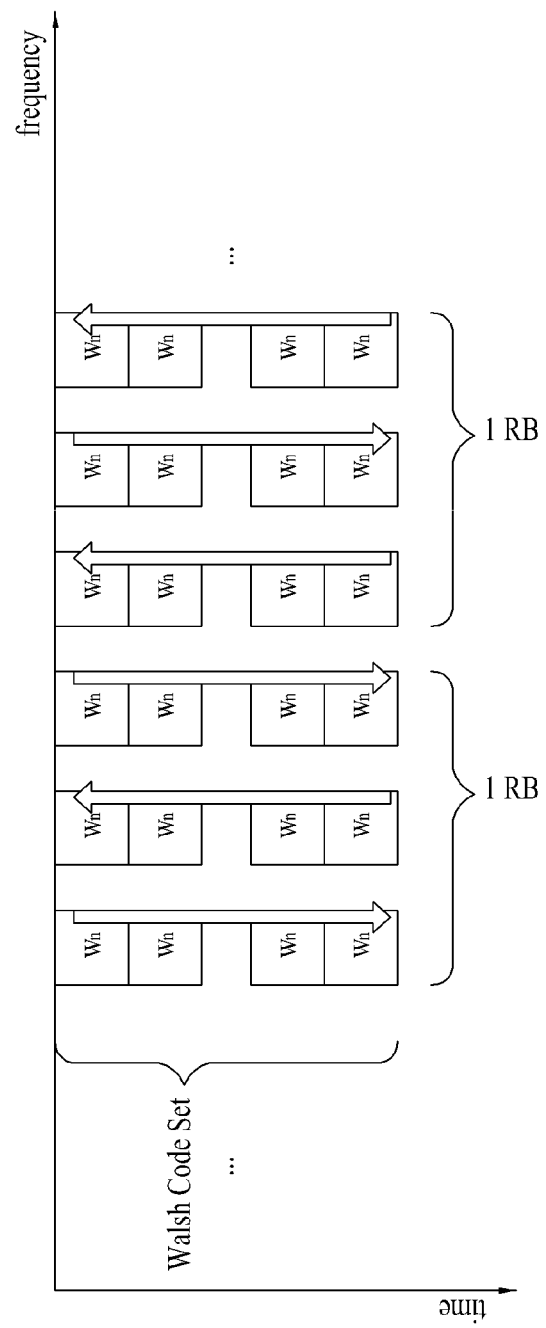
FIG. 35 illustrates an exemplary method for mapping a Walsh code in a frequency CDM RE set.

FIG. 35 illustrates an exemplary method for mapping Walsh codes in a frequency CDM RE set.

A randomization method using the method shown in FIG. 35 is described. Walsh codes can be differently mapped in frequency CDM RE sets or time-frequency CDM RE sets. One example is to map Walsh code elements in CDM RE sets time forward wise for a specific first RB pair (or 1 RB) and map the Walsh code elements in different CDM RE sets time reverse wise for a second RB pair adjacent to the first RB pair.

The Walsh code elements applied to the first RB pair and the second RB pair adjacent to the first RB pair correspond to elements of a Walsh code set. A plurality of CDM groups may exist for the one or more RB pairs. For example, CDM group 1 and CDM group 2 may exist for each RB pair. It is assumed that a Walsh code set which will be applied to each RB pair is $\{a, b, c, d\}$. When the Walsh code is applied to a specific CDM group (e.g. CDM group 1) in the first RB pair, Walsh code elements a, b, c and d in the Walsh code set $\{a, b, c, d\}$ can be mapped to REs in such a manner that the Walsh code elements a, b, c, and d are one-to-one mapped (applied) to REs in the direction of time axis, one-to-one mapped to REs in the direction opposite to the direction of time axis, and then one-to-one mapped to REs in the direction of time axis.

When the Walsh code is applied to a specific CDM group (e.g. CDM group 1) in the second RB pair adjacent to the first RB pair, the Walsh code elements a, b, c and d in the Walsh code set $\{a, b, c, d\}$ can be mapped to REs in such a manner that the Walsh code elements a, b, c, and d are one-to-one mapped to REs in the direction opposite to the direction of time axis first, one-to-one mapped to REs in the direction of time axis, and then one-to-one mapped to REs in the direction opposite to the direction of time axis.

In the first and second RB pairs, the Walsh code is applied to CDM group 1 and CDM group 2 in a hopping manner. For example, when the Walsh mode elements a, b, c and d are one-to-one mapped to REs in the direction of time axis in CDM group 1 of the first RB pair, Walsh code elements c, d, a and b can be one-to-one mapped to REs in the direction of time axis in CDM group 2 in a CDM group 1 hopped form (that is, the orders of the Walsh code elements applied to CDM group 1 and CDM group 2 are different from each other). This hopping can also be applied to the second RB pair. As described above, Walsh code elements in a hopped form can be applied to each CDM group in each RB. In order to randomize code-interference between layers, code hopping for each layer in time-frequency CDM RE sets can be utilized. In this method, each layer uses a Walsh code in a certain time-frequency CDM RE set (set of REs to which CDM is applied).

Figure 36A:
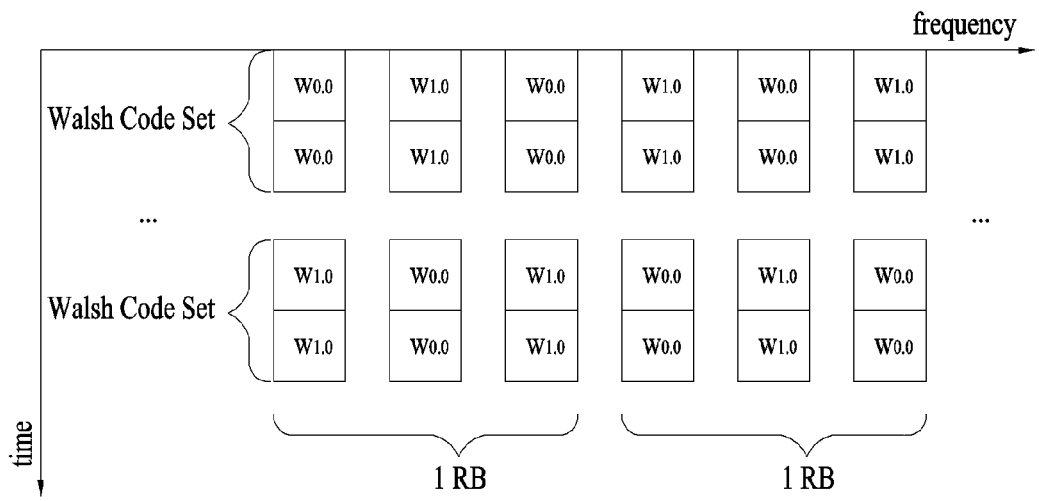
FIGS. 36(a) and 36(b) illustrate examples of code hopping for two layers.
Figure 36B:
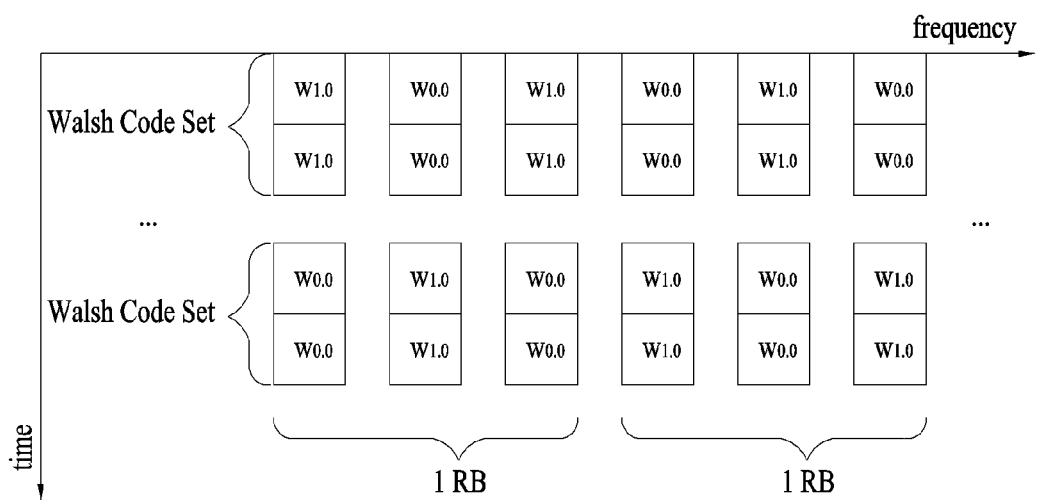

FIGS. 36(a) and 36(b) illustrate an example of code hopping for two layers.

In the example shown in FIGS. 36(a) and 36(b), Walsh code length 2 is used, $W_{0,0}$ denotes Walsh code $\{+1, +1\}$, and $W_{1,0}$ denotes Walsh code $\{+1, -1\}$. If the Walsh code used in a certain time-frequency CDM RE set is denoted as $W_k$ (where k denotes the code index), then the k value can be a function of frequency or time-frequency. One example is having $k=(I_{RB}+I_{freq}+n_s) \mod 2$, where $I_{RB}$ is the RB index, $n_s$ is the slot index, and $I_{freq}$ is the frequency index of the CDM RE set within a RB which can take values 0, 1 and 2. Other example is $k=(I_{RB} \mod 3 + I_{freq})$.

Figure 37:
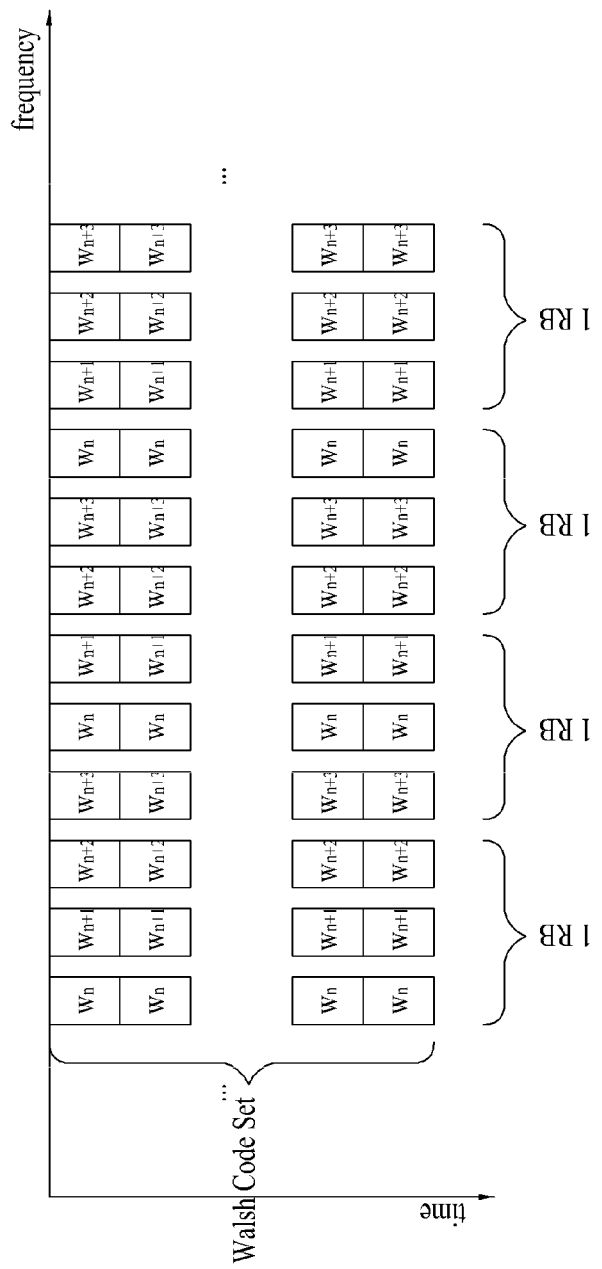
FIG. 37 illustrates an example of code hopping for two layers.

FIG. 37 illustrates an example of code hopping for two layers.

In the example shown in FIG. 37, Walsh code length 4 is used. When the Walsh code is $W_k$, k denotes the code index. An example of Walsh code $W_k$ can be represented as follows.

$W_0=\{+1, +1, +1, +1\}$
$W_1=\{+1, -1, +1, -1\}$
$W_2=\{+1, +1, -1, -1\}$
$W_3=\{+1, -1, -1, +1\}$
or
$W_0=\{+1, +1, +1, +1\}$
$W_1=\{+1, -1, +1, -1\}$
$W_2=\{+1, -1, -1, +1\}$
$W_3=\{+1, +1, -1, -1\}$

Additionally, it is possible to combine code hopping in frequency or time-frequency CDM RE set and Walsh code mapping together, which are mentioned above.

When Walsh code mapping randomization shown in FIG. 35 is applied and Walsh code length 4 is used, sequences between layers are not randomized.

FIGS. 38(a) and 38(b) illustrate an example of Walsh code hopping for four layers.

It can be seen from FIG. 38(a) that no randomization of values is done between layer 1 and layer 4. For this particular case, it is possible to consider utilization of a DFT based code for symbol randomization between all layers. If the DFT based orthogonal code is used as shown in FIG. 38(b), values effective randomization can be achieved for any combination of layers. Here, it may be possible to use a transformed code sequence of DFT instead of DFT sequence values (column vectors of DFT matrix) mentioned below.

$$M_{DFT} = \begin{bmatrix} +1 & +1 & +1 & +1 \\ +1 & +j & -1 & -j \\ +1 & -1 & +1 & -1 \\ +1 & +j & -1 & +j \end{bmatrix}$$

Instead of using column vectors of DFT matrix as a code to give orthogonality between layers, column vectors of M' can be used (where $M'=U \cdot M_{DFT}$, and U is a unitary matrix). Note that the DFT based code can be also utilized in code hopping as well as other features mentioned in this specification.

Referring to FIG. 38(a), when the Walsh code mapping randomization shown in FIG. 35 is applied to the Walsh code mapping shown in FIG. 38(a) and Walsh code length 4 is used, as described above, sequences between layers are not randomized. The Walsh code elements described with reference to FIG. 35 can be represented by a 4*4 matrix below, which can be applied to the Walsh code mapping of FIG. 38.

$$W_4 = \begin{pmatrix} 1 & 1 & 1 & 1 \\ 1 & -1 & 1 & -1 \\ 1 & 1 & -1 & -1 \\ 1 & -1 & -1 & 1 \end{pmatrix} = (a \ b \ c \ d)$$

In this 4*4 matrix, the Walsh code elements (a, b, c, d) may change in layers. For example, the Walsh code elements (a, b, c, d) is (1, 1, 1, 1) corresponding to the first column of the 4*4 matrix in layer 1, (1, -1, 1, -1) corresponding to the second column of the 4*4 matrix in layer 2, (1, 1, -1, -1) corresponding to the third column of the 4*4 matrix in layer 3, and (1, -1, -1, 1) corresponding to the fourth column of the 4*4 matrix in layer 4.

The Walsh code elements (a, b, c, d) can be mapped to a plurality of RB pairs (e.g. the first and second RB pairs) for each layer using the same method as the method illustrated in FIG. 35.

Referring to FIG. 38(a), (a, b, c, d)=(1, 1, 1, 1) are mapped to REs in the direction of time axis, (1, 1, 1, 1) are mapped to REs in the direction opposite to the direction of time axis, and then (1, 1, 1, 1) are mapped to REs in the direction of time axis in layer 2. While FIG. 38(a) shows only REs for two subcarriers in layer 1, the Walsh code elements are applied to three subcarriers for one CDM group in one RB pair, as mentioned above. In layer 3, (a, b, c, d)=(1, 1, -1, -1) are mapped to REs in the direction of time axis first, (1, 1, -1, -1) are mapped to REs in the direction opposite to the direction of time axis, and then (1, 1, −1, −1) are mapped to REs in the direction of time axis.

In other words, the Walsh code sequences applied in FIG. 35, as shown in FIG. 38(a), can be mapped in such a manner that they are repeated in units of a plurality of frequency units (e.g. two RBs).

A description will be given of a sequence initialization value.

It is assumed that all DRS sequences are generated with Pseudo Random binary sequence generator. Pseudo-random sequences are defined by a length-31 Gold sequence. The output sequence c(n) of length $M_{PN}$, where n=0, 1, ..., $M_{PN}$−1, can be defined by the following Equation 52.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 52]}$$

Here, $N_C$=1600 and the first m-sequence should be initialized with $x_1(0)$=1, $x_1(n)$=0, n=1, 2, ..., 30.

The initialization of the second m-sequence is denoted by $c_{init}=\sum_{i=0}^{30} x_2(i) \cdot 2^i$ with the value depending on the application of the sequence. Here, $x_1(i)$ denotes the first m-sequence of the Gold sequence generator and $x_2(i)$ denotes the second m-sequence of the Gold sequence generator. Unless specified, the initialization value of the Gold sequence depicts the initialization value of the second m-sequence. From this point, the initialization value for sequence $c^k(n)$ is denoted as $c_{init}^k$.

Figure 39:
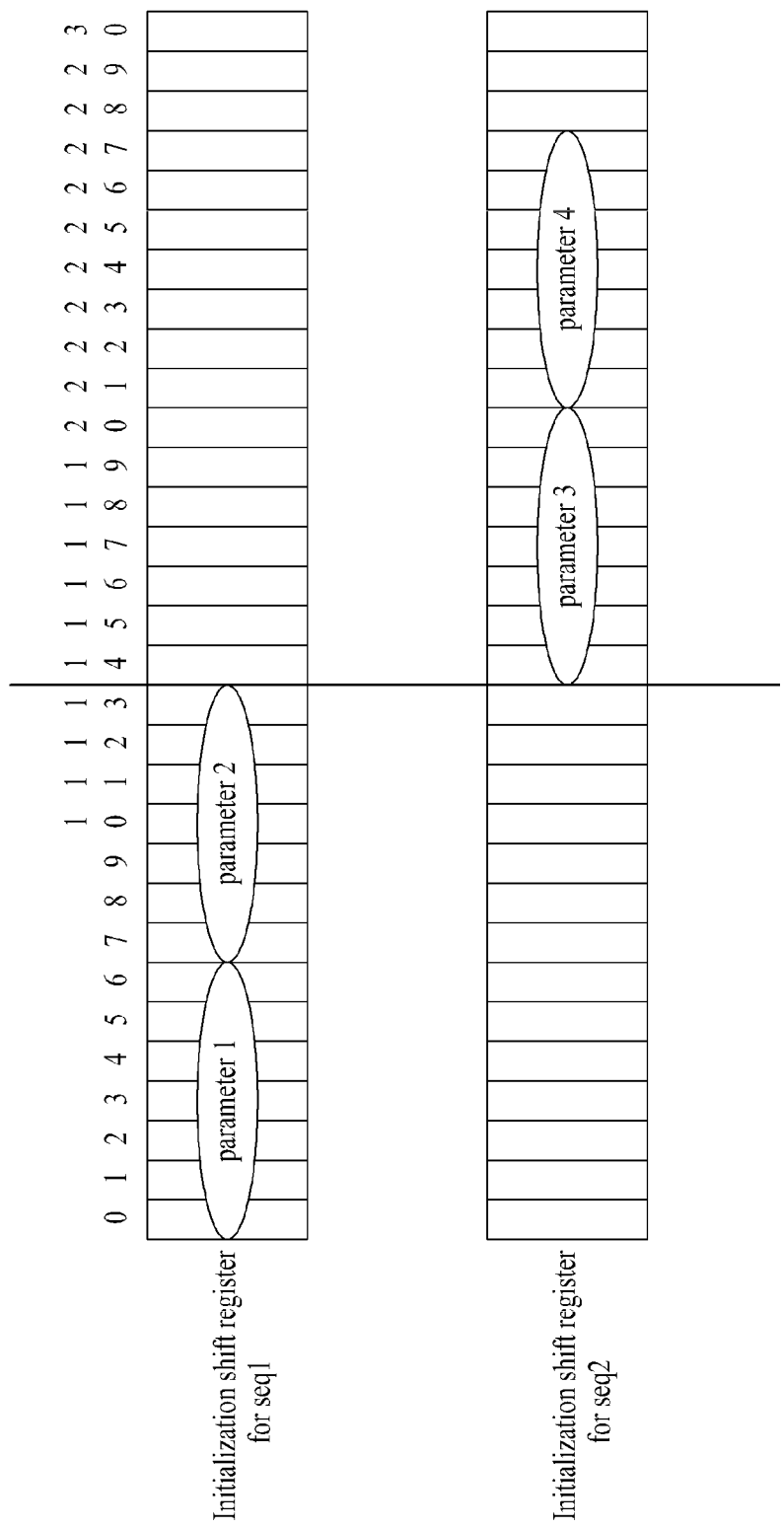
FIG. 39 illustrates an exemplary method for generating two sequences.

FIG. 39 illustrates an exemplary method for generating two sequences.

Initialization parameters loaded to shift registers of initialization values for first and second sequences use shift register fields for each parameter. In addition, the initialization parameter loaded to the first sequence should not co-inside in terms of shift register position with the initialization parameter loaded to the second sequence. This is to insure the two sequences do not generate the same sequence values. Equation 53 represents an example of generating sequences.

$$r_{l',n_s}^1(m) = \quad \text{[Equation 53]}$$
$$\frac{1}{\sqrt{2}}(1-2\cdot c^1(2m))+j\frac{1}{\sqrt{2}}(1-2\cdot c^1(2m+1)),$$
$$m = 0, 1, \ldots, 3N_{RB}^{DL}-1$$
$$r_{l',n_s}^2(m) =$$
$$\frac{1}{\sqrt{2}}(1-2\cdot c^2(2m))+j\frac{1}{\sqrt{2}}(1-2\cdot c^2(2m+1)),$$
$$m = 0, 1, \ldots, 3N_{RB}^{DL}-1$$
$$r_{l',n_s}(m) = w_{l',n_s} \cdot r_{l',n_s}^1(m) \cdot r_{l',n_s}^2(m)$$

Here, $r_{l',n_s}^1(m)$ and $r_{l',n_s}^2(m)$ denote DRS sequences generated using Gold sequences initialized with different initialization values, l' is the DRS sequence index that is a function of OFDM symbol index, and $w_{l',n_s}$ denotes the Walsh code to be multiplied by DRS sequence index l' of slot number $n_s$.

The first sequence responsible for scrambling values between different DRS layers may need following combination of parameters in the initialization value. $N_{layer}$ is a layer index, $N_{cellid}$ is cell ID, $n_s$ is a slot index within a radio frame, l is an OFDM symbol index within a subframe, and k is a DRS OFDM symbol index in the subframe.

The second sequence responsible for scrambling values between different higher layers indicated IDs may need the following combination of parameters in the initialization value. $N_{LH-ID}$ is higher layer indicated ID (e.g. cell ID, CoMP group ID, etc.), $N_{cellid}$ is cell ID, $n_s$ is a slot index within a radio frame, l is an OFDM symbol index within a subframe, and k is an OFDM symbol index within the subframe.

Exemplary initialization values can be represented by the following Equations 54 and 55.

$$c_{init}^1 = N_{layer} \cdot 2^{i_3} + l \cdot 2^{i_4}$$

$$c_{init}^2 = N_{HL-ID} \cdot 2^{i_1} + (14 \cdot \lfloor n_s/2 \rfloor + l + 1) \cdot (2N_{HL-ID}+1) \cdot 2^{i_2} \quad \text{[Equation 54]}$$

$$c_{init}^1 = N_{layer} \cdot 2^{i_3} + k \cdot 2^{i_4}$$

$$c_{init}^2 = N_{HL-ID} \cdot 2^{i_1} + (4 \cdot n_s + k + 1) \cdot (2N_{HL-ID}+1) \cdot 2^{i_2} \quad \text{[Equation 55]}$$

In Equations 54 and 55, initialization value $i_1$, $i_2$, $i_3$ and $i_4$ should be chosen so that information loaded on the shift register of the initialization value are loaded into different shift register positions (e.g. $i_1$=7, $i_2$=16, $i_3$=0, and $i_4$=3, assuming $N_{layer}$ is 3 bits, $N_{HL-ID}$ is 9 bits, l can take values from 0 to 13, k can take value from 0 to 3, and $n_s$ can take values from 0 to 20).

Another exemplary sequence mapping method is described. The following Equation 56 represents an example of generating a sequence.

$$r_{n_s}^1(m') = \quad \text{[Equation 56]}$$
$$\frac{1}{\sqrt{2}}(1-2\cdot c^1(2m'))+jw_{l',n_s} \cdot \frac{1}{\sqrt{2}}(1-2\cdot c^1(2m'+1)),$$
$$m' = 0, 1, \ldots, 6N_{RB}^{DL}-1$$
$$r_{n_s}^2(m) =$$
$$\frac{1}{\sqrt{2}}(1-2\cdot c^2(2m))+j\frac{1}{\sqrt{2}}(1-2\cdot c^2(2m+1)),$$
$$m = 0, 1, \ldots, 12N_{RB}^{DL}-1$$
$$r_{n_s}(m) = r_{n_s}^1(m') \cdot r_{n_s}^2(m)$$

Here, l' is the DRS sequence index that is a function of OFDM symbol index, and $w_{l',n_s}$ denotes the Walsh code to be multiplied by DRS sequence index l' of slot number $n_s$.

The first sequence responsible for scrambling values between different DRS layers may need following combination of parameters in the initialization value. $N_{layer}$ is a layer index, and $N_{cellid}$ is cell ID.

The second sequence responsible for scrambling values between different higher layers indicated IDs may need the following combination of parameters in the initialization value. $N_{LH-ID}$ is higher layer indicated ID (e.g. cell ID, CoMP group ID, etc.), and $N_{cellid}$ is cell ID, $n_s$ is a slot index within a radio frame.

Exemplary initialization values can be represented by the following Equation 57.

$$c_{init}^1 = N_{layer} \cdot 2^{i_3}$$

$$c_{init}^2 = N_{HL-ID} \cdot 2^{i_1} + (n_s+1) \cdot (2N_{HL-ID}+1) \cdot 2^{i_2} \quad \text{[Equation 57]}$$

In this example, initialization value $i_1$, $i_2$, and $i_3$ should be chosen so that information loaded on the shift register of the initialization value are loaded into different shift register positions (e.g. $i_1$=3, $i_2$=12, and $i_3$=0, assuming $N_{layer}$ is 3 bits, $N_{HL-ID}$ is 9 bits of information).

Alternative Sequence Generation and Mapping Method

It may also be possible to generate and map the first sequence (noted as a layer specific Walsh spared sequence) by generating a sequence length equal to allocated RBs. Also at the same time, it is possible to generate and map the second sequence (noted as a layer common sequence) by generating a sequence length equal to the system bandwidth (or even possibly equal to a maximum RB size supported by specification). In this case, the sequence initialization value can be represented by the following Equation 58.

$$r_{n_s}^1(m') = w_{l',n_s} \cdot \frac{1}{\sqrt{2}}(1 - 2 \cdot c^1(2m')) +$$

$$jw_{l',n_s} \cdot \frac{1}{\sqrt{2}}(1 - 2 \cdot c^1(2m' + 1)),$$

$$m' = 0, 1, \ldots, 6N_{allocated-RB} - 1$$

$$r_{n_s}^2(m) =$$

$$\frac{1}{\sqrt{2}}(1 - 2 \cdot c^2(2m)) + j\frac{1}{\sqrt{2}}(1 - 2 \cdot c^2(2m + 1)),$$

$$m = 0, 1, \ldots, 12N_{RB}^{DL} - 1$$

$$r_{n_s}(m) = r_{n_s}^1(m') \cdot r_{n_s}^2(m)$$ [Equation 58]

The first sequence (noted as a layer specific Walsh spread sequence) responsible for scrambling values between different DRS layers and giving orthogonality between DRS layers may need following combination of parameters in the initialization value, which include $N_{layer}$ denoting the layer index, $N_{cellid}$ denoting cell ID, $N_{rnti}$ representing UE ID, and $n_s$ representing the slot index within the radio frame.

The second sequence (noted as a layer common sequence) responsible for scrambling values between different higher layers indicated IDs may need following combination of parameters in the initialization value. The parameters include $N_{LH-ID}$ denoting higher layer indicated ID (e.g. cell ID, CoMP group ID, etc.), $N_{cellid}$ representing cell ID, and $n_s$ denoting the slot index within the radio frame.

Exemplary initialization values can be represented by the following Equation 59.

$$c_{init}^1 = N_{layer} \cdot 2^{i_3} + (\lfloor n_s/2 \rfloor + 1) \cdot (2N_{ID}^{cell} + 1) \cdot 2^{i_4} + n_{RNTI} \cdot 2^{i_5}$$

$$c_{init}^2 = N_{HL-ID} \cdot 2^{i_1} + (\lfloor n_s/2 \rfloor + 1) \cdot (2N_{HL-ID} + 1) \cdot 2^{i_2} \text{ or}$$

$$c_{init}^2 = N_{ID}^{cell} \cdot 2^{i_1} + (\lfloor n_s/2 \rfloor + 1) \cdot (2N_{ID}^{cell} + 1) \cdot 2^{i_2}$$ [Equation 59]

In the examples above, initialization values can take values $i_1=0$, $i_2=9$, $i_3=30$, $i_4=16$, and $i_5=0$, and $N_{HL-ID}$ is 9 bits of information.

It may be even possible to load the layer index in one of the m-sequences for the first sequence (noted as a layer specific Walsh spread sequence) and in the other m-sequence load values consisting of cell ID, UE ID and subframe index.

Here, the first m-sequence initialization value of the first Gold code can be denoted as $c_{init}^{1-1} = \Sigma_{i=0}^{30} x_1(i) \cdot 2^i$, and the second m-sequence initialization value of the first Gold code can be denoted as $c_{init}^{1-2} = \Sigma_{i=0}^{30} x_2(i) \cdot 2^i$.

Here, $c_{init}^{1-1} = N_{layer} \cdot 2^{i_3} + 1$, $c_{init}^{1-2} = (\lfloor n_s/2 \rfloor + 1) \cdot (2N_{ID}^{cell} + 1) \cdot 2^{i_4} + n_{RNTI} \cdot 2^{i_5}$, and $c_{init}^2 = N_{HL-ID} \cdot 2^{i_1} + (\lfloor n_s/2 \rfloor + 1) \cdot (2N_{HL-ID} + 1) \cdot 2^{i_2}$ or $c_{init}^2 = N_{ID}^{cell} \cdot 2^{i_1} + (\lfloor n_s/2 \rfloor + 1) \cdot (2N_{ID}^{cell} + 1) \cdot 2^{i_2}$.

In this example, $i_1=0$, $i_2=9$, $i_3=1$, $i_4=16$, $i_5=0$, and $N_{HL-ID}$ is 9 bits of information.

A description will be made of reasons for having randomization of inter-cell interference and randomization methods.

Figure 40:
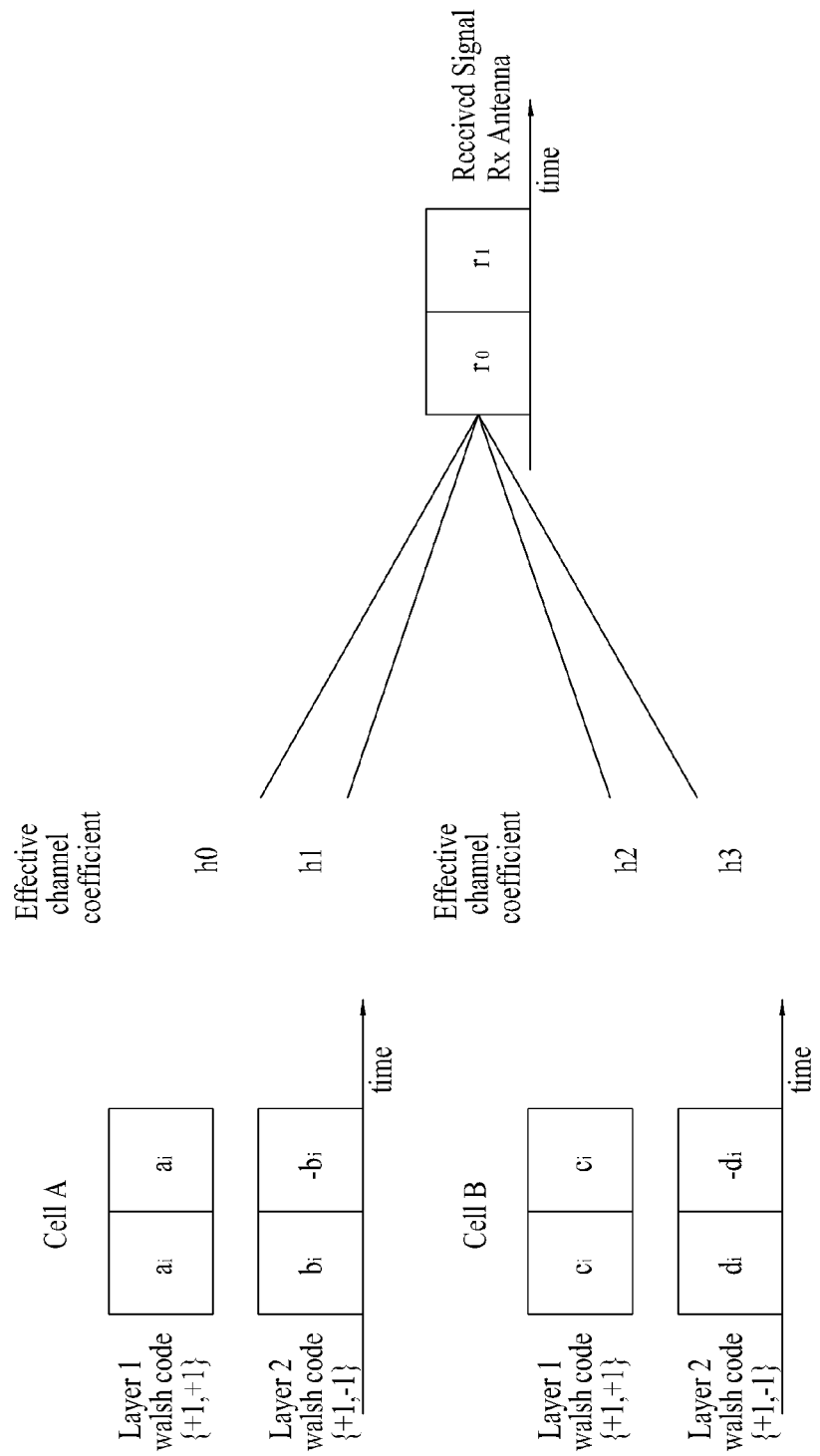
FIG. 40 illustrates an example of transmitting a DRS using a DRS sequence in the case of two cells.

FIG. 40 illustrates an example of transmitting a DRS using a DRS sequence for which two cells are generated.

The received signal equation and the estimated channel for Rx antenna port point of view, as shown in the right part of FIG. 40, are formulated as Equations 60 and 61.

$$r_0 = h_0 \cdot a_i + h_1 \cdot b_i + h_2 \cdot c_i + h_3 \cdot d_i + n_0$$

$$r_1 = h_0 \cdot a_i - h_1 \cdot b_i + h_2 \cdot c_i - h_3 \cdot d_i + n_1$$ [Equation 60]

Here, $h_0$, $h_1$, $h_2$ and $h_3$ denote effective channel coefficients, $a_i$, and $c_i$ denote scrambling code sequences, and $n_0$ and $n_1$ denote noise.

$$\tilde{h}_0 = (r_0 + r_1) \cdot a_i^* / 2$$ [Equation 61]
$$= (h_0 \cdot a_i + h_1 \cdot b_i + h_2 \cdot c_i + h_3 \cdot d_i + n_0 + h_0 \cdot$$
$$a_i - h_1 \cdot b_i + h_2 \cdot c_i - h_3 \cdot d_i + n_1) \cdot a_i^* / 2$$
$$= (2h_0 \cdot a_i + 2h_2 \cdot c_i + n') \cdot a_i^* / 2$$
$$= h_0 + h_2 \cdot c_i \cdot a_i^* + n''$$
$$= h_0 + z_1 + n''$$

$$\tilde{h}_1 = (r_0 - r_1) \cdot b_i^* / 2$$
$$= (h_0 \cdot a_i + h_1 \cdot b_i + h_2 \cdot c_i + h_3 \cdot d_i + n_0 - h_0 \cdot$$
$$a_i + h_1 \cdot b_i - h_2 \cdot c_i + h_3 \cdot d_i - n_1) \cdot b_i^* / 2$$
$$= (2h_1 \cdot b_i + 2h_3 \cdot d_i + n') \cdot b_i^* / 2$$
$$= h_1 + h_3 \cdot d_i \cdot b_i^* + n''$$
$$= h_1 + z_1' + n''$$

Figure 41:
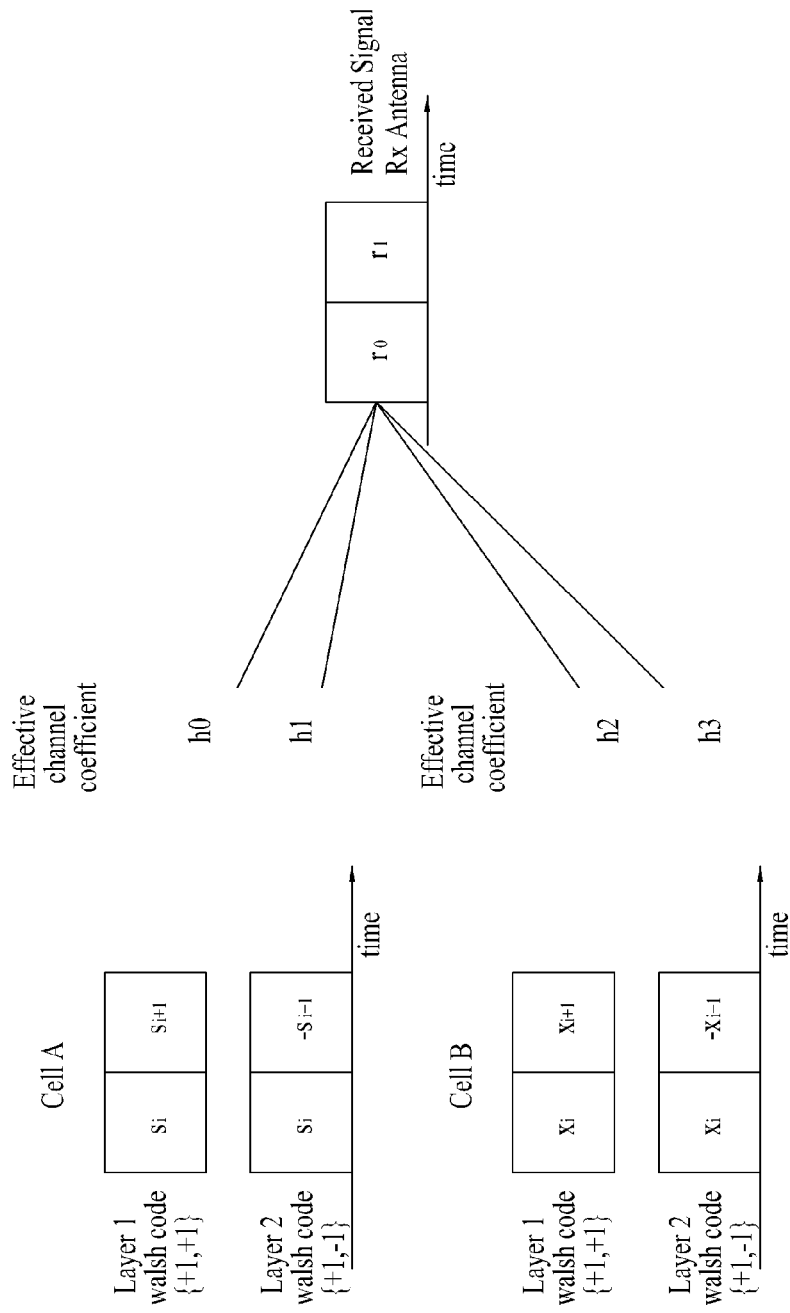
FIG. 41 illustrates an example of transmitting a DRS using a DRS sequence in the case of two cells.

FIG. 41 illustrates an example of transmitting a DRS using a DRS sequence for which two cells are generated.

The received signal equation and the estimated channel for Rx antenna port point of view, as shown in FIG. 41, are formulated as Equations 62 and 63.

$$r_0 = (h_0 + h_1) \cdot s_i + (h_2 + h_3) \cdot x_i + n_0$$

$$r_1 = (h_0 - h_1) \cdot s_{i+1} + (h_2 - h_3) \cdot x_{i+1} + n_1$$ [Equation 62]

Here, $h_0$, $h_1$, $h_2$ and $h_3$ denote effective channel coefficients, $s_i$ and $x_i$ denote scrambling code sequences, and $n_0$ and $n_1$ denote noise.

$$\tilde{h}_0 = (r_0 \cdot s_i^* + r_1 \cdot s_{i+1}^*)/2$$ [Equation 63]
$$= ((h_0 + h_1) + (h_2 + h_3) \cdot x_i \cdot s_i^* + n_0 \cdot s_i^* +$$
$$(h_0 - h_1) + (h_2 - h_3) \cdot x_{i+1} \cdot s_{i+1}^* + n_1 \cdot s_{i+1}^*)/2$$
$$= h_0 + (h_2 \cdot x_i \cdot s_i^* + h_3 \cdot x_i \cdot s_i^* +$$
$$h_2 \cdot x_{i+1} \cdot s_{i+1}^* - h_3 \cdot x_{i+1} \cdot s_{i+1}^* + n')/2$$
$$= h_0 + z_1 + z_2 + z_3 + z_4 + n''$$

$$\tilde{h}_1 = (r_0 \cdot s_i^* - r_1 \cdot s_{i+1}^*)/2$$
$$= ((h_0 + h_1) + (h_2 + h_3) \cdot x_i \cdot s_i^* + n_0 \cdot s_i^* -$$
$$(h_0 - h_1) - (h_2 - h_3) \cdot x_{i+1} \cdot s_{i+1}^* - n_1 \cdot s_{i+1}^*)/2$$
$$= h_1 + (h_2 \cdot x_i \cdot s_i^* + h_3 \cdot x_i \cdot s_i^* -$$
$$h_2 \cdot x_{i+1} \cdot s_{i+1}^* + h_3 \cdot x_{i+1} \cdot s_{i+1}^* + n')/2$$
$$= h_1 + z_1' + z_2' + z_3' + z_4' + n''$$

In the case of Equations 62 and 63 related to FIG. 41, inter-layer interference from other cells is spread out across all layers due to more interference randomization factors compared to Equations 60 and 61 related to FIG. 40. This method can achieve full interference randomization.

Figure 42:
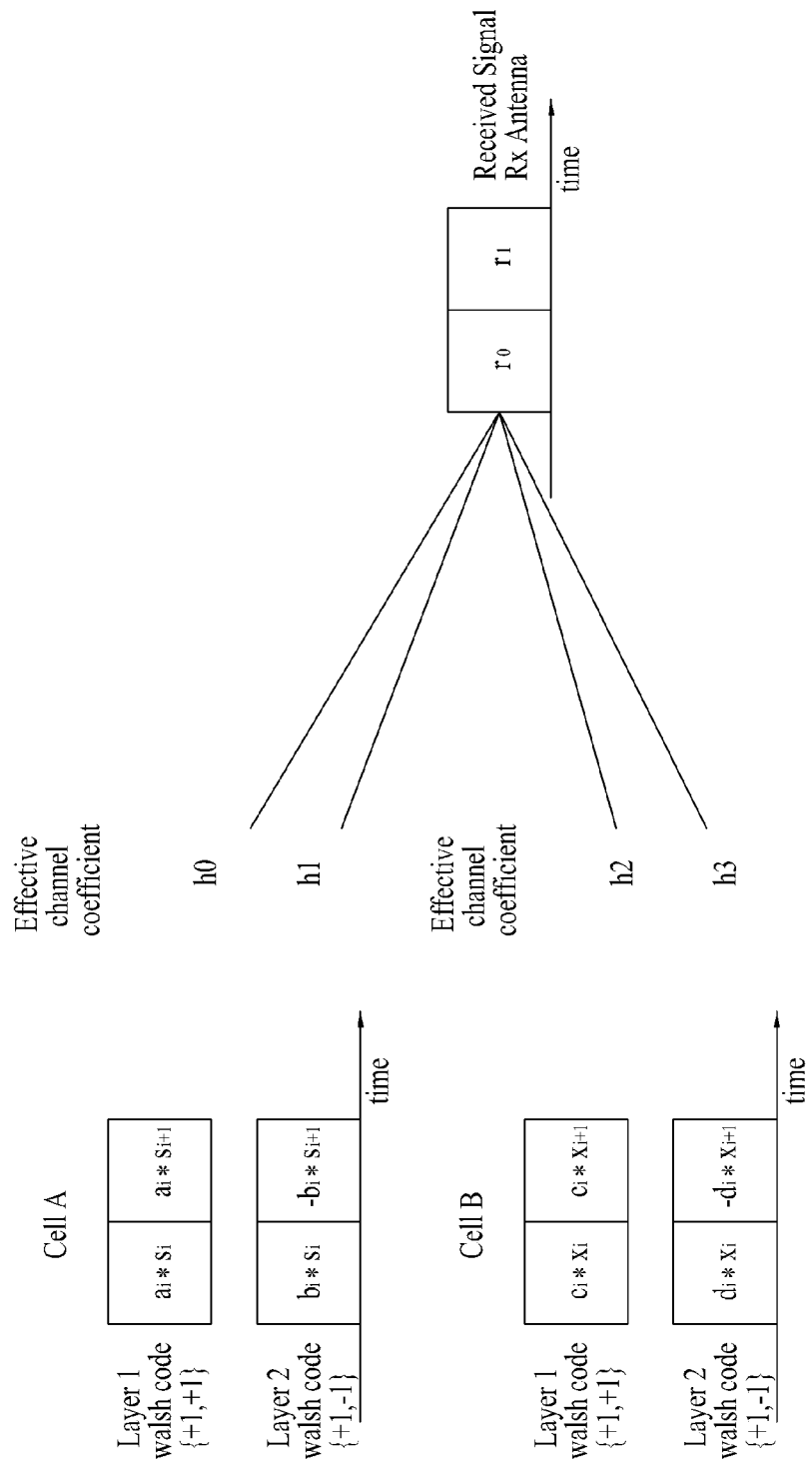
FIG. 42 illustrates an example of transmitting a DRS using a DRS sequence in the case of two cells.

FIG. 42 illustrates an example of transmitting a DRS using a DRS sequence for which two cells are generated.

The method shown FIG. 42 can achieve the same interference randomization effect as Walsh covering for a hybrid method.

The received signal equation and the estimated channel for Rx antenna port point of view, as shown in FIG. 42, are formulated as Equations 64 and 65.

$$r_0 = (h_0 \cdot a_i + h_1 \cdot b_i) \cdot s_i + (h_2 \cdot c_i + h_3 \cdot d_i) \cdot x_i + n_0$$

$$r_1 = (h_0 \cdot a_i - h_1 \cdot b_i) \cdot s_{i+1} + (h_2 \cdot c_i - h_3 \cdot d_i) \cdot x_{i+1} + n_1 \quad \text{[Equation 64]}$$

Here, $h_0$, $h_1$, $h_2$ and $h_3$ denote effective channel coefficients, $s_i$ and $x_i$ denote scrambling code sequences, and $n_0$ and $n_1$ denote noise.

$$\begin{aligned}
\tilde{h}_0 &= (r_0 \cdot s_i^* + r_1 \cdot s_{i+1}^*) \cdot a_i^* / 2 \quad \text{[Equation 65]}\\
&= ((h_0 \cdot a_i + h_1 \cdot b_i) + (h_2 \cdot c_i + h_3 \cdot d_i) \cdot x_i \cdot s_i^* + \\
&\quad n_0 \cdot s_i^* + (h_0 \cdot a_i - h_1 \cdot b_i) + (h_2 \cdot c_i - h_3 \cdot d_i) \cdot \\
&\quad x_{i+1} \cdot s_{i+1}^* + n_1 \cdot s_{i+1}^*) \cdot a_i^* / 2 \\
&= h_0 + (h_2 \cdot c_i \cdot x_i \cdot s_i^* + h_3 \cdot d_i \cdot x_i \cdot s_i^* + \\
&\quad h_2 \cdot c_i \cdot x_{i+1} \cdot s_{i+1}^* - h_3 \cdot d_i \cdot x_{i+1} \cdot s_{i+1}^* + \\
&\quad n') \cdot a_i^* / 2 \\
&= h_0 + z_1 + z_2 + z_3 + z_4 + n''
\end{aligned}$$

$$\begin{aligned}
\tilde{h}_1 &= (r_0 \cdot s_i^* - r_1 \cdot s_{i+1}^*) \cdot a_i^* / 2 \\
&= ((h_0 \cdot a_i + h_1 \cdot b_i) + (h_2 \cdot c_i + h_3 \cdot d_i) \cdot x_i \cdot s_i^* + \\
&\quad n_0 \cdot s_i^* - (h_0 \cdot a_i - h_1 \cdot b_i) - (h_2 \cdot c_i - h_3 \cdot d_i) \cdot \\
&\quad x_{i+1} \cdot s_{i+1}^* - n_1 \cdot s_{i+1}^*) \cdot a_i^* / 2 \\
&= h_1 + (h_2 \cdot c_i \cdot x_i \cdot s_i^* + h_3 \cdot c_i \cdot x_i \cdot s_i^* - \\
&\quad h_2 \cdot c_i \cdot x_{i+1} \cdot s_{i+1}^* + h_3 \cdot d_i \cdot x_{i+1} \cdot s_{i+1}^* + n') \cdot a_i^* / 2 \\
&= h_1 + z'_1 + z'_2 + z'_3 + z'_4 + n''
\end{aligned}$$

Figure 43A:
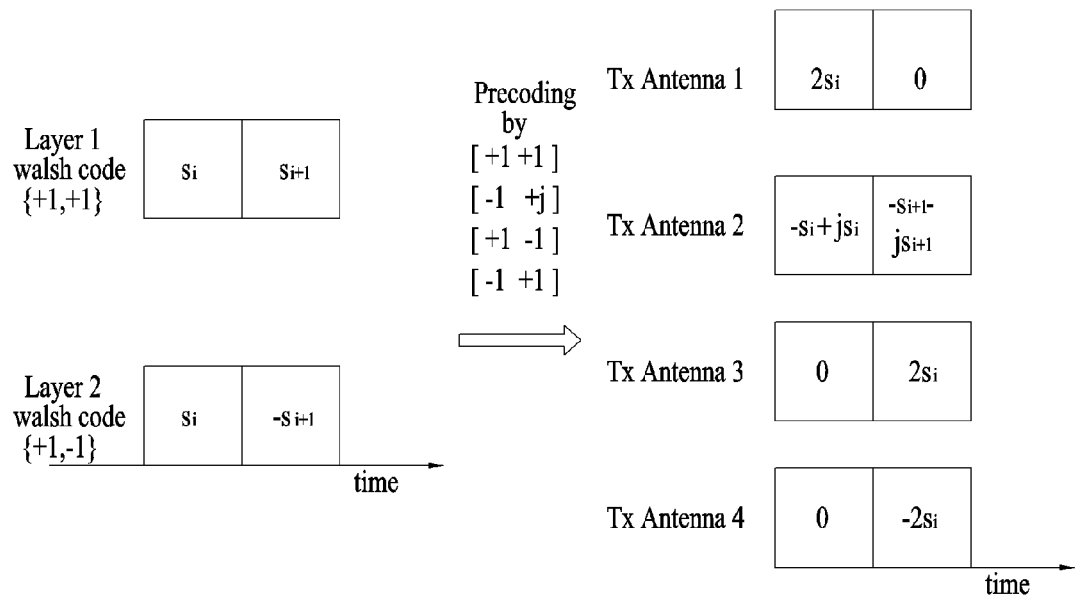
FIG. 43(a) illustrates an example of transmitting a DRS using a generated DRS sequence.
Figure 43B:
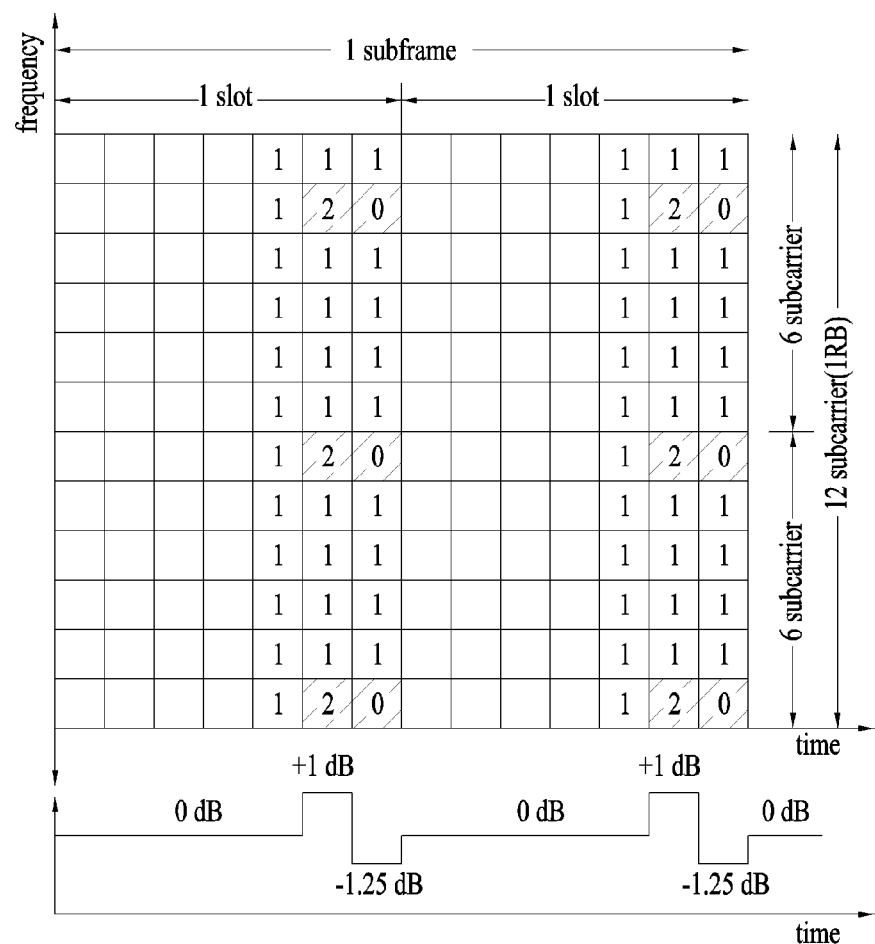
FIG. 43(b) illustrates transmit power according to the transmission scheme shown in FIG. 43(a)

FIG. 43(a) illustrates an example of transmitting a DRS using a generated DRS sequence and FIG. 43(b) illustrates transmit power according to the transmission scheme shown in FIG. 43(a).

Having the same DRS sequence for code division multiplexed two layers (possibly even four layers) can suffer from transmit power difference between adjacent OFDM symbols under certain precoding environments as shown in FIG. 43(b).

In FIG. 43(a), it is assumed that only layer common sequence is utilized. This means that the same sequence is used in each layer. In addition, precoding matrix [+1, −1, +1, −1; +1, +j, −1, +1] is used for wideband precoding for a UE that occupies most of the bandwidth. The maximum transmit power difference due to precoded Walsh code combining may have up to +1 dB∼−1.25 dB power difference compared to other OFDM symbols as shown in FIG. 43(b). In potential event for LTE-A, where four layers can be code multiplexed, the potential maximum transmit power difference is increased further to +2.4 dB∼−1.24 dB.

Figure 44:
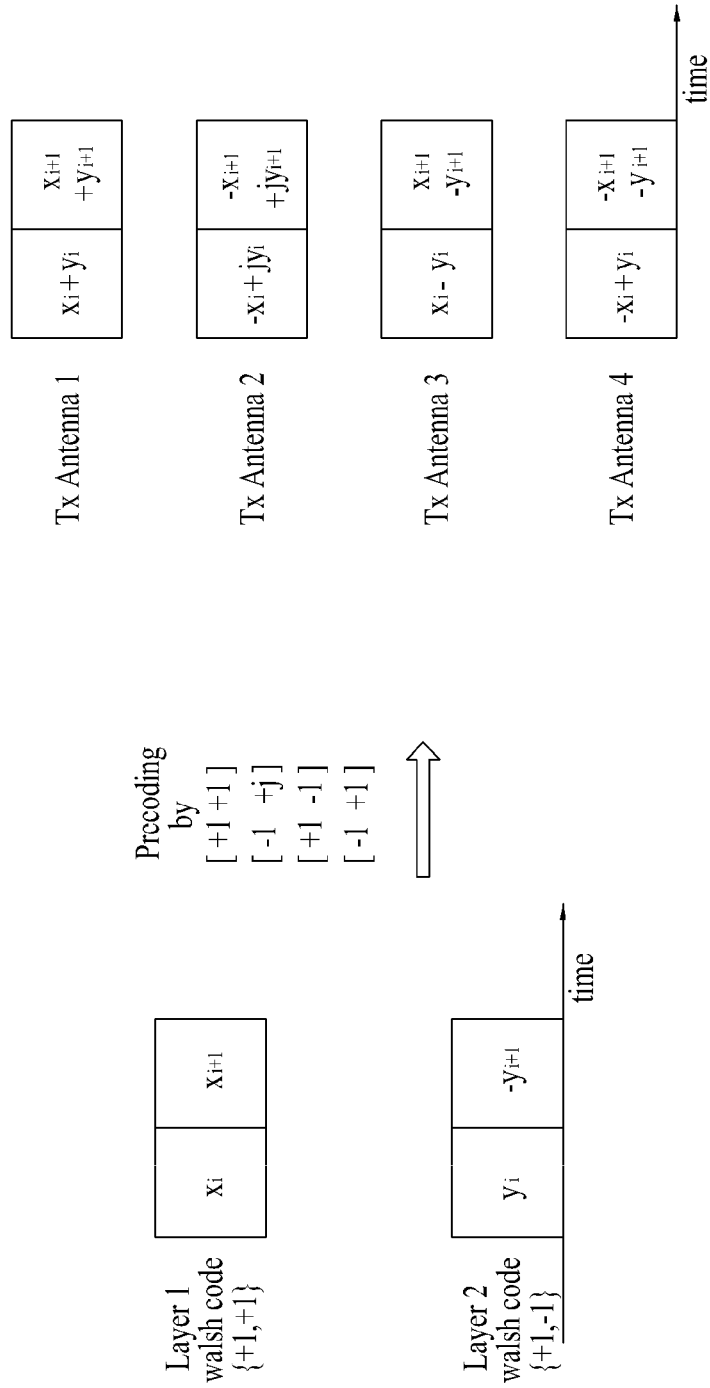
FIG. 44 illustrates an example of transmitting a DRS using a generated DRS sequence.

FIG. 44 illustrates an example of transmitting a DRS using a generated DRS sequence.

As shown in FIG. 44, if sequences used in layers are allowed to have different sequence values, then the power concentration and power nulling effect can be randomized. This power concentration occurs when a specific symbol has $2*S_i$ (full constructive sum) after precoding as shown in FIG. 43, and the power nulling is generated in specific frequency subcarrier and OFDM symbol positions when a specific symbol of the precoding matrix is 0 (full destructive sum).

Since a sequence value changes over frequency and time, the full constructive and destructive sums are effectively randomized and the worst case scenario (constructive or destructive sum happening across the entire bandwidth) can be avoided. So in order to avoid this power concentration of specific antenna ports, the sequence from each layer should be different so that the power concentration is scattered among different REs, and effectively removed.

A description will be made of a method for solving Walsh code variation and average peak power problem.

Figure 45:
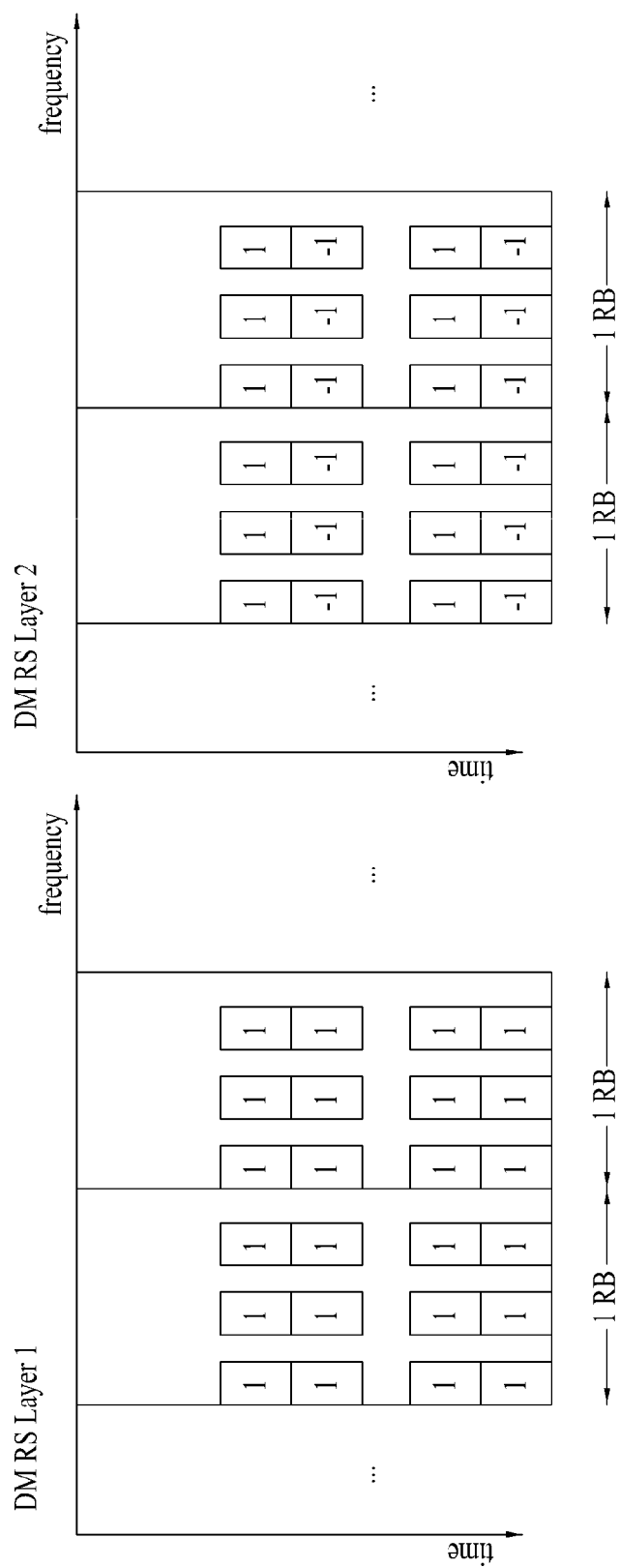
FIG. 45 illustrates an exemplary method for allocating a CDM code to each layer.

FIG. 45 illustrates an exemplary method for allocating a CDM code to each layer.

When the same sequence is applied to all layers, a DM RS for each layer keeps orthogonality between DM RSs using different CDM codes. The simplest method of assigning a CDM code for each DM RS layer is to assign code {+1, +1} to the first layer and {+1, −1} to the second layer for all the CDM RE sets within the allocated RBs, as shown in FIG. 45.

Figure 46A:
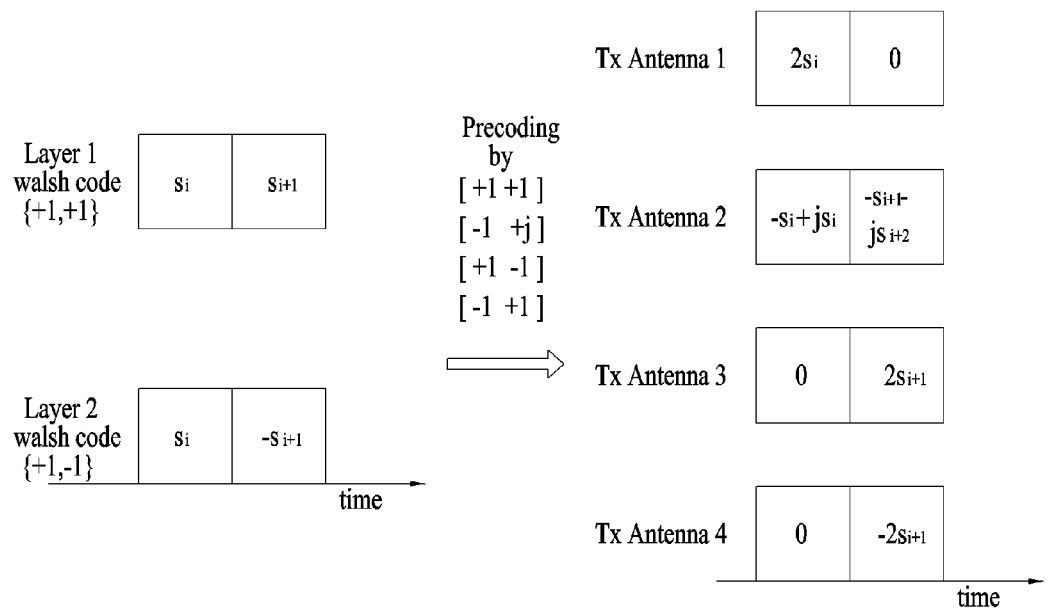
FIG. 46(a) illustrates an example of transmitting a DM RS sequence.
Figure 46B:
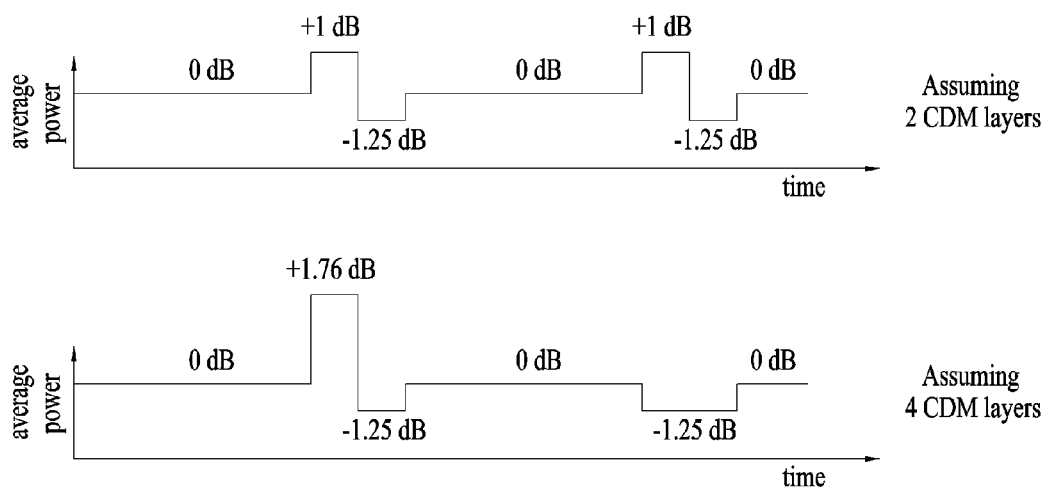
FIG. 46(b) illustrates transmit power according to the transmission scheme of FIG. 46(a)

FIG. 46(a) illustrates an example of transmitting a DM RS sequence and FIG. 46(b) illustrates transmit power according to the transmission scheme of FIG. 46(a).

DM RS sequences for respective layers are multiplied by a precoding element and multiplexed together. This means that for a certain precoding matrix row vector such as [+1, +1] or [+1, −1], the DM RS sequence values are combined and transmitted onto a physical antenna port, as shown in FIG. 46(a). From combining of CDM codes to a physical antenna port, a certain precoded RE may have zero power and certain precoded REs may have twice the power.

FIG. 46(a) shows DM RS sequences at each transmit antenna prior to precoding and after precoding. Referring to FIG. 45(b), when it is assumed that wideband precoding is applied and two layers are transmitted, all the DM RS REs within a physical antenna port in a certain OFDM symbol may have twice the power or zero power. Furthermore, if it is assumed that four layers are multiplexed in a CDM manner and transmitted, a specific DM RS RE in a certain OFDM symbol may have four times the power and other DM RS REs may have zero power. FIG. 46(b) shows the worst case scenario for a certain physical antenna port where the average transmit power for each OFDM symbol changes.

Figure 47:
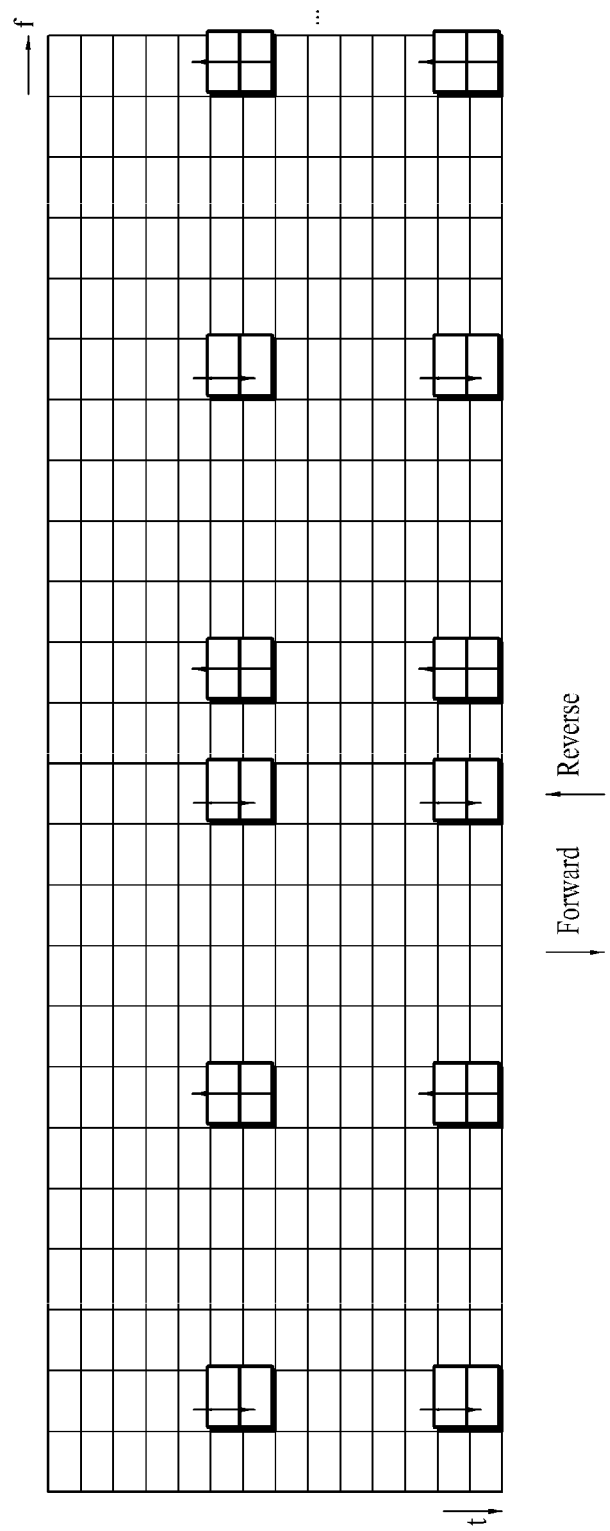
FIG. 47 illustrates an exemplary DRS sequence mapping method.

FIG. 47 illustrates an exemplary DRS sequence mapping method.

High Peak Averages (PAs) of power for specific REs are critical issues at an eNode B. Some of the PAs need to be designed so that it can transmit higher power output in certain OFDM symbols. From this perspective, it is beneficial to randomize CDM codes such that precoded DM RS values change across frequency. One method of randomizing the CDM codes is to map Walsh codes differently in each frequency subcarrier carrying DM RS, as shown in FIG. 46.

Figure 48:
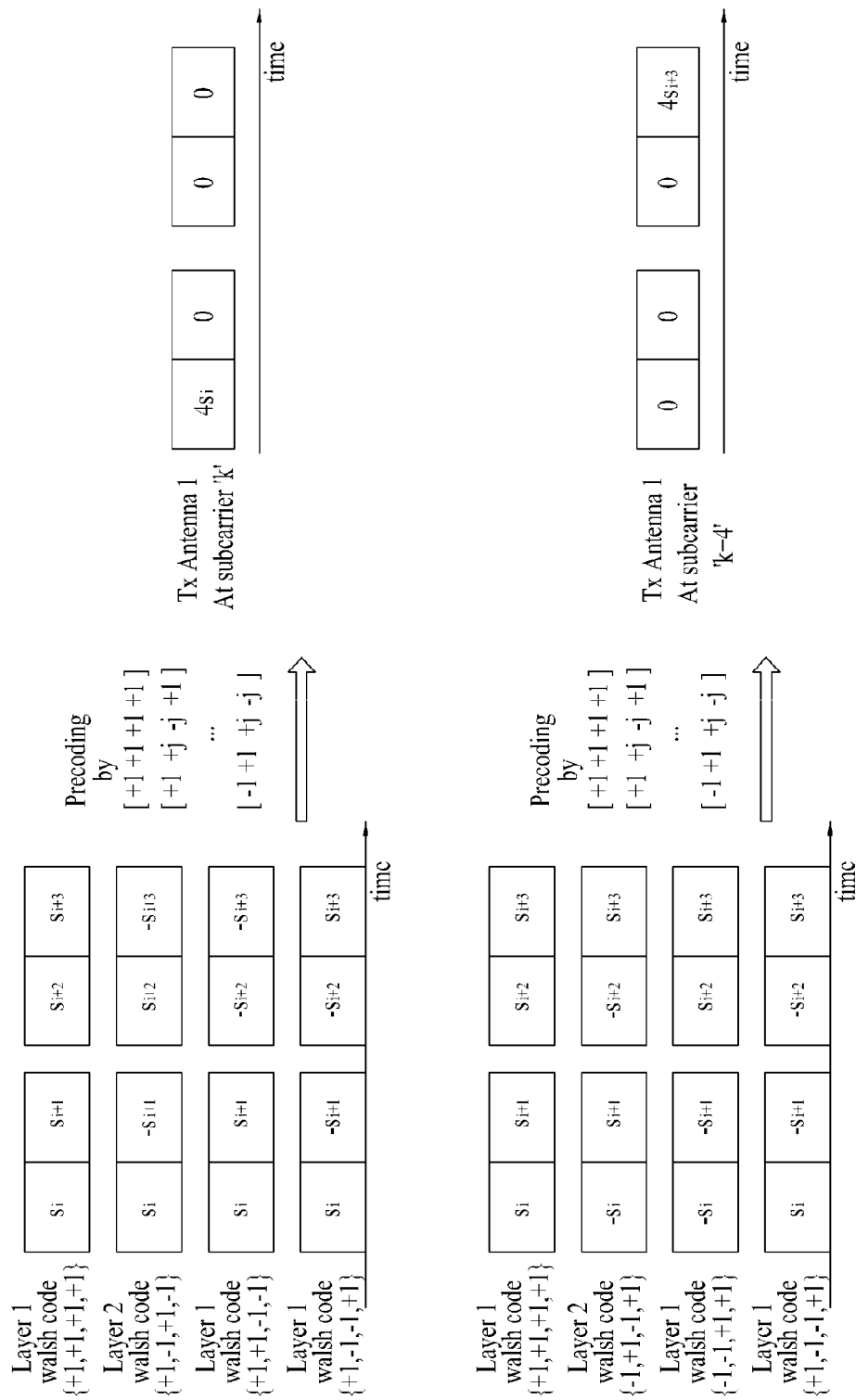
FIG. 48 illustrates an example of transmitting a DRS using a generated DRS sequence.

FIG. 48 illustrates an example of transmitting a DRS using a generated DRS sequence.

The average power from Tx antenna 1 can be a summation of REs in subcarrier k and k+4. Although the Walsh code help mitigate the peak power somewhat, it does not eliminate the issue at all. Thus, more general approach of solving peak power problem need to be considered.

Figure 49:
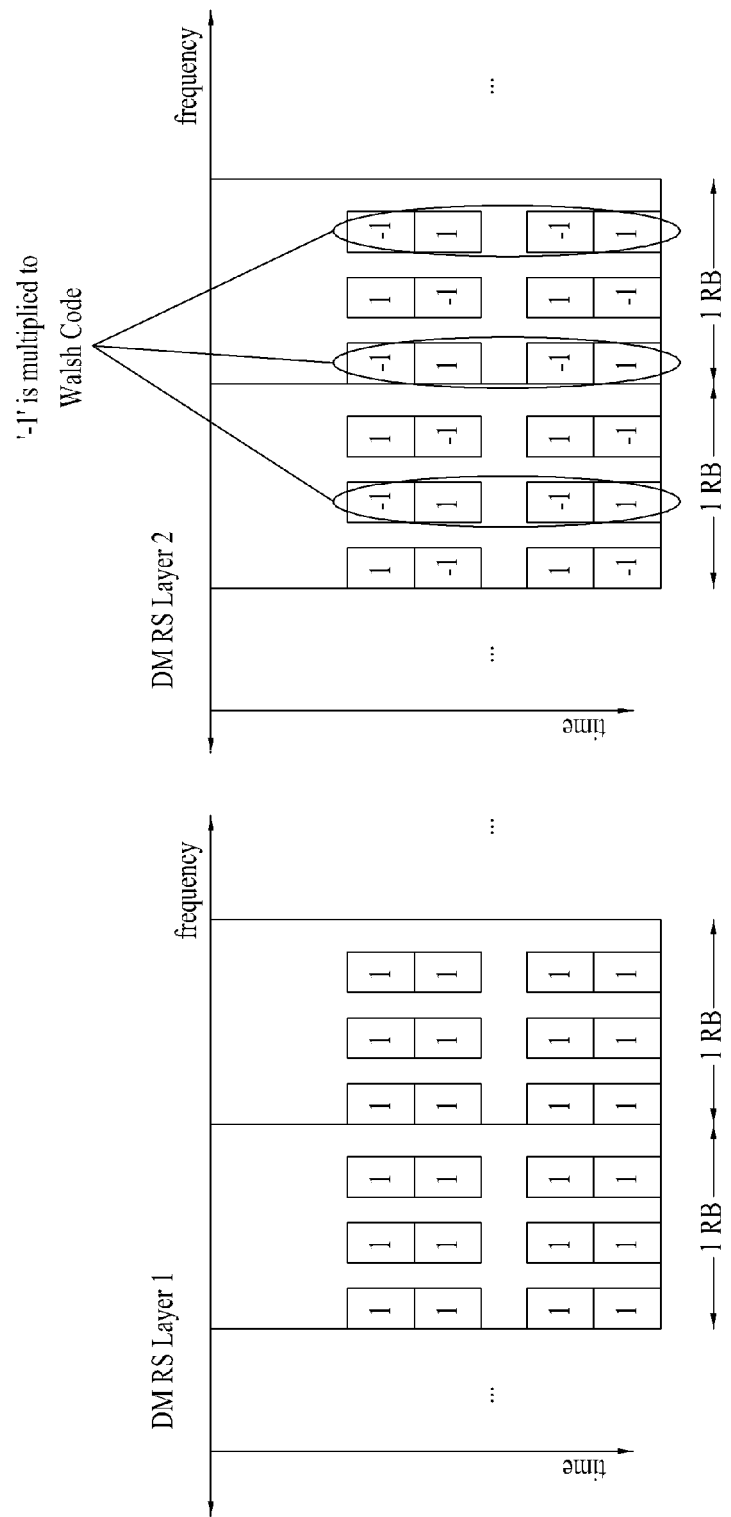
FIG. 49 illustrates an exemplary method for applying a Walsh code to a DM RS.

FIG. 49 illustrates an exemplary method for applying the Walsh code to a DM RS.

An approach for solving peak power problem is to randomize the Walsh code for the second layer. The Walsh code can be multiplied by different values in each subcarrier carrying DM RS, as shown in FIG. 48. If sufficient randomization of each DM RS layer is allowed, then the peak power problem even for four CDM layers can be removed. This means that by multiplying each Walsh code by a certain value in either frequency domain or time domain, it is possible to randomize precoded DM RS REs for each physical antenna port.

Figure 50:
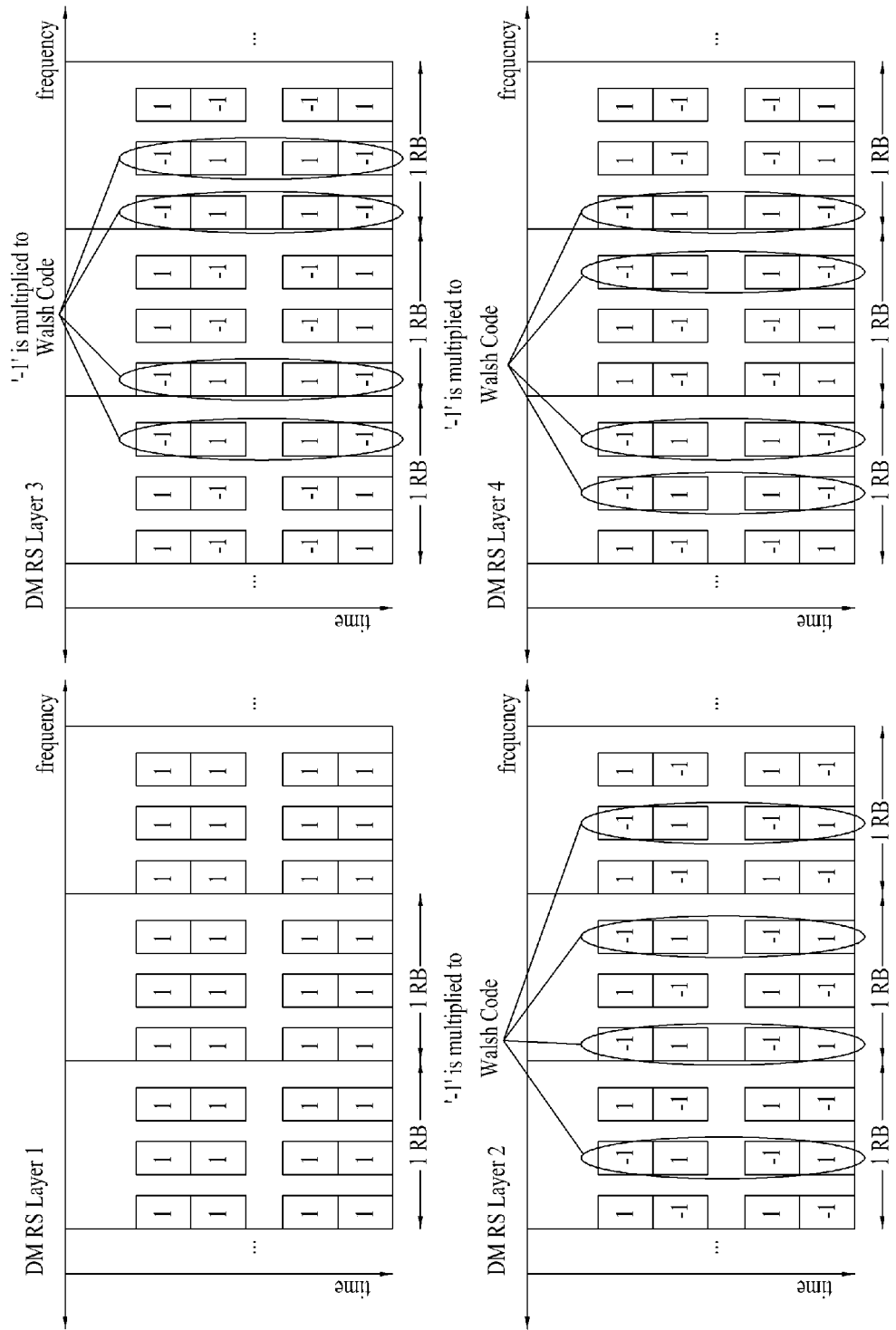
FIGS. 50 and 51 illustrate exemplary methods for applying a Walsh code to four DM RSs.
Figure 51:
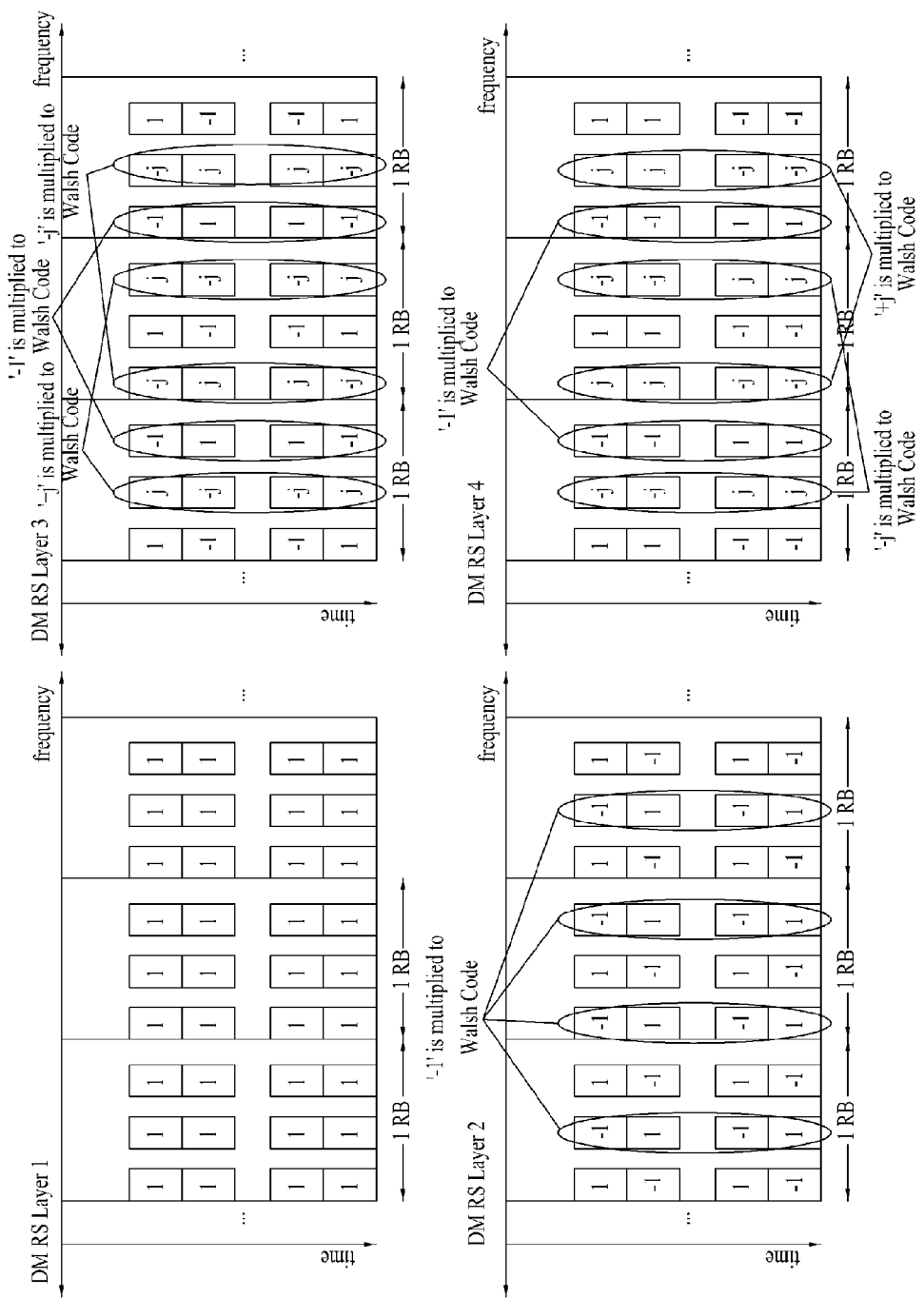

FIGS. 50 and 51 illustrate exemplary methods for applying the Walsh code to four DM RSs.

As illustrated in FIGS. 50 and 51, different fixed sequences are multiplied by the Walsh code of each DM RS layer in frequency domain (or even time domain on the assumption that Walsh code of length 2 is used). This allows orthogonalization of each DM RS as well as randomized peak power.

Figure 52:
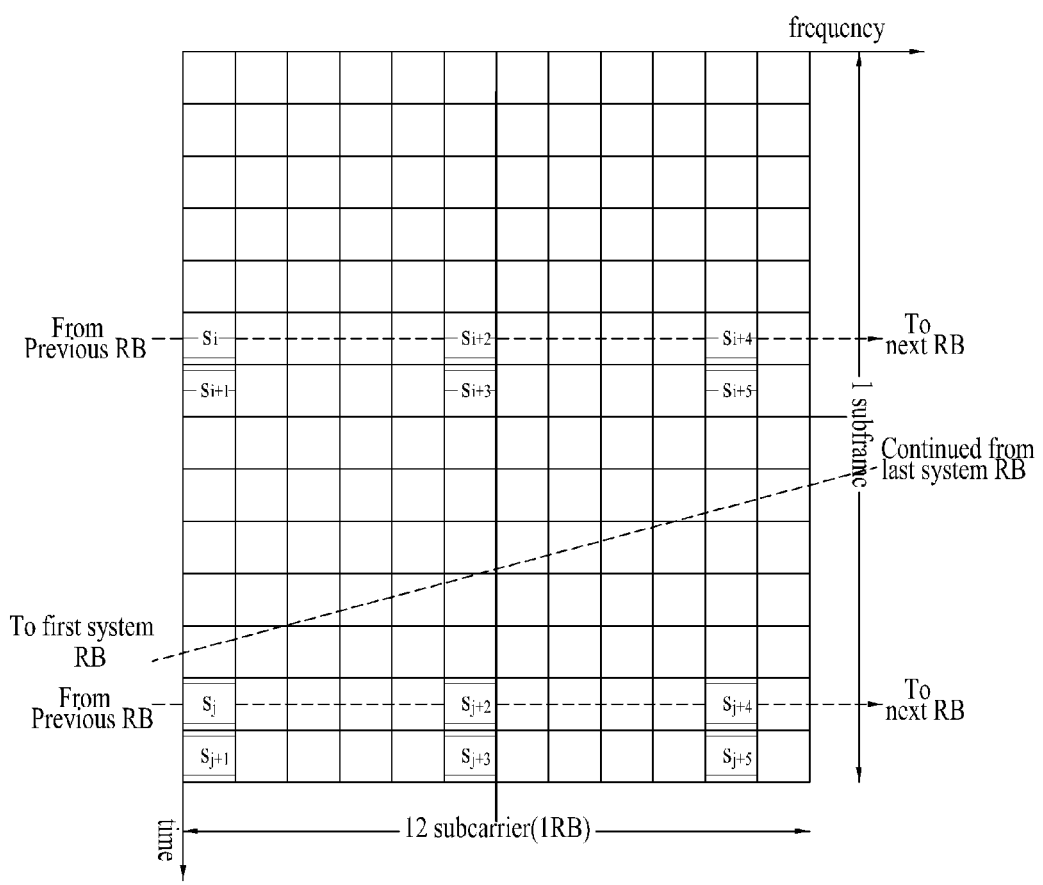
FIG. 52 illustrates an exemplary DM RS sequence mapping method.

FIG. 52 illustrates an exemplary DM RS sequence mapping method.

In order to allow efficient channel estimation implementation at a UE side, the scrambling code used for DM RS needs to be mapped in the direction in which the UE generates the scrambling code and performs channel estimation. Since the DM RS CDM code is applied in the time domain, it may be beneficial to certain UE implementation to map the DM RS sequence to all CDM pairs and then move on to the next frequency subcarrier. The proposed mapping method is shown in FIG. 50.

The peak power problem due to usage of the same Walsh code over different CDM RE sets may be critical to eNode B PA design. To solve this problem, the Walsh code used in each layer can be multiplied by a certain (or even random) value, which allows randomization of precoded DM RS REs. This will be a scalable solution especially if it is decided to have four CDM DM RS layers for LTE Rel-10. An example of this method for two CDM layers is shown in FIG. 50. It is possible to achieve efficient UE channel estimation implementation by mapping the DM RS scrambling code as shown in FIG. 50.

The term 1 RB described in the present invention includes 1 RB pair. That is, 1 RB includes 12 subcarriers in the frequency domain and 7 OFDM symbols in the time domain, whereas 1 RB pair includes 14 OFDM symbols in the time domain. In the present invention, 1 RB is used in such a manner that it includes resources corresponding to 1 RB pair.

Figure 53:
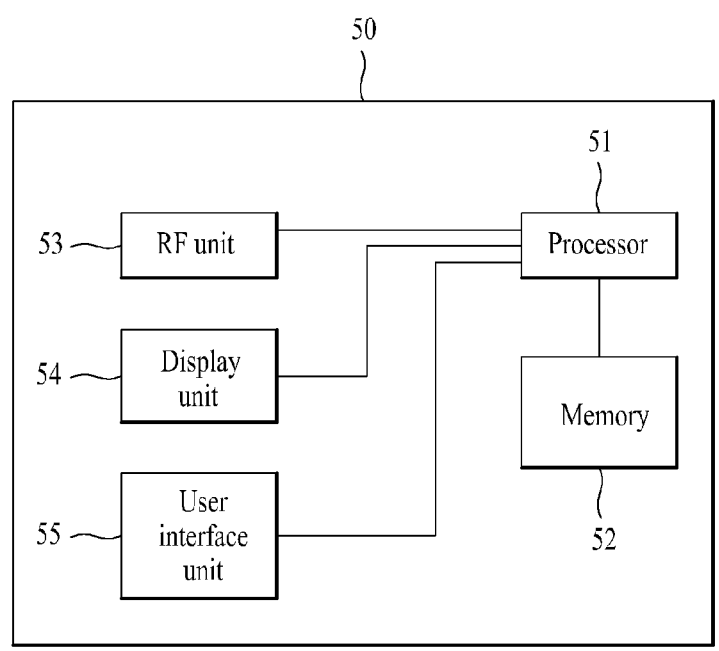
FIG. 53 is a block diagram of an apparatus 50 according to an embodiment of the present invention.

FIG. 53 is a block diagram of an apparatus 50 according to an embodiment of the present invention.

Referring to FIG. 53, the apparatus 50 may be a UE or an eNode B. The apparatus 50 includes a processor 51, a memory 52, a RF unit 53, a display unit 54, and a user interface unit 55.

Layers of radio interface protocol are implemented in the processor 51. The processor 51 provides a control plane and a user plane. The function of each layer can be implemented within the processor 51. The memory 52 is connected with the processor 51 and stores operating systems, applications, and general files.

The display unit 54 displays various information and can use known elements such as a Liquid Crystal Display (LCD), an Organic Light Emitting Diode (OLED), etc.

The user interface unit 55 can be configured with a combination of known user interfaces such as a keypad, touchscreen, etc.

The RF unit 53 is connected with the processor 51 and transmits/receives RF signals. The RF unit 53 can be divided into a processor transmission module (not shown) and a reception module (not shown).

Layers of RF interface protocol between a UE and an eNode B can be classified into a first layer (L1), a second layer (L2), and a third layer (L3) on the basis of lower three layers of Open System Interconnection (OSI) model well-known in communication systems.

The physical layer belongs to the first layer and provides an information transmission service through a physical channel. The Radio Resource Control (RRC) layer belongs to the third layer and provides control radio resources between a UE and a network. The UE and the network exchange RRC messages through the RRC layer.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The apparatus and method for transmitting/receiving a reference signal in a wireless communication system according to the present invention can be applied to wireless communication systems such as 3GPP LTE, LTE-A, IEEE 802.16 systems, etc.

What is claimed is:
1. A method for an eNode B transmitting user equipment (UE)-specific reference signals to a UE in a wireless communication system, the method comprising:
generating, by the eNodeB, the UE-specific reference signal sequences by applying a set of Walsh codes to reference signal sequences for resource elements (REs) that are allocated to each of a plurality of layers used for transmitting the UE-specific reference signals; and transmitting, by the eNodeB to the UE via each layer of the plurality of layers, the UE-specific reference signals to which the generated UE-specific reference signal sequences are applied, wherein the set of Walsh codes is repeatedly applied to the reference signal sequences in a frequency domain direction by units of two resource block (RB) pairs, wherein a mapping pattern of the set of Walsh codes mapped to a first resource block (RB) pair is different from a mapping pattern of the set of Walsh codes mapped to a second RB pair, and wherein the second RB pair is contiguous to the first RB pair in a frequency domain.

2. The method of claim 1, wherein:
the set of Walsh codes includes first Walsh codes for a first layer group and second Walsh codes for a second layer group;
the first Walsh codes are applied to each layer of the first layer group; and
the second Walsh codes are applied to each layer of the second layer group.

3. The method of claim 2, wherein the first Walsh codes are:
[1 1 1 1] for a first layer;
[1 −1 1 −1] for a second layer;
[1 1 −1 −1] for a third layer; and
[1 −1 −1 1] for a fourth layer.

4. The method of claim 2, wherein the first Walsh codes are:
mapped sequentially one-to-one in a direction of a time domain to REs of a first subcarrier allocated to the first RB pair;
mapped sequentially one-to-one in an opposite direction of the time domain to REs of a second subcarrier allocated to the first RB pair; and
mapped sequentially one-to-one in the direction of the time domain to REs of a third subcarrier allocated to the first RB pair.

5. The method of claim 4, wherein the first Walsh codes are:
mapped sequentially one-to-one in the opposite direction of the time domain to REs of a first subcarrier allocated to the second RB pair;
mapped sequentially one-to-one in the direction of the time domain to REs of a second subcarrier allocated to the second RB pair; and
mapped sequentially one-to-one in the opposite direction of the time domain to REs of a third subcarrier allocated to the second RE pair.

6. The method of claim 4, wherein the second Walsh codes are:
mapped sequentially one-to-one in the direction of the time domain to REs of a fourth subcarrier allocated to the first RB pair;
mapped sequentially one-to-one in the opposite direction of the time domain to REs of a fifth subcarrier allocated to the first RB pair; and
mapped sequentially one-to-one in the direction of the time domain to REs of a sixth subcarrier allocated to the first RB pair.

7. The method of claim 6, wherein the second Walsh codes are:
mapped sequentially one-to-one in the opposite direction of the time domain to REs of a fourth subcarrier allocated to the second RB pair;
mapped sequentially one-to-one in the direction of the time domain to REs of a fifth subcarrier allocated to the second RB pair; and
mapped sequentially one-to-one in the opposite direction of the time domain to REs of a sixth subcarrier allocated to the second RB pair.

8. A method for a user equipment (UE) receiving user equipment (UE)-specific reference signals from an eNodeB in a wireless communication system, the method comprising:
receiving, by the UE from the eNodeB via each layer of a plurality of layers, the UE-specific reference signals to which UE-specific reference signal sequences are applied, wherein the UE-specific reference signal sequences are generated by applying a set of Walsh codes to reference signal sequences for resource elements (REs) that are allocated to each of the plurality of layers, wherein the set of Walsh codes is repeatedly applied to the reference signal sequences in a frequency domain direction by units of two resource block (RB) pairs, wherein a mapping pattern of the set of Walsh codes mapped to a first resource block (RB) pair is different from a mapping pattern of the set of Walsh codes mapped a second RB pair, and wherein the second RB pair is contiguous to the first RB pair in a frequency domain.

9. The method of claim 8, wherein:
the set of Walsh codes includes first Walsh codes for a first layer group and second Walsh codes for a second layer group;
the first Walsh codes are applied to each layer of the first layer group; and
the second Walsh codes are applied to each layer of the second layer group.

10. The method of claim 9, wherein the first Walsh codes are:
[1 1 1 1] for a first layer;
[1 −1 1 −1] for a second layer;
[1 1 −1 −1] for a third layer; and
[1 −1 −1 1] for a fourth layer.

11. The method of claim 9, wherein the first Walsh codes are:
mapped sequentially one-to-one in a direction of a time domain to REs of a first subcarrier allocated to the first RB pair;
mapped sequentially one-to-one in an opposite direction of the time domain to REs of a second subcarrier allocated to the first RB pair; and
mapped sequentially one-to-one in the direction of the time domain to REs of a third subcarrier allocated to the first RB pair.

12. The method of claim 11, wherein the first Walsh codes are:
mapped sequentially one-to-one in the opposite direction of the time domain to REs of a first subcarrier allocated to the second RB pair;
mapped sequentially one-to-one in the direction of the time domain to REs of a second subcarrier allocated to the second RB pair; and
mapped sequentially one-to-one in the opposite direction of the time domain to REs of a third subcarrier allocated to the second RE pair.

13. The method of claim 11, wherein the second Walsh codes are:
mapped sequentially one-to-one in the direction of the time domain to REs of a fourth subcarrier allocated to the first RB pair;
mapped sequentially one-to-one in the opposite direction of the time domain to REs of a fifth subcarrier allocated to the first RB pair; and mapped sequentially one-to-one in the direction of the time domain to REs of a sixth subcarrier allocated to the first RB pair.

14. The method of claim 13, wherein the second Walsh codes are:
   mapped sequentially one-to-one in the opposite direction of the time domain to REs of a fourth subcarrier allocated to the second RB pair;
   mapped sequentially one-to-one in direction of the time domain to REs of a fifth subcarrier allocated to the second RB pair; and
   mapped sequentially one-to-one in the opposite direction of the time domain to REs of a sixth subcarrier allocated to the second RB pair.

15. An eNode B for transmitting user equipment (UE)-specific reference signals in a wireless communication system, the eNode B comprising:
   a processor configured to generate the UE-specific reference signal sequences by applying a set of Walsh codes to reference signal sequences for resource elements (REs) that are allocated to each of a plurality of layers used for transmitting the UE-specific reference signals; and
   a RF unit operatively connected to the processor and configured to transmit, to the UE via each layer of the plurality of layers, the UE-specific reference signals to which the generated UE-specific reference signal sequences are applied,
   wherein the set of Walsh codes is repeatedly applied to the reference signal sequences in a frequency domain direction by units of two resource block (RB) pairs,
   wherein a mapping pattern of the set of Walsh codes mapped to a first resource block (RB) pair is different from a mapping pattern of the set of Walsh codes mapped to a second RB pair, and
   wherein the second RB pair is contiguous to the first RB pair in a frequency domain.

16. A user equipment (UE) for receiving UE-specific reference signals in a wireless communication system, the UE comprising:
   a receiver; and
   a processor operatively connected to the receiver and configured to receive, via each layer of a plurality of layers, the UE-specific reference signals to which UE-specific reference signal sequences are applied,
   wherein the UE-specific reference signal sequences are generated by applying a set of Walsh codes to reference signal sequences for resource elements (REs) that are allocated to each of the plurality of layers,
   wherein the set of Walsh codes is repeatedly applied to the reference signal sequences in a frequency domain direction by units of two resource block (RB) pairs,
   wherein a mapping pattern of the set of Walsh codes mapped to a first resource block (RB) pair is different from a mapping pattern of the set of Walsh codes mapped to a second RB pair, and
   wherein the second RB pair is contiguous to the first RB pair in a frequency domain.

* * * * *